(12) United States Patent
Kang et al.

(10) Patent No.: US 9,344,878 B2
(45) Date of Patent: May 17, 2016

(54) METHOD AND SYSTEM FOR OPERATING COMMUNICATION SERVICE

(71) Applicant: Samsung Electronics Co. Ltd., Suwon-si, Gyeonggi-do (KR)

(72) Inventors: Sangki Kang, Suwon-si (KR); Jungwan Ko, Seongnam-si (KR); Kichoon Kong, Seoul (KR); Kyungtae Kim, Hwaseong-si (KR); Sanghoon Lee, Yongin-si (KR)

(73) Assignee: Samsung Electronics Co., Ltd., Suwon-si (KP)

( * ) Notice: Subject to any disclaimer, the term of this patent is extended or adjusted under 35 U.S.C. 154(b) by 288 days.

(21) Appl. No.: 13/888,726

(22) Filed: May 7, 2013

(65) Prior Publication Data

US 2013/0304457 A1  Nov. 14, 2013

(30) Foreign Application Priority Data

May 8, 2012  (KR) ......................... 10-2012-0048494

(51) Int. Cl.
    *H04W 8/22*    (2009.01)
    *H04M 1/725*   (2006.01)
    *G10L 13/00*   (2006.01)
    *G10L 15/26*   (2006.01)
    *H04M 3/42*    (2006.01)

(52) U.S. Cl.
    CPC ................. *H04W 8/22* (2013.01); *G10L 13/00* (2013.01); *G10L 15/26* (2013.01); *H04M 1/7255* (2013.01); *H04M 1/72552* (2013.01); *H04M 3/42382* (2013.01); *H04M 2201/39* (2013.01); *H04M 2201/40* (2013.01); *H04M 2201/60* (2013.01); *H04M 2203/253* (2013.01)

(58) Field of Classification Search
    None
    See application file for complete search history.

(56) References Cited

U.S. PATENT DOCUMENTS

| | | | | |
|---|---|---|---|---|
| 5,870,454 | A * | 2/1999 | Dahlen | 379/88.14 |
| 2003/0023442 | A1* | 1/2003 | Akabane et al. | 704/260 |
| 2003/0088421 | A1* | 5/2003 | Maes et al. | 704/270.1 |
| 2003/0097262 | A1* | 5/2003 | Nelson | 704/235 |
| 2004/0003041 | A1* | 1/2004 | Moore et al. | 709/204 |
| 2005/0191994 | A1 | 9/2005 | May et al. | |
| 2007/0050191 | A1* | 3/2007 | Weider et al. | 704/275 |
| 2010/0076767 | A1 | 3/2010 | Vieri et al. | |
| 2010/0217591 | A1 | 8/2010 | Shpigel | |

FOREIGN PATENT DOCUMENTS

| CN | 1655570 A | 8/2005 |
|---|---|---|
| CN | 1929655 A | 3/2007 |

* cited by examiner

*Primary Examiner* — Jeremiah Bryar

(74) *Attorney, Agent, or Firm* — Jefferson IP Law, LLP

(57) ABSTRACT

An operation method capable of adaptively operating at least one of a Speech To Text (STT) service and a Text To Speech (TTS) service according to setting or user operation and a system thereof are provided. The method includes requesting a specific type of a communication service connection to a reception side terminal by a transmission side terminal, and performing an operation of at least one of a speech to text service providing speech recognition based text and a text to speech service converting the text into speech data between the reception side terminal and the transmission side terminal, and includes one of recognizing speech data provided from the transmission side terminal and converting the speech data into a text based on a first speech process supporting device connected to the transmission side terminal.

43 Claims, 20 Drawing Sheets

METHOD AND SYSTEM FOR OPERATING COMMUNICATION SERVICE

PRIORITY

This application claims the benefit under 35 U.S.C. §119(a) of a Korean patent application filed on May 8, 2012 in the Korean Intellectual Property Office and assigned Serial No. 10-2012-0048494, the entire disclosure of which is hereby incorporated by reference.

BACKGROUND OF THE INVENTION

1. Field of the Invention

The present invention relates to a communication service operation of a terminal. More particularly, the present invention relates to a method of operating a communication service capable of adaptively transferring information by operating at least one of Speech To Text (STT) service providing a speech recognition based text and a Text To Speech (TTS) service converting a text into speech data and a system thereof.

2. Description of the Related Art

Because a portable terminal supports a specific user function and the size thereof is small so as to allow the user to carry the portable terminal, the portable terminal is highlighted in many industrial and living fields. Further, in recent years, a portable terminal integrally supporting various user functions has been introduced. Such a portable terminal provides a screen corresponding to a user function through a display unit while supporting the user function. Accordingly, the user uses a specific user function to consume content items through a screen according to an operation of a corresponding function.

Meanwhile, the portable terminal may perform a speech call, a character call, and an image call with another terminal. To this end, the portable terminal inputs a phone number of another terminal and then selects one communication service from the speech call, the character call, and an image call. If the terminal user accepts the selected communication service, the portable terminal may use the selected communication service. In this case, when the user does not accept connection with respect to the selected communication service, a corresponding communication service may not be operated. This situation may be variously generated according to a current situation by terminal users. For example, when the user is located at a place or an environment having a specific limitation for a call such as a conference room, a bathroom, or a library, the communication service requested by the portable terminal user may not be operated. However, because the portable terminal user may not be aware of situations (e.g., the context) of other terminals, the user continuously attempts the call connection. Such a situation may cause a very difficult problem. Further, although the call connection is achieved, a normal call may be not frequently performed according to situations of terminal users.

Therefore, a need exists for a system and an operation method capable of adaptively operating at least one of an STT service and a TTS service according to setting or user operation.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an operation method capable of adaptively operating at least one of a Speech To Text (STT) service and a Text To Speech (TTS) service according to setting or user operation and a system thereof.

In accordance with an aspect of the present invention, a system for operating a communication service is provided. The system includes a transmission side terminal for requesting connection of the communication service, and for converting reception data or user input data according to at least one of preset input/output modes and input/output modes determined by a user after the communication service is connected, a reception side terminal for receiving a communication service connection acceptance request according to the request the connection of the communication service, for starting the communication service using the at least one of the preset input/output modes and the input/output modes determined by the user when the communication service connection acceptance request is accepted, for converting the reception data and the user input data or receiving converted data by transmitting the user input data to a speech process supporting device for converting the user input data according a type of the reception data and the input/output modes, for displaying conversion data corresponding to the reception data and for transmitting conversion data corresponding to the user input data, and a speech process supporting device for converting input speech data into text data and for outputting the converted text data or converting input text data into speech data to output the converted speech data.

In accordance with another aspect of the present invention, a method of operating a communication service is provided. The method includes receiving a communication service connection request, forming a communication path by accepting the communication service connection request, setting input/output modes according to input/output modes determined by a user when the input/output modes are previously set or when the communication service connection request is accepted, receiving data from another party, converting the received data or receiving and displaying converted data by transmitting the received data to a speech process supporting device for converting the received data according to a type of the received data and the input/output modes, receiving user input data, and converting the received data or receiving converted data by transmitting the received data to the speech process supporting device for converting the received data according to the type of the received data and the input/output modes, and transmitting the converted data to the other party.

In accordance with another aspect of the present invention, a system for operating a communication service is provided. The system includes a transmission side terminal for requesting connection of the communication service, for receiving information about input/output modes of another party, for converting the user input data and data received from the other party or receiving converted data by transmitting the data to a speech process supporting device for converting the user input data according to the received input/output modes of the other party after the communication service is connected, for outputting conversion data corresponding to the received data, and for transmitting conversion data corresponding to the user input data, a reception side terminal for receiving a communication service connection acceptance request according to the request the connection of the communication service, for starting the communication service using at least one of preset input/output modes or input/output modes determined by the user when the communication service connection acceptance request is accepted, for transmitting information about the input/output modes to a transmission side, for displaying the conversion data received from the transmission side, and for transmitting the user input data, and a speech process supporting device for providing at least one of an STT service providing input speech data as text data and a TTS service converting a text into speech data.

In accordance with another aspect of the present invention, a method of operating a communication service is provided. The method includes transmitting a communication service connection request, setting input/output modes according to input/output modes determined by a user when the input/output modes are previously set or when the communication service connection request is accepted, receiving acceptance with respect to the communication service connection request and information about the input/output modes of another party, receiving user input data, converting the received user input data or receiving and transmitting converted data by transmitting the received data to a speech process supporting device for converting the received user input data according to a type of the received user input data and the input/output modes, receiving data from another party, and converting the received data or receiving and displaying converted data by transmitting the data to the speech process supporting device for converting the received data according to the type of the received data and the input/output modes determined by the user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The objects, features, and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
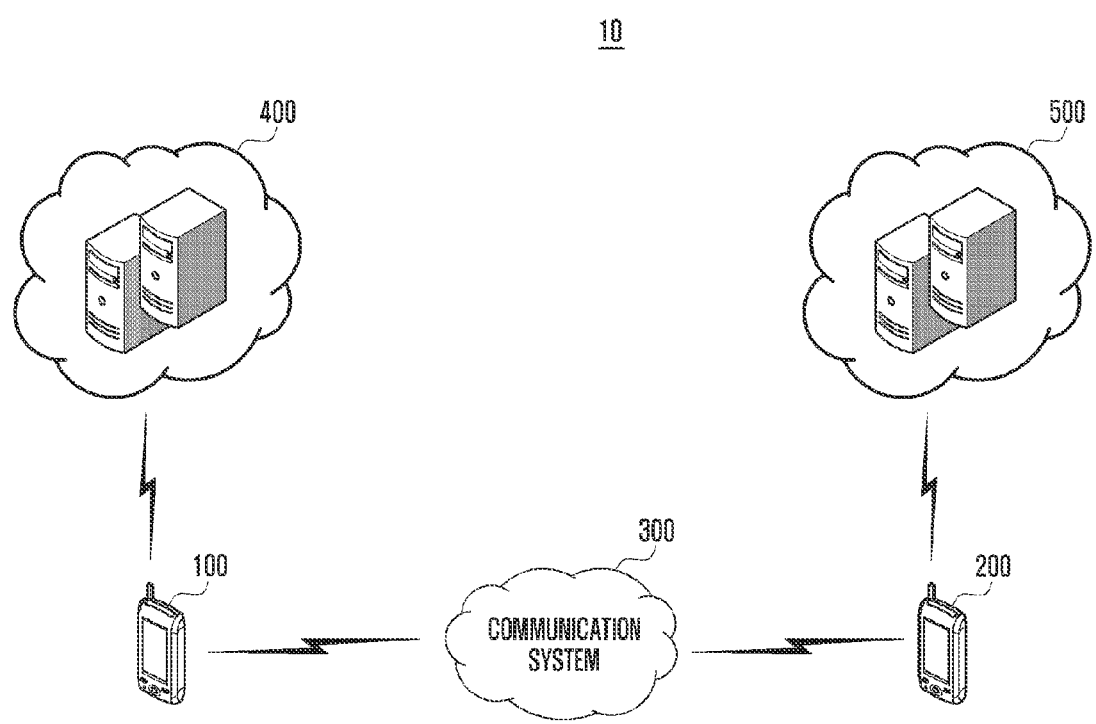
FIG. 1 is a block diagram illustrating a configuration of a system for operating a communication service according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, two communication units may communicate using respective preferred methods of communications. For example, a first communication unit may prefer to communicate using speech communication, and a second communication unit may prefer to communicate using text communication.

According to exemplary embodiments of the present invention, a transmitting communication unit may perform processing to data input to the communication unit so as to convert the data to a form that is preferred by a receiving communication unit. For example, if the receiving communication unit prefers to communicate using text communication, the transmitting communication unit may process speech data input thereto so as to convert the speech data to text data for transmission to the receiving communication unit.

According to exemplary embodiments of the present invention, a receiving communication unit may perform processing to data received from a transmitting communication unit so as to convert the data to a form that is preferred by the receiving communication unit. For example, if the receiving communication unit prefers to communicate using text communication, then the receiving communication unit may process speech data received from the transmitting communication unit to text data.

According to exemplary embodiments of the present invention, a receiving communication unit may provide an indication to a transmitting communication as to the form of communication over which the receiving communication unit prefers to communicate in response to an initial communication during a communication session. For example, if the transmitting communication unit attempts to call the receiving communication unit for speech communication, the receiving communication unit may transmit an indication that the receiving communication unit prefers to communicate via text communication. The indication as to the preferred form of communication may be determined by the form of communication over which a response is provided during a communication session.

According to exemplary embodiments of the present invention, one of the transmitting communication unit and the receiving communication unit may be responsible for operatively processing the communication data so as to provide the transmitting communication unit and the receiving communication unit with a preferred form of communication. For example, if a transmitting communication unit prefers to communicate using speech communication and a receiving communication unit prefers to communicate using text communication, and if the transmitting communication unit is responsible for operatively processing the communication data, then the transmitting communication unit may operatively process speech data input to the transmitting communication unit to text data for transmission to the receiving communication unit; and the transmitting communication unit may operatively process text data received from the receiving communication data to speech data for use by the transmitting communication unit.

According to exemplary embodiments of the present invention, at least one server may process the communication data so as to provide at least one of the transmitting communication unit and the receiving communication unit with data in a preferred form of communication. According to exemplary embodiments of the present invention, the server may process all of the communication data or may process a subset of the communication data that is or is to be communicated between the transmitting communication unit and the receiving communication unit. For example, if the communication data is to be converted from speech to text, the server may convert all of the communication data from speech to text, or one of the transmitting communication unit and the receiving communication unit may convert a portion of the communication data and may provide the server with another portion of the communication data to be converted. As an example, determination as to which portions of the communication data are to be processed (e.g., converted) locally (e.g., at the respective communication unit) and which portions are to be processed remotely (e.g., at the server), may be made based on at least one of the extent of databases stored locally, local processing power, efficiency in processing the communication data, and whether the communication data can be processed locally so as to achieve a Quality of Service (QoS) threshold.

FIG. 1 is a block diagram illustrating a configuration of a system for operating a communication service according to an exemplary embodiment of the present invention.

Referring to FIG. 1, the system 10 for operating a communication service may include a transmission side terminal 100, a communication system 300, a reception side terminal 200, a first speech process supporting device 400, and a second speech process supporting device 500.

The system for operating a communication service according to exemplary embodiments of the present invention having a construction mentioned above generates and transmits additional information of transceived data by operating the first speech process supporting device 400 and the second speech process supporting device 500 according to selection of a user or a peripheral environment or a wireless environment of a terminal while a communication service is operated between the transmission side terminal 100 and the reception side terminal 200 so that a communication service suitable for a user environment or situation may be operated. The additional information may include at least one of text recognizing a collected speech signal of a user and speech data obtained by converting input text into a speech.

To this end, the transmission side terminal 100 forms a data communication channel based on a packet switching system with the reception side terminal 200. In this procedure, the system 10 may operate at least one of the first speech process supporting device 400 and the second speech process supporting device 500 according to at least one of a request of the transmission terminal 100 user, a request of the reception terminal 200 user, a setting of each terminal, a determination of the controller with respect to a peripheral environment, and a network state of each terminal. For example, the transmission side terminal 100 transmits a message requesting formation of a data communication channel to the reception side terminal 200, receives a request of Speech To Text (STT) service operation providing text generated by recognizing a speech signal from the reception side terminal 200, and operates the request. The transmission side terminal 100 recognizes a speech to be transmitted by the user according to a request of a user and receives transmission as text, and operates an STT service. The transmission side terminal 100 may operate the STT service according to a request of the controller based on preset schedule information. In this case, the transmission side terminal 100 may request speech recognition to the first speech process supporting device 400 before collected speech data to the reception side terminal 200 through a communication system 300 or perform speech recognition based on an internally provided speech recognition database and converts the speech into text.

Further, the transmission side terminal 100 transmits text generated according to the speech recognition to the reception side terminal 200 as caption of image data transmitted based on an image call. When there no image data to be transmitted, the transmission side terminal 100 may generate a caption screen using a previously defined image and provide the caption screen to the reception side terminal 200.

The transmission side terminal 100 may request the reception side terminal 200 without performing separate speech recognition with respect to the collected speech data. The transmission side terminal 100 recognizes the collected speech signal and converts the speech signal into text, provides the collected speech signal to the reception side terminal 200 while providing the converted text to the reception side terminal 200 so that speech recognition may be additionally performed.

The reception side terminal 200 forms a communication channel with the transmission side terminal 100 through the communication system 300. During this procedure, the reception side terminal 200 may form a data communication channel based on a packet switching system with the transmission side terminal 100. The data communication channel may include a channel capable of transceiving data for supporting at least one of various communication service channels such as an image call service channel, a chatting service channel, and a call service channel simultaneously supporting a speech, an image, and a caption. The reception side terminal 200 may receive at least one of image related data, speech related data, and text related data from the transmission side terminal 100, and output the at least one received data (e.g., at least one of received image related data, received speech related data, and received text related data) through at least one of a speaker and a display unit. Particularly, the reception side terminal 200 receives text corresponding to a speech signal collected by the transmission side terminal 100, and may output the text to the display unit together with an image, and may output the text through a separately generated caption screen in a state in which there is no separate image output. Meanwhile, the reception side terminal 200 may receive speech data from the transmission side terminal 100. In this case, the reception side terminal 200 transfers corresponding speech data to the second speech process supporting device 500 according to terminal setting or a user request so that speech recognition may be performed. Further, the reception side terminal 200 may output a speech-recognized text to the display unit. When the transmission side terminal 100 transmits the text together with speech data, the reception side terminal 200, the transmission side terminal 100 may output at least one of a newly speech-recognized text and the received text to the display unit. In this case, the reception side terminal 200 may separately provide the voce-recognized text and the received text. The transmission side terminal 100 and the reception side terminal 200 may evaluate a network during a procedure of using one of the first speech process supporting device 400 and the second speech process supporting device 500, and cooperate or perform under the reception side terminal 200 to selectively operate one of the first speech process supporting device 400 and the second speech process supporting device 500 according to a network state.

The communication system 300 is disposed between the transmission side terminal 100 and the reception side terminal 200, and supports such that a communication channel is formed between the transmission side terminal 100 and the reception side terminal 200. The communication system 300 may be configured by various types of communication network devices according to device characteristics of the transmission side terminal 100 and the reception side terminal 200. In particular, the communication system 300 may be configured by a packet switching system capable of transceiving a packet in order to support a speech recognition based text providing service. If necessary, the packet switching system and a circuit switching system may be compatibly or independently configured. When the transmission side terminal 100 and the reception side terminal 200 are provided as a mobile device, the communication system 300 may be established by a mobile communication system in order to support mobility of terminals. For example, the communication system 300 may be configured by network devices for supporting a communication system and a communication scheme of various generations such as 2G, 3G, 4G, and the like. Accordingly, it may be understood that the communication system 300 according to exemplary embodiments of the present invention is at least one of various communication networks which may be configured by a network device capable of transmitting audios, videos, and texts collected by the transmission side terminal 100 to the reception side terminal 200 and a network device capable of transmitting audios, videos, and texts generated by the reception side terminal 200.

The first speech process supporting device 400 recognizes speech data provided from the transmission side terminal according to a request of the transmission side terminal 100, and provides a speech recognized text to the transmission side terminal 100. The first speech process supporting device 400 may be configured by at least one of a type of a specific device or a conversion server directly connected to the transmission terminal 100 in wired/wireless schemes, a type of a conversion server to which the transmission side terminal 100 may access through a separately provided access point, and a type of a conversion server to which the transmission side terminal 100 accesses through the communication system 300. For example, the first speech process supporting device 400 may be configured by a separate PC device to which the transmission side terminal 100 is connected in a wired scheme. The first speech process supporting device 400 may be configured by a separate server device which the transmission side terminal 100 may access in a wireless scheme such as, for example, through a Wi-Fi module, a near field wireless communication module, and the like. The first speech process supporting device 400 may be provided by a type of a separate server which may access through a mobile communication system and an Internet network. The first speech process supporting device 400 supports speech recognition in the form of the whole sentence, and may provide a relatively rapid speech recognition processing rate and a higher speech recognition reliability based on a vast speech recognition database.

Meanwhile, the first speech process supporting device 400 may support a TTS service between terminals. To this end, the first speech process supporting device 400 includes a database for converting the transferred text into speech data, and may provide speech data conversion and transfer with respect to the transferred text to the transmission side terminal 100 based on the database. When the system for operating a communication service supports a TTS service, if a database previously stored in the transmission side terminal 100 is designed to be used, the first speech process supporting device 400 may not include a database for supporting the TTS service. A speech process supporting device for supporting the TTS service may be configured by the first speech process supporting device 400 and a separate server device.

The second speech process supporting device 500 may provide a relatively rapid speech recognition processing rate and a higher speech recognition reliability based on a vast speech recognition database similar to the first speech process supporting device 400. The second speech process supporting device 500 may form a communication channel with the reception side terminal 200, and may be configured by at least one of a device connected to the reception side terminal 200 in wired/wireless schemes, a conversion server device connected to the reception side terminal 200 through a separately provided wireless access point, a conversion server device connected to the reception side terminal 200 through a separately provided mobile communication system, a conversion server device connected to the reception side terminal 200 through a separately provided Internet network, and a conversion server device connected by compatibly using the communication schemes. The second speech process supporting device 500 may recognize speech data provided from the reception side terminal 200 and convert the recognized speech data into text, and provide the text to the reception side terminal 200. The speech data provided from the reception side terminal 200 may include at least one of speech data received from the transmission side terminal 100 and speech data collected by the reception side terminal 200.

The second speech process supporting device 500 may include a database to support conversion of a transferred data into speech data in order to support a TTS service of the reception side terminal 200. If text is received together with a support request of a TTS service from the reception side terminal 200, the second speech process supporting device 500 may generate speech data corresponding to the text and provide the speech data to the reception side terminal 200. When the system for operating a communication service supports a TTS service, if a database previously stored in the reception side terminal 200 is designed to be used, the second speech process supporting device 500 may not include a database for supporting the TTS service. A speech process supporting device for supporting the TTS service may be configured by the second speech process supporting device 500 and a separate server device.

As described above, the system 10 for operating a communication service converts a speech signal into text using a speech recognition function so that the user may use a suitable communication service environment according to situations (e.g., contexts) of terminals users. Hereinafter, an operation example of the system for operating the foregoing various services will be described in detail with reference to the accompanying drawings.

Figure 2:
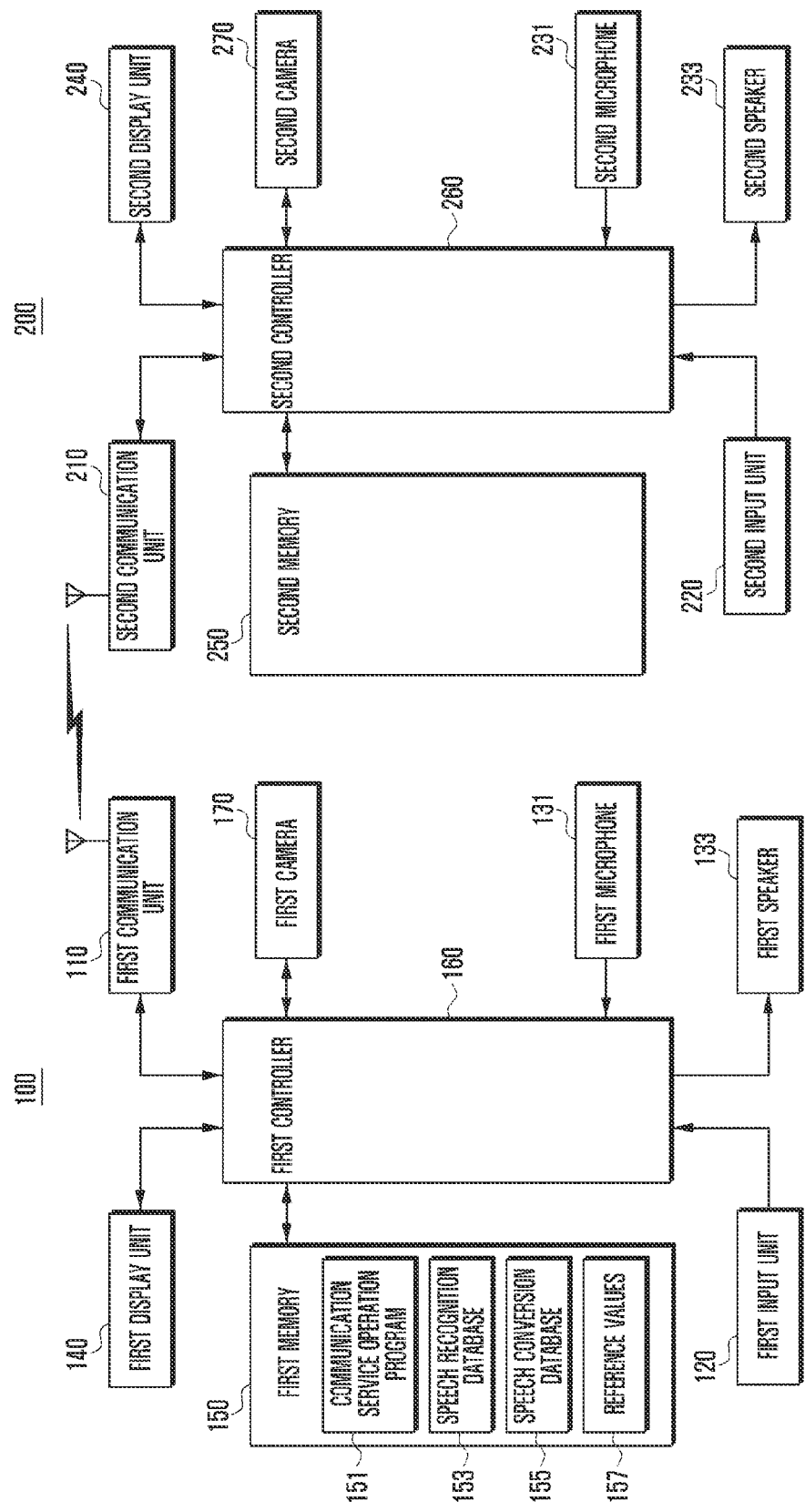
FIG. 2 is a block diagram illustrating a configuration of a transmission side terminal and a configuration of a reception side terminal such as, for example, the terminals of FIG. 1 according to an exemplary embodiment of the present invention.

FIG. 2 is a block diagram illustrating a configuration of a transmission side terminal and a configuration of a reception side terminal such as, for example, the terminals of FIG. 1 according to an exemplary embodiment of the present invention.

Referring to FIG. 2, a transmission side terminal 100 which converts a speech signal into text using the first speech process supporting device 400 and transmits the text to the reception side terminal 200 is illustrated. An example of FIG. 2 may be performed according to a request of the reception side terminal 200 or noise evaluation of the reception side terminal 200, according to schedule information of the transmission side terminal 100, or according to a peripheral environment of the transmission side terminal 100 or network evaluation under control of the controller. Respective cases will be described with reference to following drawings. Hereinafter, a configuration of the transmission side terminal 100 and a configuration of the reception side terminal 200 is separately shown and illustrated. However, exemplary embodiments of the present invention are not limited thereto. For example, when the transmission side terminal 100 uses a communication service with the reception side terminal 200, the transmission side terminal 100 may serve as the reception side terminal and the reception side terminal may serve as the transmission side terminal. As a result, hereinafter, configurations of the transmission side terminal 100 and the reception side terminal 200 may be combined with one communication terminal Accordingly, hereinafter, it may be understood that a configuration of the transmission side terminal 100 may be included while the reception side terminal 200 performs a transmission function. It may be understood that a configuration of the reception side terminal 200 may be included while the transmission side terminal 100 performs a reception function.

In order to operate the communication service according to the first exemplary embodiment of the present invention, the transmission side terminal 100 may include a first communication unit 110, a first input unit 120, a first microphone 131, a first speaker 133, a first display unit 140, a first memory 150, a first controller 160, and a first camera 170.

The transmission side terminal 100 having a construction mentioned above support an STT service which operates the first speech process supporting device 400 to convert a collected speech signal into text and to transmit the text to the reception side terminal 200. To this end, the transmission side terminal 100 may confirm a user input signal according to menu selection, preset schedule information, a request of the reception side terminal 200, variation in a peripheral environment or network evaluation, and recognizes a speech signal collected by the first microphone 131, and converts the recognized speech signal into text. The transmission side terminal 100 may include various sensors, for example, an acceleration sensor, an illumination sensor, a temperature sensor, a gyro sensor, a location information collecting sensor, and the like in order to confirm variation in the peripheral environment. In addition, the transmission side terminal 100 may control such that speech data are recognized based on an internally provided speech recognition database. The transmission side terminal 100 may support a TTS service which converts character information input by a user into a speech and transmits the speech to the reception side terminal 200. The transmission side terminal 100 may provide at least one of the foregoing STT service and TTS service during a procedure of using a chatting service and an image call service. The chatting service formed by the transmission side terminal 100 with the reception side terminal 200 may include a service supporting at least one of speech, image, and caption transceiving function as well as a text transceiving function according to selection of users, previous schedule information or control of the controller.

To this end, the first communication unit 110 may form a data communication channel with the reception side terminal 200 through the communication system 300. The first communication unit 110 may be configured by a communication module supporting various types of communication schemes according to device characteristics of the transmission side terminal 100. For example, the first communication unit 110 may be configured by various communication modules such as a communication module supporting a mobile communication module, Wi-Fi such as 2G, 3G, and 4G, and the like. Particularly, the first communication unit 110 may form speech recognition based data communication channel for text transcription according to the exemplary embodiment of the present invention with the reception side terminal 200. In this case, the formed data communication channel may transmit at least one of a speech, an image, a character input from the first unit 120 as well as text generated by speech recognition. Further, the data communication channel may transmit information obtained by converting a character input from the input unit 120 into a speech.

Meanwhile, the first communication unit 110 may further transmit at least one of text generated by the foregoing speech recognition in a state in which a data communication channel for a chatting service or an image call service is fundamentally formed with the reception side terminal 200. When the transmission side terminal 100 performs a function of the reception side terminal, the first communication unit 110 may collect signals for evaluating a network. The first communication unit 110 may support respective communication services in one direction or in both directions in a procedure of supporting a communication service with the reception side terminal 200. In detail, the first communication unit 110 forms a channel service channel and an image call service channel in both directions with the reception side terminal 200, in which the speech service channel and a speech recognized text providing service channel may be performed in only one direction according to selection of a user or terminal setting. Directionality of each service channel will be described with reference to following drawings in detail.

The first input unit 120 generates various input signals necessary for operating the transmission side terminal 100. The first input unit 120 may be provided in the form of a specific key such as a button key, a side key, and a home key, or a touch map to support a full touch screen. The touch map is displayed on the first display unit 140 and may generate an input signal according to a user touch. The first input unit 120 may generate an input signal for communication service connection with the reception side terminal 200, an input signal for operating a connected communication service, an input signal for inputting a character, and an input signal for instructing other communication service activation during an operation of a specific communication service according to user control. The generated input signals are transferred to the first controller 160 so that a function according to the input signals may be performed.

The first microphone 131 is activated according to a function operation of the transmission side terminal 100 and collects a peripheral audio signal, particularly, a speech signal. The speech signal collected by the first microphone 131 is transferred to the first controller 160 so that a speech is recognized according to control of the controller 160 and the recognized speech is converted into text, and the text is encoded in a collected form and is transferred to the reception side terminal 200.

The first speaker 133 outputs an audio signal of the transmission side terminal 100. The first speaker 133 may output audio data according to playback of an audio file stored in the transmission side terminal 100, and audio data according to playback of an audio file received from an external server or other terminals. Particularly, the speaker 133 may output audio data provided from the reception side terminal 200. When a character or a video signal is transmitted from the reception side terminal 200, the first speaker 133 may output a corresponding alarm sound or guide sound. The first speaker 133 according to exemplary embodiments of the present invention may output an alarm sound reporting transmission of text generated by recognizing the speech signal collected by the first microphone 131, an alarm sound reporting reception of text provided from the reception side terminal 200, and a guide sound corresponding to text received according to a request of a TTS service from the reception side terminal 200.

The first camera 170 is disposed at a side of the transmission side terminal 100 and collects an image of a subject. The image collected from the first camera 170 may be transferred to the first controller 160. The first controller 160 may store an image collected according to a currently activated function and user control in the memory 150 or transmit the image to the reception side terminal 200. Particularly, the first camera 170 may collect an image necessary to operate an image call with the reception side terminal 200. The first camera 170 is shown and illustrated as one configuration, but a camera for capturing a photograph and a camera for capturing images for an image call may be separately provided.

The first display unit 140 provides various screen interfaces necessary to operate the transmission side terminal 100. The first display unit 140 may include a touch panel and a display panel to support a touch function. The first display unit 140 may provide respective screens or a composite screen according to a type of a communication service with the reception side terminal 200. For example, the first display unit 140 may individually output at least one of a chatting service support screen, a speech service support screen, a character service support screen, a speech recognition based caption service support screen, and an image call service support screen with the reception terminal 200 according to operation of each communication service.

The first display unit 140 may provide a combination of a least one of the foregoing screens. For example, the first display unit 140 may output an image or text indicating that a speech service is being supported in one side of a screen while supporting a speech service based on a chatting service support screen. The first display unit 140 outputs an image display region for supporting an image call service during output of a chatting service support screen, and outputs a speech recognized text at one side. The display unit 140 may output an image display region and text or a caption during output of the chatting service support screen, and may output an image or text indicating that the speech service is being supported in one side of a screen.

In addition, the first display unit 140 may provide a menu screen so that a user may select at least one from the foregoing various communication services. Further, the first display unit 140 may output screen information making the user recognizing a situation which automatically operate a specific communication service according to a peripheral environment or network evaluation, screen information for suggesting operation of a specific type of a communication service, and screen information guiding operation of a communication service according to selection of the user. Respective screens provided from the first display unit 140 may have various formats according to the size of a display region of a device. Particularly, in a portable based device, the first display unit 140 may overlap various information and convert pages in order to output information on a limited display region.

The first memory 150 may store an operating system necessary to operate the transmission side terminal 100 and an application program for supporting a function provided from the transmission side terminal 100. Particularly, the first memory 150 may store a communication service operation program 151 for supporting an operation of a communication service according to exemplary embodiments of the present invention, a speech recognition database 153 for supporting internal speech recognition, a speech conversion database 155 for supporting a TTS service, and reference values 157 for evaluating a peripheral environment and a network.

The communication service operation program 151 includes various routines for operating a communication service according to the exemplary embodiment of the present invention. For example, the communication service operation program 151 may include routines for forming and operating a chatting service channel with the reception side terminal 200, routines for forming and operating a speech service channel, routines for forming and operating a character service channel, and routines for forming and operating an image call service channel. Particularly, the communication service operation program 151 may include a routine for converting a speech recognition based text to output a character or a caption, and a routine for transmitting the converted text to the reception side terminal 200. The communication service operation program 151 may further include a routine for recognizing a speech signal received from the reception side terminal 200, for converting the speech signal into text, and for outputting the text, and a routine for converting the received text into a speech and outputting the speech. Further, the communication service operation program 151 may include a routine for confirming a peripheral environment using a sensor, for automatically activating a specific communication service or allowing a user to select the specific communication service according to a corresponding environment, and a routine for evaluating a network or a peripheral environment such as a noise and for determining whether to perform speech recognition by a transmission side or to transfer the speech recognition to the reception side according to an evaluation result. The routine to be processed by the transmission side may further include a routine for determining whether to process the speech recognition using the first speech process support device 400 which the transmission side terminal 100 may access or based on an internal speech recognition database and processing the speech recognition according the determination result. When it is determined that the reception side terminal 200 processes the speech recognition, the reception side terminal 200 may determine whether to process the speech recognition using the second speech process supporting device 500 or based on the internal speech recognition database.

The speech recognition database 153 internally supports a speech recognition function when the transmission side terminal 100 does not use the first speech process supporting device 400 or simultaneously use the first speech process supporting device 400 to perform speech recognition. The speech recognition database 153 may provide lower reliability and low calculation rate with a speech recognition result as compared with the first speech process supporting unit 400, but may support a specified type of a speech recognition function to a user. For example, the speech recognition database 153 stored in the speech recognition database 153 may include a result by recognizing a speech signal input by the user and by storing the speech signal as a history which text corresponds to a user speech signal having a specific pattern. Accordingly, the internally stored speech recognition database 153 may support a specified type of a speech recognition function to the user different from a first speech process supporting device 400 accessed by various terminals and requesting speech recognition. Accordingly, the speech recognition database 153 may provide a result having reliability and accuracy similar to a speech recognition result provided from the first speech process supporting device 400 according to a collected speech signal, and may provide a rapid speech recognition result. To this end, the speech recognition database 153 may provide a learning function under control of the controller 160. The learning function may be a function of recording an input to reflect a speech recognition result afterward when an input such as correction is generated so that an event adjusted by a specific speech recognition result is generated during a procedure of matching a specific speech recognition result with respect to an input speech signal by the user. The learning function may increase accuracy of a speech recognition result with respect to a speech signal input by the user through repetition of the foregoing procedure.

The speech conversion database 155 includes speeches for converting words, phrases, postpositional words or sentences input as character or text into a speech signal. The speech conversion database 155 may be used to support a TTS service. If an input signal for character input is generated in the first input unit 120 and an input means including a first display unit 140 such as a key map in a state in which a mode for supporting the TTS service is activated, the speech conversion database 155 is called by the first controller 160 and may provide speech data with respect to corresponding characters. The provided speech data may be transmitted to another terminal by the first controller 160.

The reference values 157 may be reference values for evaluating a peripheral environment and a network. For example, the reference values for evaluating the network may be values for identifying delay of the network. Further, the reference values for evaluating the peripheral environment may include at least one of a decibel degree and a frequency degree of a noise signal of an audio signal collected by the first microphone 131. In order to separate the noise signal from the audio signal collected by the first microphone 131, a filtering procedure may be performed. A signal other than a frequency band of a previously defined user speech signal is determined as the noise signal so that the noise signal may be confirmed. In addition, the reference values 157 may include a specific location, for example, location information of a library in order to evaluate the peripheral environment, and illumination information to distinguish night from day. Because time information as well as illumination information may be used to distinguish night from day, the reference values 157 to distinguish night from day may include illumination information and time information. The reference values 157 may include a reference value with respect to receptions state information to be formed with the first speech process supporting device 400 by the transmission side terminal 100. For example, the reference values 157 may include previously defined reference value with respect to a data transmission delay degree and a packet loss rate between the transmission side terminal 100 and the first speech process supporting device 400.

The first controller 160 supplies various power and controls various signals necessary to operate the transmission side terminal 100 according to the exemplary embodiment of the present invention. In particular, the first controller 160 may control transfer of signals and data to support an operation of the communication service according to exemplary embodiments of the present invention. To this end, the first controller 160 may include constituent element as illustrated in FIG. 3.

Figure 3:
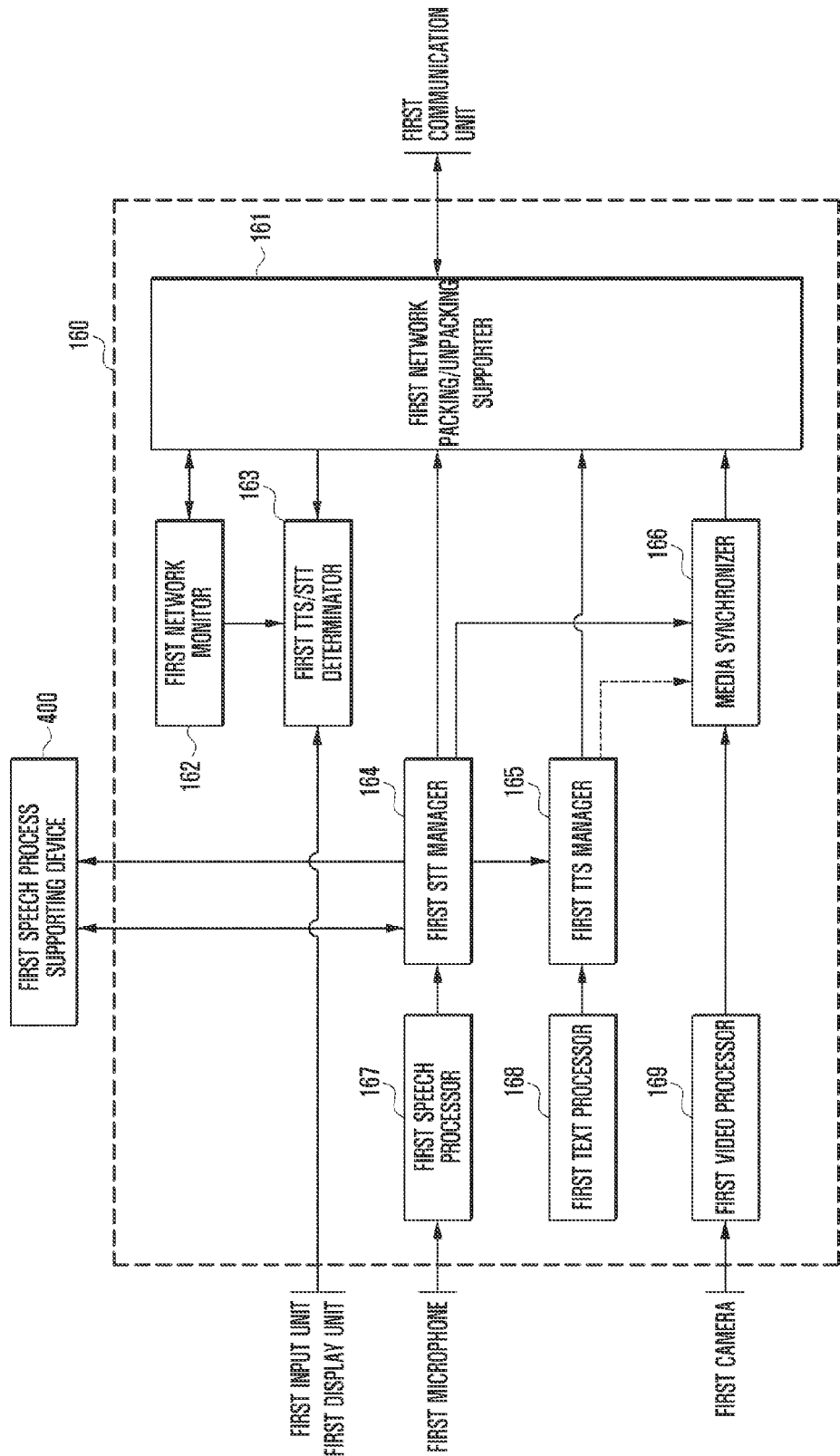
FIG. 3 is a block diagram illustrating a configuration of a first controller of a transmission side terminal according to a first exemplary embodiment of the present invention.

FIG. 3 is a block diagram illustrating a configuration of a first controller of a transmission side terminal according to a first exemplary embodiment of the present invention.

Referring to FIG. 3, a first controller 160 may include a first network packing/unpacking supporter 161, a first network monitor 162, a first TTS/STT determinator 163, a first STT manager 164, a first TTS manager 165, a media synchronizer 166, a first speech processor 167, a first text processor 168, and a first video processor 169.

The speech processor 167 processes a speech signal collected by the microphone 131 to generate speech data. For example, the first speech processor 167 may be an encoder to process a speech signal. The speech data processed by the speech processor 167 may be transferred to the first STT manager 164.

The text processor 168 converts a signal input from the input unit 120 and a display unit 140 having an input function into a character. The converted character from the text processor 168 may be transferred to the first TTS manager 165.

The first video processor 169 controls a first camera 170 to be activated according to a communication service channel formed with the reception side terminal 200. For example, when the image call service is operated with the reception side terminal 200, the first video processor 169 is activated and controls the first camera 170 and processing of a collected image. The first video processor 169 may transfer the image collected by the first camera 170 to the media synchronizer 166 so that the image may be transferred to the reception side terminal 200.

The first STT manager 164 controls a speech recognition function of the transmission side terminal 100. The first STT manager 164 recognizes speech data from the first speech processor 167 and converts the speech data into text. In this case, the STT manager 164 may transfer speech data from the first speech processor 167 to the first speech process supporting device 400 in real time or at a predetermined period. The first STT manager 164 may perform speech recognition based on the speech recognition database 153 stored in the first memory 150 according to control. The first STT manager 164 may convert speech data into text by a combination of speech recognition using the first speech process supporting device 400 and speech recognition using a speech recognition database 153 according to control. In this procedure, the first STT manager 164 may perform a learning function of the speech recognition database based on text from the first speech process supporting device 400. For example, the first STT manager 164 compares a recognized result of the speech recognition database 153 with text received from the first speech process supporting device 400 to correct an error, and updates information with respect to a corresponding speech signal based on the text received from the first speech process supporting device 400. The text processed by the first STT manager 164 may be transferred to at least one of the media synchronizer 166 and the first network packing/unpacking supporter 161. Meanwhile, the first STT manager 164 may support a speech recognition function under control of the first TTS/STT determinator 163. The first STT manager 174 may include constituent elements as illustrated in FIG. 4.

Figure 4:
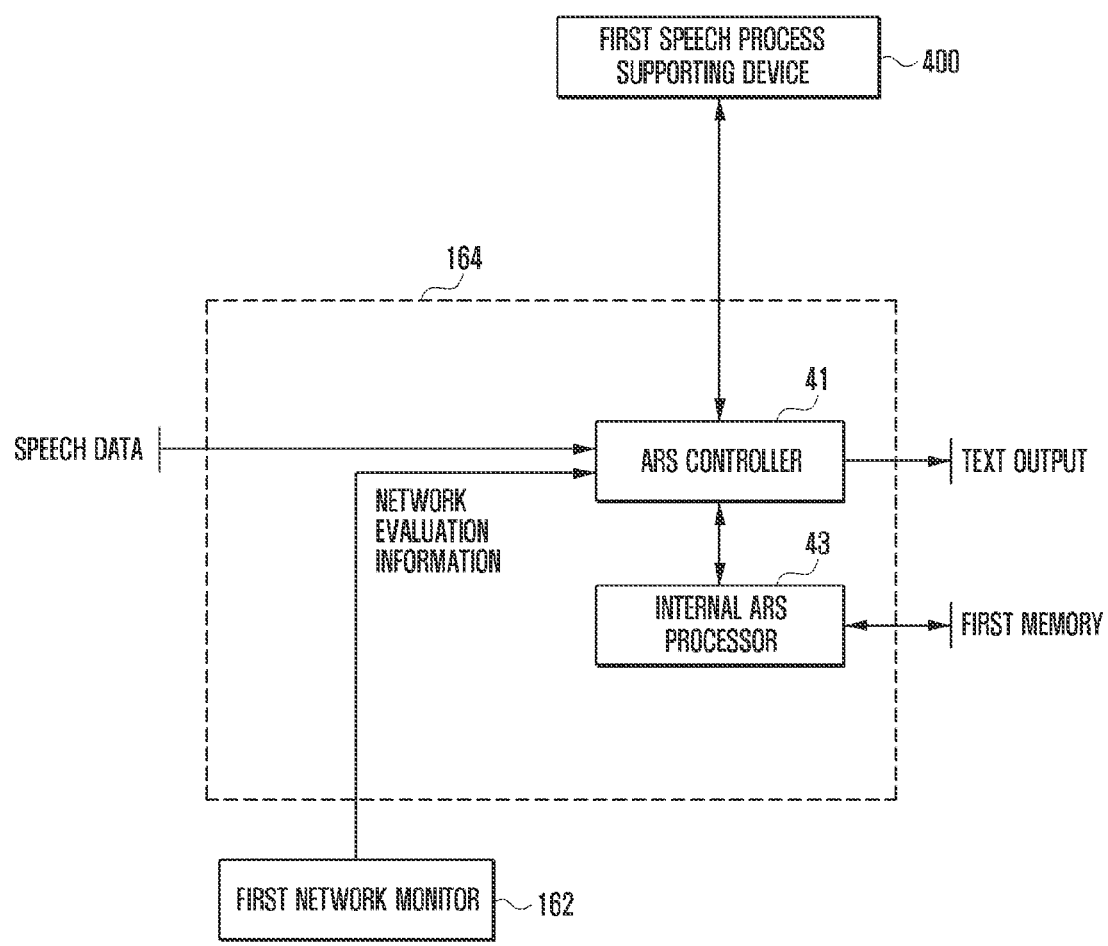
FIG. 4 is a block diagram illustrating a configuration of a first Speech To Text (STT) manager among a configuration of a first controller according to the first exemplary embodiment of the present invention.

FIG. 4 is a block diagram illustrating a configuration of a first STT manager among a configuration of a first controller according to the first exemplary embodiment of the present invention.

Referring to FIG. 4, the first STT manager 164 may include an ARS controller 41 and an internal ASR processor 43. The ASR controller 41 controls use of the first speech process supporting device 400 of the transmission side terminal 100. If a control signal for use of the first speech process supporting device 400 is transferred from the first TTS/STT determinator 163, the ARS controller 41 transmits speech data from the first speech processor 167 to the first speech process supporting device 400 so that speech recognition may be controlled. To this end, the ASR controller 41 may control the first communication unit 110 to form a communication channel with the first speech process supporting device 400, and may transfer the speech data from the first speech processor 167 to the first speech process supporting device 400. In this case, the ARS controller 41 may control such that the speech data are transferred to the first speech process supporting device 400 through a mobile communication system as necessary. When receiving text with respect to the speech data provided from the first speech process supporting device 400, the ASR controller 41 may control such that the received text is transferred to the media synchronizer 166. Further, the ASR controller 41 may control such that the received text is transferred to the first network packing/unpacking supporter 161.

Meanwhile, the internal ARS processor 43 may control such that speech data are converted into text using a speech recognition database 153 located in a first memory 150 according to a system design or when access of the first speech process supporting device 400 is impossible. When a design scheme of a system is designed to use the internal speech recognition database 153 or access of the first speech process supporting device 400 is impossible, the internal ASR processor 43 may recognize speech data and convert the recognized speech data into text based on the speech recognition database 153 stored in the first memory 150. When the access of the first speech process supporting device 400 is impossible, a wireless environment in which the transmission side terminal 100 cannot normally form a communication channel with the first speech process supporting device 400 may be created due to a network problem between the transmission side terminal 100 and the first speech process supporting device 400 and a problem of the first speech process supporting device 400. Meanwhile, the internal ASR processor 43 may transfer the converted text to the first network packing/unpacking supporter 161 and the media synchronizer 166 as in the ASR controller 41.

The first STT manager 164 may activate both of the ASR controller 41 and the internal ASR processor 43. For example, when the speech signal is transferred from the first microphone 131 and the first speech processor 167 transfers the speech signal as speech data, the first STT manager 164 may operate both of the ASR controller 41 and the internal ASR processor 43 in order to recognize the speech data. The first STT manager 164 may transmit collected results to the reception side terminal 200 or select at least one from the collected results and transmits the selected result to the reception side terminal 200 according to operations of the ASR controller 41 and the internal ASR processor 43.

Referring back to FIG. 3, the first TTS manager 165 converts a character provided from the first text processor 168 into a speech. Further, the first TTS manager 165 may be activated under control of the first TTS/STT determinator 163 and control conversion of the character into the speech. In this case, the first TTS manager 165 may control the conversion of the character into the speech according to at least one of a phoneme unit, a word unit, a phrase unit, a sentence unit, and the like. The converted speech from the first TTS manager 165 may be transferred to at least one of the media synchronizer 166 and the first network packing/unpacking supporter 161. Meanwhile, the converted speech from the first TTS manager 165 is not transferred to the media synchronizer 166 but may be transmitted to the reception side terminal 200 through the first network packing/unpacking supporter 161. The first speech process supporting device 400 provides a service for converting a character into a speech, and may be disposed outside the transmission side terminal 100. The first TTS manager 165 may convert the character into the speech based on the speech conversion database 155 stored in the first memory 150 according to the intention of a system designer.

The media synchronizer 166 synchronizes collected signals according to a design scheme of a system. For example, the media synchronizer 166 may control at least one of synchronization of image data provided from the first video processor 169 with a speech recognized text and synchronization of speech data provided from the first speech processor 167 with the speech recognized text during a procedure of converting the speech signal collected by the first microphone 131 into text. Further, the media synchronizer 166 may control synchronization of a speech obtained by converting the text from the first TTS manager 165 with a screen provided from the first video processor 169. The synchronized data of the media synchronizer 166 may be transferred to the first network packing/unpacking supporter 161. The media synchronizer 166 may include constituent elements as illustrated in FIG. 5.

Figure 5:
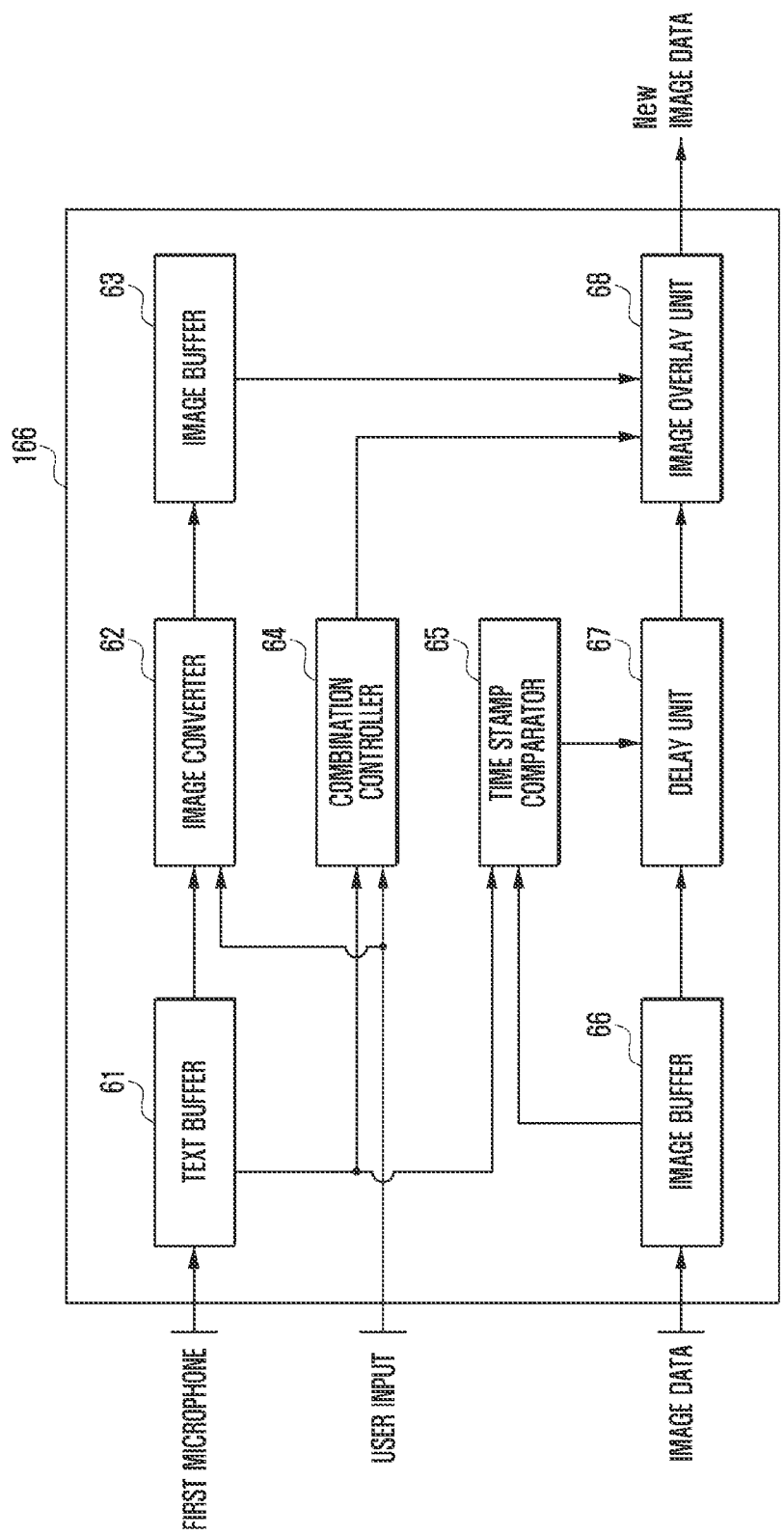
FIG. 5 is a block diagram illustrating a configuration of a media synchronizer among a configuration of a first controller according to the first exemplary embodiment of the present invention.

FIG. 5 is a block diagram illustrating a configuration of a media synchronizer among a configuration of a first controller according to the first exemplary embodiment of the present invention.

Referring to FIG. 5, the media synchronizer 166 includes a text buffer 61, an image converter 62, an image buffer 63, a combination controller 64, a time stamp comparator 65, an image buffer 66, and a delay unit 67, The media synchronizer 166 may selectively include an image overlay unit 68.

The text buffer 61 buffers the text provided from the first STT manager 164. In this case, the text buffer 61 may buffer the text provided from the STT manager 164 for predetermined amount. For example, the text buffer 61 may buffer the text provided from the first STT manager 164 in one of the word unit, a phrase unit, a sentence unit, and the like. The text buffer 61 buffers the text and transfers a corresponding text to the image converter 62 after a preset time elapsed or under control of a combination controller 64. In addition, the text buffer 61 requests time information of text buffering and speech recognition to the first speech process supporting device 400, and transfers at least one of time information taken to receive a corresponding text and time information taken to convert the speech into the text based on the speech recognition database 153 to the combination controller 64 and the time stamp comparator 65.

The image converter 62 converts the text provided from the text buffer 61 into an image or a caption, or inserts the text into a specific image. The image converter 62 converts the received text into an image and transfer the image into the image buffer 63. The image converter 62 may convert the receive text into caption information, and transfer the caption information to the image buffer 63. In addition, the image converter 62 integrates the received text with at least some, for example, a background image of images collected by the first video processor 169 to generate an image in which the text is written, and transfer the generated image to the image buffer 63. The image converter 62 may write the received text in a transparent layer, and may transfer an image corresponding to the transparent layer to the image buffer 63.

The image buffer 63 buffers before transmitting a text related image provided from the image converter 62. The text related image buffered by the image buffer 63 may be transferred to a first network packing/unpacking supporter 161 or the image overlay unit 68.

The combination controller 64 controls synchronization and transmission of the speech recognized text with information to be transmitted to the reception side terminal 200, for example, an image provided from the first video processor 169. The combination controller 64 determines whether there is a user option setting or default setting with respect to an STT service being text providing service based on speech recognition from the first input unit 120 and a first display unit 140 having an input function. When a corresponding setting is activated, the combination controller 64 may control the image converter 62 to convert the speech recognized text into the image. The combination controller 64 may control the image overlay unit 68 to overlay the text related image with an image collected by the first video processor 169. For example, when a providing service of the speech recognized text according to exemplary embodiments of the present invention is inactivated, the combination controller 64 may control the image overlay unit 68 to transmit an image collected by the first video processor 169 or an image according to user setting or schedule setting to the reception side terminal 200 without separately overlaying a text related image.

The time stamp comparator 65 compares a time stamp of time information taken to convert collected speech signal by the first microphone 131 from the text buffer 61 with a time stamp of time information taken to buffer a corresponding text. To this end, a first controller 160 of the transmission side terminal 100 may allocate time stamps to a time point when the first video processor 169 collects a specific image and a time point when the first microphone 131 collects a speech signal. As a result, the speech recognized text which the first STT manager 164 transfers to the media synchronizer 166 includes time stamp information in which a speech signal corresponding to the text is collected. The time stamp comparator 65 may receive a time stamp with respect to an image buffered from the image buffer 66, and may control the delay unit 67 so that information having the same time stamp corresponds to each other.

The image buffer 66 buffers the image data processed by the first video processor 169. The image data received by the image buffer 66 may include time stamp information of a time point which a corresponding image is collected. The image buffer 66 may transfer time stamp information of a corresponding image to the time stamp comparator 65 and transfer buffered image data to the delay unit 67.

The delay unit 67 delays image data provided from the image buffer 66 under control of the time stamp comparator 65. Because transfer speed of image data processed by the first video processor 169 through the image buffer 66 may be greater than reception speed of the speech recognized text through the first speech process supporting device 400, the delay unit 67 may delay transfer of the image data corresponding to a corresponding time difference. When a difference in time stamps between the buffered text from the text buffer 61 and the buffered image data from the image buffer 66 is equal to or greater than a preset value, the delay unit 67 releases additional delay of the image data and transfers corresponding image data to the image overlay unit 68. Accordingly, although the buffered text is different from the buffer image data, image data including the same text related image may be transferred to the reception side terminal 200. When the same text related image must be transferred, the transmission side terminal 100 may not transfer a corresponding text related image but may transfer corresponding image data including information indicating that the same text related image must be inserted to the reception side terminal 200 under control of the combination controller 64. When the same text related image must be transmitted under control of the combination controller 64, the transmission side terminal 100 may not overlay a text related image without providing separate information.

The image overlay unit 68 integrates image data provided from the delay unit 67 with the text related image provided from the image buffer 63. In this case, the image overlay unit 68 may overlay the text related image on the image data to configure a combination image frame, and transfer the combination image frame to the first network packing/unpacking supporter 161. Accordingly, the combination image frame may include an image layer and a text layer. When the text related image is captioned, the image overlay unit 68 may write the image in the image data as caption information to configure an image frame, and may transfer a corresponding image frame to the first network packing/unpacking supporter 161. The image overlay unit 68 may combines the text related image with the image data as one image. For example, the image overlay unit 68 may allocate a text related image region to a predetermined region of image data, substitutes image data of a corresponding region by the text related image or process the image data on the image data region so that the text may be identified, thereby generating an image frame. The image overlay unit 68 may transfer the combination image frame to the first network packing/unpacking supporter 161.

The foregoing exemplary embodiment of the present invention has illustrated that the text related image is combined with the image data and the combination data are transferred to the first packing/unpacking supporter 161. However, exemplary embodiments of the present invention are not limited thereto. For example, the combination of the foregoing text related image and the image data may be achieved by the first network packing/unpacking supporter 161, and respective data may be individually transmitted to the reception side terminal 200 without a separate combination. Then, the reception side terminal 200 may control the second display unit 240 to output the received text related image and the image data. In this case, the reception side terminal 200 may receive time stamp information with the text related image and the image data, and control synchronization of the text related image and the image data based on the time stamp information. In this case, a configuration of the image overlay unit 68 may be omitted from the configuration of the transmission side terminal 100.

Hereinafter, an operation of the media synchronizer 166 according to an exemplary embodiment of the present invention will be described in detail with reference to FIG. 6.

Figure 6:
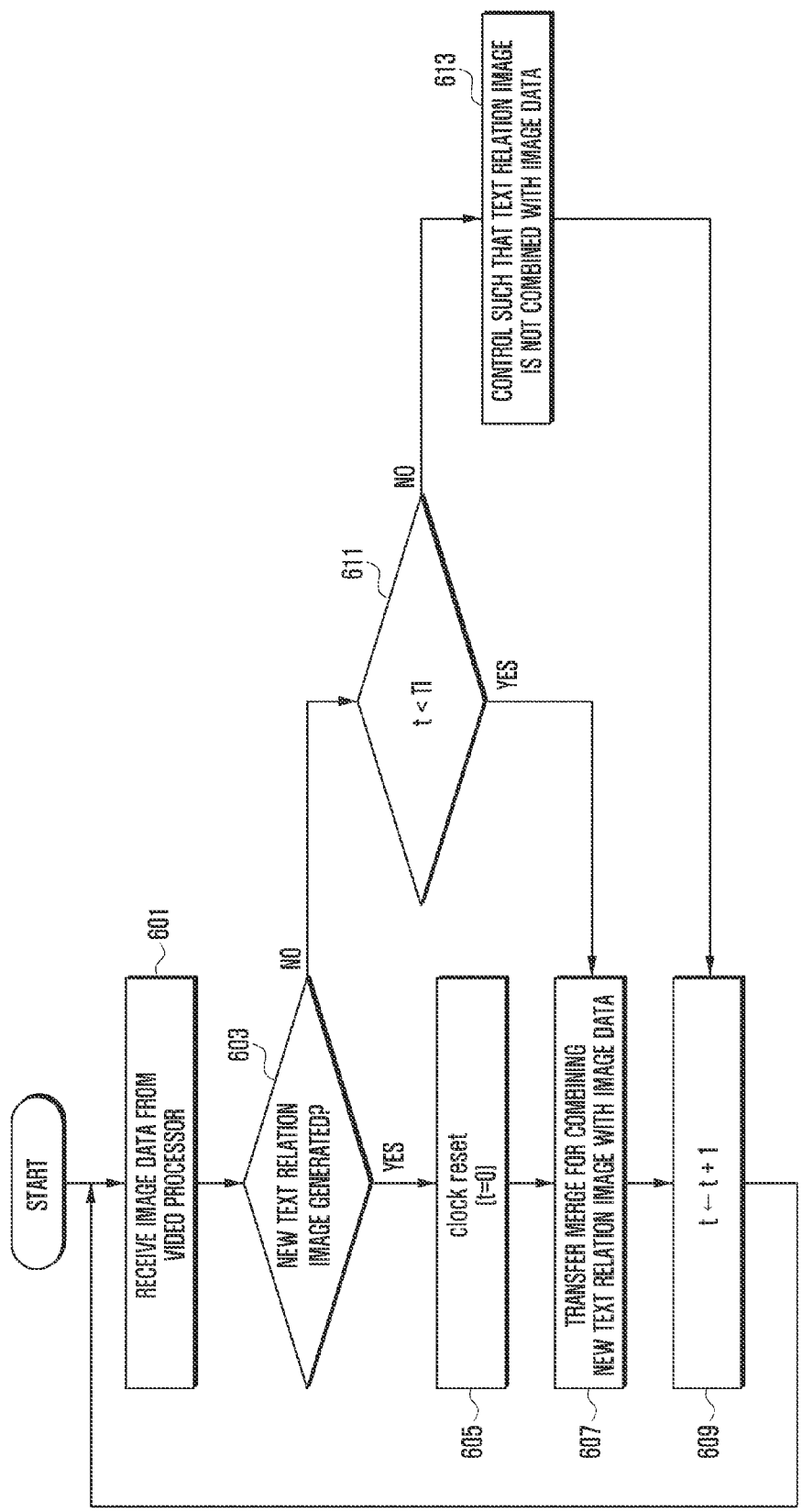
FIG. 6 is a flowchart illustrating a procedure of combining text with image data according to the first exemplary embodiment of the present invention.

FIG. 6 is a flowchart illustrating a procedure of combining text with image data according to the first exemplary embodiment of the present invention.

Referring to FIG. 6, in a media synchronizing procedure of the transmission side terminal 100 according to exemplary embodiments of the present invention, a media synchronizer 166 may receive an image frame from a first video processor 169 in step 601. Then, a combination controller 64 may determine whether a new text related image is generated in step 603. For example, the image converter 62 converts text provided from a first STT manager 164 into an image frame. In this procedure, the combination controller 64 receives conversion to the image frame from the text buffer 61 and may perform step 603.

When the new text related image is generated at step 603, the combination controller 64 may reset (e.g., set t=0) a previous arranged timer in step 605. The combination controller 64 may transfer a command for combining the new text related image with the image data to the image overlay unit 68 in step 607. Simultaneously, the combination controller 64 may control such that the new text related image stored in the image buffer 63 to the image overlay unit 68. Next, the combination controller 64 increase a time t of the timer (e.g., t←t+1) in step 609, and returns to step 601.

When the new text related image is not generated at step 603, the combination controller 64 determines whether a current time of a timer is greater than a preset time Ti in step 611. When the current time of a timer is greater than the preset time Ti, the combination controller 64 may control such that the text related image is not combined with the image data in step 613. For example, the combination controller 64 may integrate the same text related image with image data for a predetermined time before a new text related image is generated with respect to the image data. When a predetermined time elapses, the combination controller 64 stops use of the corresponding text related image and control such that the corresponding text related image is removed from a buffer. Next, the combination controller 64 goes to step 609 and repeats the foregoing procedures.

In contrast, when the current time of a timer is less than preset time Ti, the combination controller may proceed to step 607 in which the combination controller 64 may transfer a command for combining the new text related image with the image data to the image overlay unit 68.

As described above, the transmission side terminal 100 according to the exemplary embodiment of the present invention may convert the speech recognized text into an image, and integrate the same text related image with a plurality of image data for a predetermined time during a procedure of combining the image with the image data. In this case, in a case in which the new text related image is generated, if a preset text output minimum time elapses, information due to the newly generated text related image may be rapidly transferred by combining the new text related image with new image data. Meanwhile, although the foregoing exemplary embodiment of the present invention has illustrated that the first video processor 169 processes and provides an image collected by the first camera 170, a specific image stored in the first memory 150 may be substituted for an image signal of the first camera 170 in order to provide a separate text related image in addition to the image collected by the first camera 170. The substitution function of the image signal may be operated by the transmission side terminal 100 having no first camera 170. Although there is the first camera 170, the substitution function of the image signal may be used in a situation in which the first camera 170 is not operated, for example, in a communication service environment in which an image call is not performed.

Meanwhile, referring back to FIG. 3, the first TTS/STT determinator 163 may determine to operate at least one of an STT service and a TTS service according to a user option, a measured noise value around the reception side terminal 200 received from the reception side terminal 200, or network evaluation of the first network monitor 162. To this end, the first TTS/STT determinator 163 may receive information including a packet loss rate and a delay degree associated with the network evaluation from the first network monitor 162. Further, the first TTS/STT determinator 163 may receive noise information provided from the reception side terminal 200 from the first network packing/unpacking supporter 161. In addition, the first TTS/STT determinator 163 may determine at least one of a TTS service and an STT service based on information according to evaluation of a peripheral environment of the transmission side terminal 100. The information according to evaluation of the peripheral environment may include at least one of peripheral temperature information, peripheral illumination information, peripheral noise information, moving information, location information collected by various sensors and a first microphone 131 included in the transmission side terminal 100. As a result, the first TTS/STT determinator 163 may determine presence of execution of the TTS service or an STT service according to a zone where the transmission side terminal 100 is located or times, a noise detected at a periphery, moving speed or a moving environment. Determination of presence of execution of the service may be performed based on information provided from the reception side terminal 200.

For example, although the foregoing exemplary embodiment of the present invention has illustrated that the reception side terminal 200 transmits only noise information detected at a periphery, the reception side terminal 200 includes various sensors, and may collect location information, moving speed, a moving direction, and information with respect to a moving zone of the reception side terminal 200, and time information of a zone where the reception side terminal 200 is located. When the information collected by the reception side terminal 200 exceeds a reference value set in order to operate a preset TTS service or STT service, the first TTS/STT determinator 163 may control to operate the TTS service or the STT service based on the foregoing information and a preset reference value. The comparison of the reference value may be performed by the first TTS/STT determinator 163, but may be performed by the reception side terminal 200. When the comparison of the reference value is performed by the reception side terminal 200 may receive a message requesting an operation of the TTS service or the STT service according to the comparison of the reference value from the reception side terminal 200. The first TTS/STT determinator 163 may include constituent elements as illustrated in FIG. 7.

Figure 7:
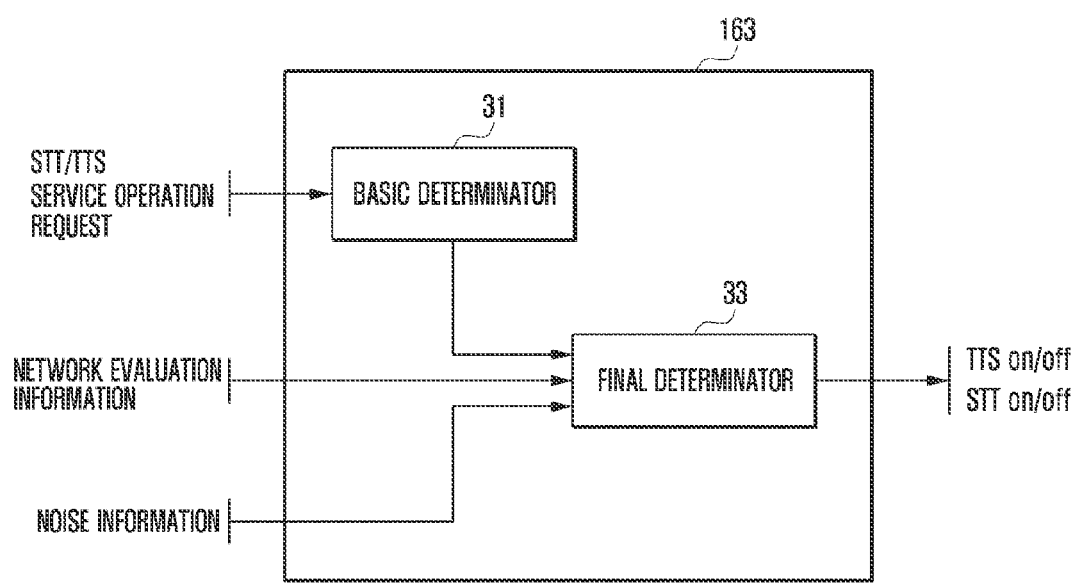
FIG. 7 is a block diagram illustrating a configuration of a first Text To Speech (TTS)/STT determinator among a configuration of a first controller according to the first exemplary embodiment of the present invention in detail.

FIG. 7 is a block diagram illustrating a configuration of a first TTS/STT determinator among a configuration of a first controller according to the first exemplary embodiment of the present invention.

Referring to FIG. 7, the first TTS/STT determinator 163 may include a basic determinator 31 and a final determinator 33.

The basic determinator 31 may receive a communication service selection signal of the transmission side terminal 100, for example, a speech call selection signal by the transmission side terminal 100 user or a speech recognition based text providing service selection signal according to the exemplary embodiment of the present invention from the first input unit 120 and a first display unit 140 having an input function. Further, the basic determinator 31 may receive another type of a communication service to be communicated between a user of the transmission side terminal 100 and a user of the reception side terminal 200, for example, a signal selecting an image call service or a chatting service. In addition, the basic determinator 31 may confirm a signal with respect to a type of a communication service which the user of the reception side terminal 200 responds according to a communication service connection request of a user of the transmission side terminal 100. The basic determinator 31 may determine a type of a communication service to be operated by the transmission side terminal 100 according to various selection signals. The determined information may be transferred to the final determinator 33.

The final determinator 33 finally determines a type of a communication service to be operated by the transmission side terminal 100 based on information provided from the basic determinator 31 and other information. For example, the final determinator 33 may control such that a type of a communication service selected according to other information is converted into another type or is limited based on an operation of a type of the communication service provided from the basic determinator 31. The other information may include at least one of packet loss information of a network, network evaluation information with delay information of the network, peripheral noise information of the reception side terminal 200 provided from the reception side terminal 200, peripheral noise information of the transmission side terminal 100, and the like. The network evaluation information may include at least one of a communication network between the transmission side terminal 100 and the reception side terminal 200, a communication network between the transmission side terminal 100 and the first speech process supporting device 400, and a communication network between the reception side terminal 200 and the second speech process supporting device 500. The final determinator 33 by which type is provided in any communication service based on the foregoing information. For example, the final determinator 33 may perform at least one of activation or inactivation control of the STT service, and activation or inactivation control of the TTS service.

Referring back to FIG. 3, a first network monitor 162 receives network related information from a first network packing/unpacking supporter 161. The network monitor 162 may collect information with respect to a current network state based on corresponding network related information. For example, the first network monitor 162 may collect information with respect to a packet loss rate in a current network state, a packet transfer delay degree or transfer speed in the current network state. The first network monitor 162 may provide collected information to the first TTS/STT determinator 136. The first network monitor 162 may transceive a preset test signal with the reception side terminal 200 through the first network packing/unpacking support 161 in order to collect the foregoing information. Next, the first network monitor 162 compares a received test signal with a transferred test signal to evaluate a network. In this case, the first network monitor 162 may evaluate a network with the reception side terminal 200 as well as a network with the first speech process supporting device 400. A network evaluation result collected from the first network monitor 162 may be transmitted to the reception side terminal 200. In addition, the first network monitor 162 substitutes speech data or image data transceived after formation of a communication service channel with the reception side terminal 200 by a test signal to evaluate the network without using a separate test signal.

The first network packing/unpacking supporter 161 may control activation of the first communication unit 110 and form a specific communication service channel with the reception side terminal 200 through the first communication unit 110. The first network packing/unpacking supporter 161 may pack speech data, text, and a speech recognized text provided from the first STT manager 164 and transfer the packed data to the reception side terminal 200 through the first communication unit 110. Further, the first network packing/unpacking supporter 161 may pack text provided from the first TTS manager 165 and speech data obtained by converting the text, and transfer the packed text or data to the reception side terminal 200. The network packing/unpacking supporter 161 may pack an image frame provided from the media synchronizer 166. In this case, the image frame packed by the first network packing/unpacking supporter 161 may include at least one of image data processed by the first video processor 169 and image data combined with a text related image provided from the first STT manager 164 according to a type of a currently provided communication service. The first network packing/unpacking supporter 161 performs a function of unpacking a signal received from the reception side terminal 200 through the first communication unit 110. For example, the first network packing/unpacking supporter 161 may confirm noise information provided the reception side terminal 200 among data received from the first communication unit 110, and may provide the confirmed noise information to the first TTS/STT determinator 163. Further, the first network packing/unpacking supporter 161 may confirm speech data and text of the reception side terminal 200 provided from the reception side terminal 200 and transfer the speech data and text to the first TTS/STT determinator 163.

The first network packing/unpacking supporter 161 may transfer a preset test signal to a reception side terminal or a test signal provided from the reception side terminal 200 to the first network monitor 162 in order to evaluate the network of the first network monitor 162.

As described above, the transmission side terminal 100 according to the first exemplary embodiment of the present invention may adaptively operate at least one of the STT service and the TTS service according to a user request, terminal setting, peripheral environment information or network information. The transmission side terminal 100 according to the first exemplary embodiment of the present invention may support the STT service and the TTS service based on an image call service screen and a chatting service screen so that a composite operation with other communication services is possible.

Referring back to FIG. 2, the reception side terminal 200 may include a second communication unit 210, a second input unit 220, a second microphone 231, a second speaker 233, a second display unit 240, a second memory 250, a second display unit 240, a second controller 260, and a second camera 270.

The reception side terminal 200 having a construction mentioned above connects a corresponding communication service according to a communication service connection request of the transmission side terminal 100 and a user operation corresponding to input/output modes determined by the user. The input/output modes determined by the user may be a mode according to determination of operating at least one of the STT service and the TTS service. In this case, the reception side terminal 200 may request to operate the STT service and the TTS service according to a specific communication service scheme from the user request to the transmission side terminal 100. For example, when the transmission side terminal 100 requests the speech call service connection, the reception side terminal 200 may request to the transmission side terminal 100 so that the transmission side terminal 100 uses a speech recognition based text service as a reception function and uses a transmission service or a TTS service as a transmission function. Next, when the transmission side terminal 100 accepts a corresponding request, the reception side terminal 200 may support data processing and transception necessary for a call service based on a requested scheme.

To this end, the second communication unit 210 may form a communication channel with a first communication unit with the first communication unit 110 of the transmission side terminal 100. The second communication unit 210 may include a communication module equal to the first communication unit 110 and a communication module capable of forming a communication channel with the first communication unit 110. For example, the second communication unit 210 may be a mobile communication module. In this case, the second communication unit 210 may form a communication channel with the first communication unit 110 through a base station. The communication channel formed by the second communication unit 210 may include a service support channel obtained by combining a text related image with image data supporting a speech call service channel, an image call service channel, and a character service channel. The second communication unit 210 may form a chatting service channel with the first communication unit 110. The second communication unit 210 may further form at least one of the foregoing speech call service channel, the image call service channel, the character service channel together with formation of the chatting service channel or transceive at least one of speech data, image data, and text based on the chatting service channel. The second communication unit 210 may form a channel for supporting an STT service which outputs speech data as text based on the image call service channel.

The second input unit 220 generates an input signal necessary to operate the reception side terminal 200. The second input unit 220 may include various keys such as a key button, a side key, a menu key, a home key, and the like. The second input unit 220 may be provided as a second display unit 240 including a touch panel and a touch map displayed on a display panel. When a communication service connection request is received, the second input unit 220 generates an input unit for rejecting or accepting a corresponding communication service connection, an input signal for operating a communication service which the transmission side terminal 100 requests according to connection of the communication service in response to the acceptance, an input signal requesting communication service connection of a scheme other than a communication service scheme requested by the transmission side terminal 100 according to user setting or control of the controller 260, and an input signal for operating a corresponding communication service according to connection of a communication service of the other selected scheme according to user control. The communication service scheme may include at least one of an STT service support scheme and a TTS service support scheme, and the STT service and the TTS service may be performed together with various communication schemes such as a speech call, an image call, and chatting. In addition, the second input unit 220 may generate an input signal for communication service connection release or termination according to user control.

The second microphone 231 collects an audio signal of the reception side terminal 200. The second microphone 231 may collect a speech signal of the reception side terminal 200 user and transfer the speech signal to the second controller 260. Meanwhile, the second microphone 231 may collect and transfer peripheral audio signals in order to collect noise information under control of the second controller 260. While the speech call service is being operated, the second microphone 231 may be activated. As described above, in order to collect the noise information, although a separate speech call service is not operated, the second microphone 231 may be activated and collect a peripheral audio signal of the reception side terminal 200 for a preset time. When at least one of the chatting service channel and the image call service channel is operated, the second microphone 231 may be activate to further support a speech call service or perform a speech recognition based text providing service.

The second speaker 233 outputs an audio signal of the reception side terminal 200. The second speaker 233 may support output of an audio signal according to playback of an audio file of the reception side terminal 200, and output of an audio signal received by the second communication unit 210. Particularly, when the specific communication service is operated, the second speaker 233 is activated under control of the second controller 260 and outputs an audio signal. The second speaker 233 may output an audio signal according to selection of a specific communication service. For example, while operating a speech call service or an image call service with the transmission side terminal 100, the second speaker 233 is activated and outputs an audio signal provided from the transmission side terminal 100. While operating a function of receiving a speech recognition based text providing service with the transmission side terminal 100, even if the image call service is operated, the second speaker 233 may stop output of a separate audio signal. Further, when the TTS service is being supported, the second speaker 233 may output a speech signal corresponding to text input by a user of the transmission side terminal 100.

The second camera 270 supports an image call service of the reception side terminal 200 to collect an image of a subject. To this end, the second camera 270 may include a camera for supporting an image call service and a camera for collecting an image of the subject. Meanwhile, the second camera 270 may be activated according to selection of a communication service by the user of the reception side terminal 200. The image collected by the second camera 270 may be transmitted to the transmission side terminal 100 through the second communication unit 210. When the reception side terminal does not support a separate image call service, the camera 270 may be omitted.

The second memory 250 may include various application programs necessary to operate the reception side terminal 200 and an operating system for supporting a basic operation. The second memory 250 may include respective constituent elements stored in the first memory 150, for example, a speech recognition database, a speech conversion database, and reference values similar to the transmission side terminal Particularly, the second memory 250 may store a separate speech recognition database equal to or different from a speech recognition database 153 in the first memory 150. The speech recognition database stored in the second memory 250 may be information specified to a user of the reception side terminal 200. For example, the speech recognition database stored in the second memory 250 may be information for converting speech data of the reception side terminal 200 user into text data.

The second display unit 240 provides various screens necessary to operate the reception side terminal 200. Further, the second display unit 240 may be provided to support an input function. To this end, the second display unit 240 may include an overlapped configuration between a touch panel and a display panel. The second display unit 240 may output a screen reporting a communication service connection request of the transmission side terminal 100, a screen capable of selection one of types of communication services connected to the transmission side terminal 100, and a screen operated according to selection of the user or a type of a specific communication service set with default. Examples of a screen of the reception side terminal 200 provided through the second display unit 240 will be described in detail with reference to following drawings.

The second controller 260 controls, processes, and transfers signals necessary to operate the reception side terminal 200. The second controller 260 may support power supply of the reception side terminal 200, entering a sleep mode, and transfer and process of various signals necessary to operate a communication service. The second controller 260 may include constituent elements as illustrated in FIG. 8.

Figure 8:
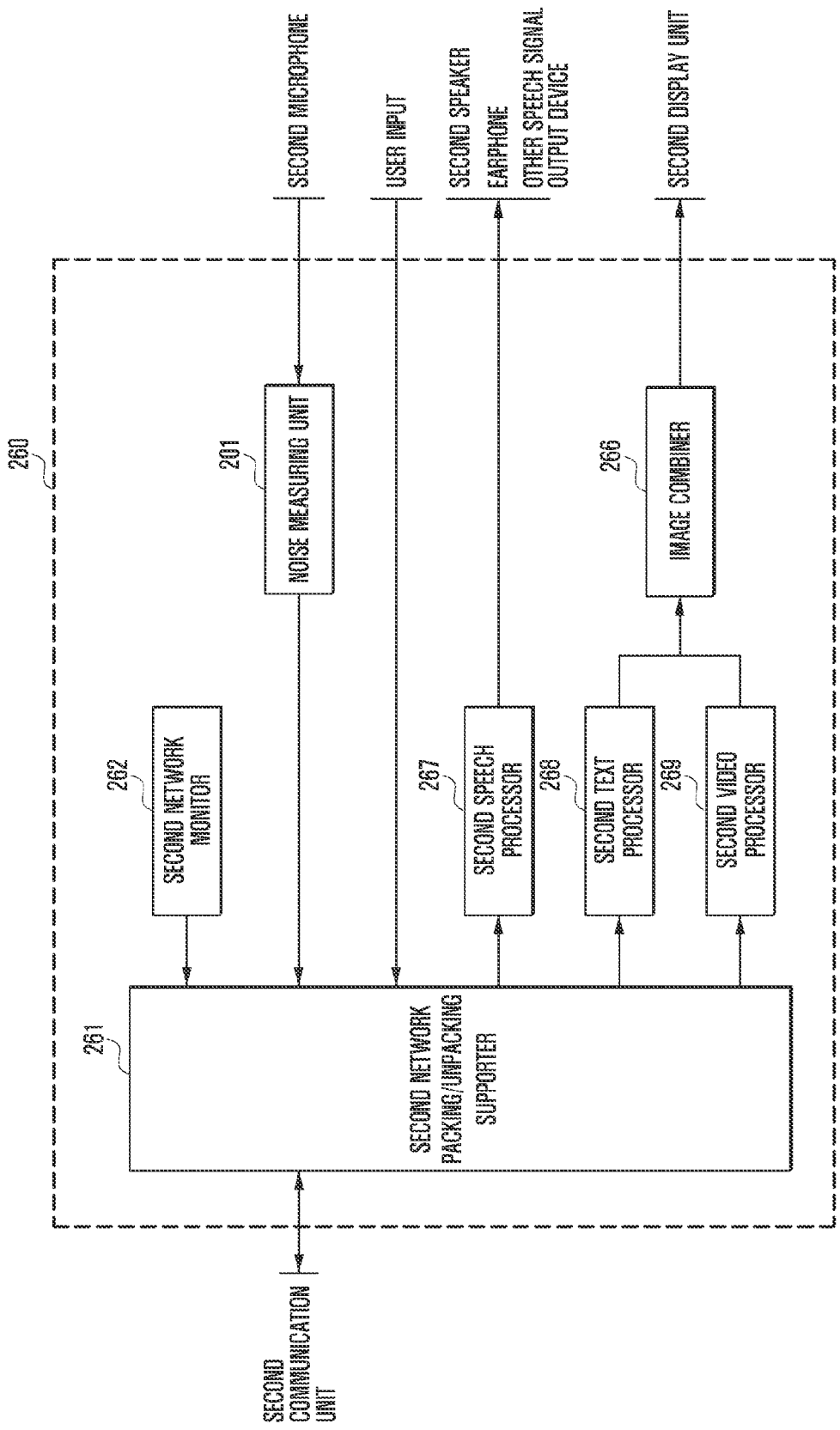
FIG. 8 is a block diagram illustrating a configuration of a second controller of a reception side terminal according to the first exemplary embodiment of the present invention.

FIG. 8 is a block diagram illustrating a configuration of a second controller of a reception side terminal according to the first exemplary embodiment of the present invention.

Referring to FIG. 8, the second controller 260 may include a noise measuring unit 201, a second network packing/unpacking supporter 261, a second network monitor 262, an image combiner 266, a second speech processor 267, a second text processor 268, and a second video processor 269.

The second network packing/unpacking supporter 261 unpacks a signal of a transmission side terminal 100 received through the second communication unit 210, and transfers the packed signal to at least one of the second network monitor 261, the second speech processor 267, the second text processor 268, and the second video processor 269. When a test signal associated with network evaluation among the received signals is received, the second network packing/unpacking supporter 261 may transfer the received test single to the second network monitor 262. The second network packing/unpacking supporter 261 may transfer a speech signal among the received signals to the second speech processor 267, and transfer text to the second text processor 268. When image data corresponding to an image frame are included in the received signal, the second network packing/unpacking supporter 261 may transfer corresponding image data to the second video processor 269.

Meanwhile, when a speech recognized text and image data among the received signals are separately received, the second network packing/unpacking supporter 261 may transfer the speech recognized text and the image data to the second text processor 268 and the second video processor 269, respectively. Substantially, the second network packing/unpacking supporter 261 forms a separate text service channel for transferring the speech recognized text and a separate image service channel for transmitting image data. If the foregoing signals are received through corresponding service channels, the second network packing/unpacking supporter 261 may transfer the speech recognized text and the image data to the second text processor 268 and the second video processor 269. When the speech recognized text is included in the image data, the second network packing/unpacking supporter 261 may transfer corresponding image data to the second video processor 269.

The second network monitor 262 may receive a test signal from the second network packing/unpacking supporter 261, and evaluate a network based on the received test signal. The test signal may be a preset signal provided from the transmission side terminal 100 or a return signal responding to a signal which the reception side terminal 200 transmits to the transmission side terminal 100. The network monitor 262 may confirm a packet loss rate between the transmission side terminal 100 and the reception side terminal 200 and a packet transmission delay degree in a network based on the test signal. The second network monitor 262 may user the foregoing signals in order to evaluate a network between the second network monitor 262 and the second speech process supporting device 500. For example, the second network monitor 262 transfers the test signal to the second speech process supporting device 500 so that a network state between the second speech process supporting device 500 and the reception side terminal 200 may be confirmed. Information with respect to the network state with the second speech process supporting device 500 may be transmitted to the transmission side terminal 100.

The noise measuring unit 201 measures a peripheral noise signal of the reception side terminal 200. The noise measuring unit 201 may confirm how much noise component is included in the audio signal provided from the second microphone 231. In particular, when communication service connection of the transmission side terminal 100 is requested, the noise measuring unit 201 may activate the second microphone 231 and detect a noise degree of a signal collected by the second microphone 231. The noise measuring unit 201 may transfer the measured noise information to the transmission side terminal 100 through the second network packing/unpacking supporter 261. The noise measuring unit 201 may control to automatically activate a specific communication service, for example, an STT service transmission function recognizing a speech signal and transmitting text according to measured noise information. In this procedure, the noise measuring unit 201 may perform a filtering procedure for removing a noise and recognize the filtered speech signal in order to improve a recognition rate of speech recognition.

If an image frame is transferred from the second network packing/unpacking supporter 261, the second speech processor 267 decodes the image frame. To this end, the second speech processor 267 may include a decoding module for processing a speech. The image frame or the audio signal proceed by the second speech processor 267 may be transferred through the second speaker 233 according to a type of a communication service. When an earphone is connected, an audio signal processed by the second speech processor 267 may be transferred to another output device through the earphone or a near field communication module.

The second text processor 268 processes text received from the second network packing/unpacking supporter 261. The text processed by the second text processor 268 may be transferred to the image combiner 266. The second video processor 269 processes image data received from the second network packing/unpacking supporter 261. For example, the second video processor 269 may include a decoding module for decoding image data. The image data decoded by the second video processor 269 may be transferred to the image combiner 266.

The image combiner 266 combines text received from the second text processor 268 with image data from the second video processor 269. In this case, the image combiner 266 combines corresponding signals by synchronizing the signals, and may output a combined image through the second display unit 240. To this end, the image combiner 266 may confirm time stamps included in each data and may combine the text with the image data so that the time stamps correspond to each other.

In the foregoing description, the reception side terminal 200 may collect peripheral environment information other than noise information as information for determining to operate at least one of an STT service and a TTS service. To this end, as illustrated above, the reception side terminal 200 may include various sensors. Information collected using each sensor may be compared with a reference value for operating at least one of an STT service and a TTS service such as noise information.

As described above, the foregoing exemplary embodiment of the present invention has illustrated that the system for operating a communication service generates text through speech recognition using the first speech process supporting device 400 and transmits the text to the reception side terminal 200 by way of example.

Hereinafter, the operation screens of terminals will be described in detail.

Figure 9:
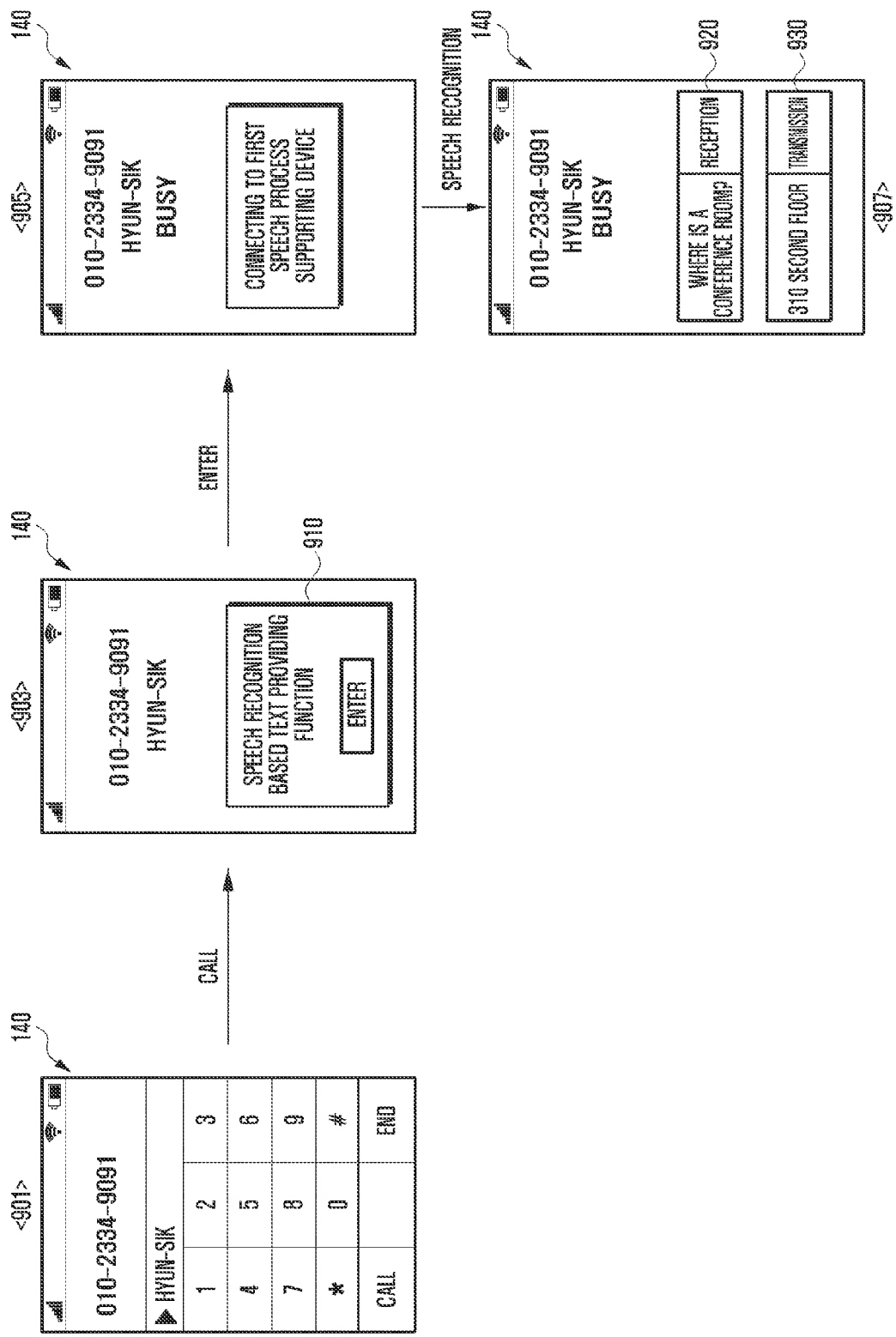
FIG. 9 is a diagram illustrating an example of a screen interface of a transmission side terminal according to the first exemplary embodiment of the present invention.

FIG. 9 is a diagram illustrating an example of a screen interface of a transmission side terminal according to the first exemplary embodiment of the present invention. For example, FIG. 9 is a diagram illustrating a screen interface for operating a communication service.

Referring to FIG. 9 a diagram illustrating a screen interface for operating a speech recognition function of a transmission side terminal according to the first exemplary embodiment of the present invention is provided.

Referring to FIG. 9, the transmission side terminal 100 may output an input screen for inputting a phone number as illustrated in a picture 901 according to a user request. When the phone number of the reception side terminal 200 is registered, the transmission side terminal 100 may output a phone book information picture on a first display unit 140 according to user control. Meanwhile, the user may input the phone number of the reception side terminal 200 using the picture 901. The input phone number may be output to a predetermined region of a picture as shown.

If an input signal for "call" connection is generated after input of the phone number, a picture for connection of a communication service with the reception side terminal 200 corresponding to the input phone number may be output as illustrated in a screen 903. In this procedure, the transmission side terminal 100 activates the first communication unit 110 for connection of a communication service with the reception side terminal 200, a call connection request message may be transferred to the reception side terminal 200 through a base station provided to support the communication service. Meanwhile, the first display unit 140 of the transmission side terminal 100 may output a first pop-up window 910 for confirming whether to select activation of an STT service which is speech recognition based text providing function.

When the user of the transmission side terminal 100 selects activation of an STT service through the first pop-up window 910, the transmission side terminal 100 may connect the first speech process supporting device 400 for supporting an STT service as illustrated in a picture 905. During this procedure, the transmission side terminal 100 may access the first speech process supporting device 400 using previously stored address information of the first speech process supporting device 400 for connection with the first speech process supporting device 400. In this case, the transmission side terminal 100 may connect with the first speech process supporting device 400 through a communication system 300.

If the connection of the first speech process supporting device 400 is completed, the transmission side terminal 100 may transfer a speech signal collected by the first microphone 131 to the first speech process supporting device 400. Then, the transmission terminal 100 may receive text corresponding to speech data received from the first speech process supporting device 400. In this case, the received text may be again transferred to the reception side terminal 200 through the communication system 300. Further, the received text may be output to a transmission text region 930 separately provided at one side of the display unit 140 as illustrated in a picture 907. Meanwhile, the transmission side terminal 100 may output text provided from the reception side terminal 200 to a reception text region 920. The transmission side terminal 100 may control such that a transmission text region 930 outputting a speech recognized text is not output to the first display unit 140.

At least one of the transmission side terminal 100 and the reception side terminal 200 requests so that the TTS service is activated. When the user of the transmission side terminal 100 accepts an operation of the TTS service or the TTS service is set to be operated with default, text provided from the reception side terminal 200 is converted into speech data and a speech signal so that the speech data and the speech signal may be output through a first speaker 133. In this case, a procedure of converting the text into the speech data may include at least one of a procedure of converting the text into the speech data and transferring the speech data by the reception side terminal 200 and a procedure of converting the text into the speech data and transferring the speech data by the transmission side terminal 100.

Meanwhile, the foregoing exemplary embodiment of the present invention has illustrated that presence of execution of the STT service is selected after input of the phone number of the reception side terminal 200, but a picture 901 may be preferentially output according to selection of presence of execution of the STT service. To this end, the transmission side terminal 100 provides a picture capable of selecting activation of the STT service. If a corresponding item is selected, after output of a picture 901, the transmission side terminal 100 does not support output of a picture 903 but may enter a picture 905. Meanwhile, although the foregoing exemplary embodiment of the present invention has illustrated that the transmission side terminal 100 may select an operation of an STT service through the first pop-up window 910, the first pop-up window 910 may be provided so that at least one of an STT service and a TTS service is selected. Then, the user may request the reception side terminal 200 to operate at least one of the STT service and the TTS service through selection of an item output on the first pop-up window 910.

Figure 10:
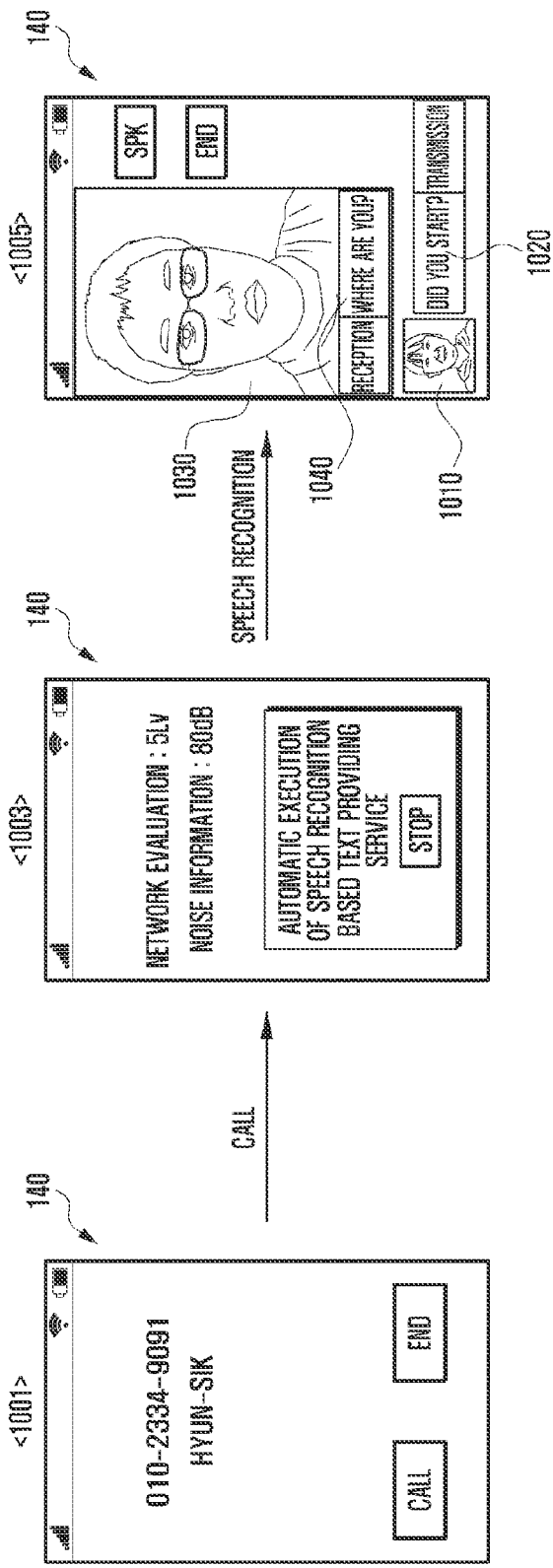
FIG. 10 is a diagram illustrating an example of a screen interface of a transmission side terminal according to the first exemplary embodiment of the present invention.

FIG. 10 is a diagram illustrating an example of a screen interface of a transmission side terminal according to the first exemplary embodiment of the present invention. For example, FIG. 10 is a diagram illustrating automatic execution or recommendation of a speech recognition based text providing service.

Referring to FIG. 10, the transmission side terminal 100 may output a picture for call connection with the reception side terminal 200 as illustrated in a picture 1001. To this end, the user may input a phone number of the reception side terminal 200 or may select phone book information corresponding to the reception side terminal 200. Then, the first display unit 140 may provide a picture for call connection with the reception side terminal 200 as shown.

During this procedure, when the user generates an input signal for "call", a first display unit 140 of the transmission side terminal 100 may output at least one of network evaluation information and noise information as a picture 1003, and may output a guide instructing automatic execution of speech recognition based text providing service. In this end, the transmission side terminal 100 may transmit a preset test signal for evaluating a network formed between the transmission side terminal 100 and the reception side terminal 200 to the communication system 300 and the reception side terminal 200 so that the test signal may feedback. Meanwhile, noise information output to the first display unit 140 may include at least one of noise information of an audio signal collected by a first microphone 131 of the transmission side terminal 100 and noise information of an audio signal collected by a second microphone 231 of the reception side terminal 200. For example, only one noise information is displayed in FIG. 10. However, the first display unit 140 may output the noise information of the transmission side terminal 100 and the noise information of the reception side terminal 200, respectively. The first display unit 140 may output only the noise information received from the reception side terminal 200.

Meanwhile, the transmission side terminal 100 may determine whether to automatically perform speech recognition based text providing service, for example, an STT service based on network evaluation information and noise information. To this end, the transmission side terminal 100 may use reference values 157 stored in the first memory 150. Further, the transmission side terminal 100 may provide so that the user may confirm automatic execution of an STT service as shown in a case of automatically performing an STT service. In this case, in the transmission side terminal 100, as shown, for user convenience for stopping the STT service, a stop button may be provided at one side of a picture.

Meanwhile, if a speech signal is collected in the first microphone 131 in order to support the STT service, the transmission side terminal 100 may recognize a corresponding speech signal and convert the speech signal into text. In this case, the transmission side terminal 100 may use the first speech process supporting device 400 or a speech recognition database 153 stored in the first memory 150. Simultaneously, when a currently selected communication service is an image call service, the transmission side terminal 100 may control a first display unit 140 for configure a picture corresponding to an image call service as illustrated in a picture 1005. For example, the first display unit 140 may include a sender picture region 1010 and a receiver picture region. A region to which the speech recognized text information is output may be provided at a screen outputted on the display unit 140. For example, a transmission text region 1020 may be disposed adjacent to the sender picture region 1010, and a reception text region 1040 may be disposed adjacent to the receiver picture region 1030. In addition, the first display unit 140 may further display a button map for converting a speaker mode and a button map for terminating a communication service.

The foregoing exemplary embodiment of the present invention has illustrated that automatic execution conditions of an STT service include network evaluation information and noise information. However, exemplary embodiments of the present invention are not limited thereto. For example, the reception side terminal 200 may cooperate with the transmission terminal 100 to automatically perform the STT service or the TTS service according to current location information, peripheral illumination information, current time information, and moving information of the reception side terminal 200 as well as noise information. The cooperation may include signal transception between the transmission side terminal 100 and the reception side terminal 200 to operate the STT service and the TTS service.

When the current location is a location previously defined by the user or a specific location previously defined by map information, the reception side terminal 200 may automatically perform at least one of a suitable STT service and TTS service according to an environment where brightness of a display unit of a terminal such as a theater or a laboratory influences a periphery. In a case of a specific time such as a sleeping time, the reception side terminal 200 allows a user to automatically operate at least one of an STT service and a TTS service with respect to various environments such as vehicle drive or exercise training.

The reception side terminal 200 may provide a screen interface for setting so that at least one of the STT service and the TTS service is performed in the cases. The user may set an operation of a terminal with respect to respective cases through the screen interface. In addition, the reception side terminal 200 may have a function support schedule as default with respect to predetermined cases designed by a designer in the cases, and the user may adjust desired function setting by adjusting a corresponding schedule.

Figure 11:
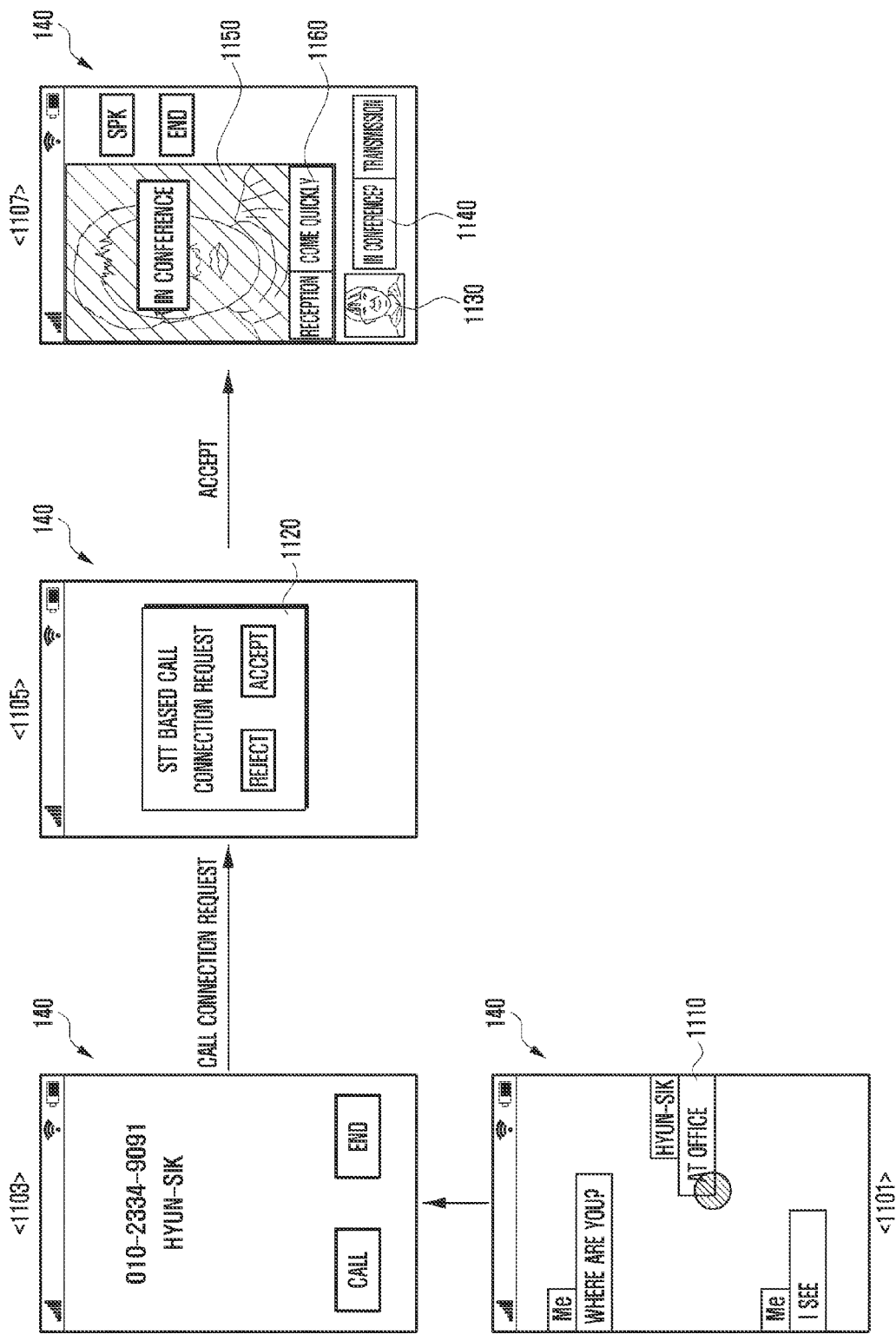
FIG. 11 is a diagram illustrating an example of a screen interface of a transmission side terminal according to the first exemplary embodiment of the present invention.

FIG. 11 is a diagram illustrating an example of a screen interface of a transmission side terminal according to the first exemplary embodiment of the present invention. For example, FIG. 11 is a diagram illustrating recognition based text providing service of a transmission side terminal according to a request from a reception side terminal.

Referring to FIG. 11, a transmission side terminal 100 and a reception side terminal 200 may firstly form a mutual chatting service channel, and transceive a chanting message through a corresponding chatting service channel. In this case, the transmission side terminal 100 may output a chatting service picture on a first display unit 140 as illustrated in a picture 1101. A result that the transmission side terminal 100 and the reception side terminal 200 transceive a schedule chatting message is illustrated in FIG. 11.

When the user selects a chatting message 1110 of the reception side terminal 200 from a corresponding picture according to a defined scheme, the picture may be converted into a picture for communication service connection of a type different from that of the reception side terminal 200, for example, image call service connection as illustrated in a picture 1103. For example, when a user of the transmission side terminal 100 long-presses a channel message 1110, continuously touches the channel message 1110 at least predetermined number of times, or generates a preset gesture, the first controller 160 may automatically collect a phone number of the reception side terminal 200 corresponding to the chatting message 1110, and outputs a picture 1103 for confirming whether to perform call connection on the display unit 140.

In this case, when the user of the transmission side terminal 100 generates an input signal for call connection request or generates a corresponding event, the transmission side terminal 100 may transfer a corresponding call connection request message to the reception side terminal 200. When the transmission side terminal 100 receives a message requesting to perform call connection as an STT function being speech recognition based text providing function from the reception side terminal 200, a picture 1105 may be output on the first display unit 140. For example, the first display unit 140 displays an STT based call connect requested by the reception side terminal 200, and may output an accept pop-up window 1120 inquiring whether to accept a corresponding call connection request.

The user of the transmission side terminal 100 accepts an STT based call connection on a picture 1105, the transmission side terminal 100 may output a picture according to an STT based call connection acceptance on the first display unit 140 as illustrated in a picture 1107. In this case, the STT based call connection acceptance picture may be output to be overlaid on a chatting service picture output on a screen 1101 or may be configured as a new picture through picture conversion. The STT based call connection acceptance picture may be operated based on a basic configuration of an image call picture. As shown, for example, the first display unit 140 may include a sender picture region 1130, a receiver picture region 1150, a transmission text region 1140 to which a speech recognized text to be transmitted is output, and a reception text region 1160 to which a received speech recognized text is output. The receiver picture region 1150 may not output separate image data according to a user request or when the reception side terminal 200 is an image call non-support terminal. In this case, a specific picture designated by the user or a specific picture provided with default by the transmission side terminal 100, for example, a picture indicating in conference may be output.

Meanwhile, the foregoing exemplary embodiment of the present invention has illustrated that both of the transmission text region 1140 and the reception text region 1160 are output on the first display unit 140. However, exemplary embodiments of the present invention are not limited thereto. For example, the reception text region 1160 of the transmission text region 1140 and the reception test region 1160 may be configured by a region to which a character or chatting message input by the reception side terminal 200 user is output rather than the speech recognized text. A corresponding reception text region 1160 is provided to only the reception side terminal 200 and is not provided to the transmission side terminal 100 or is substituted by the TTS service.

Figure 12:
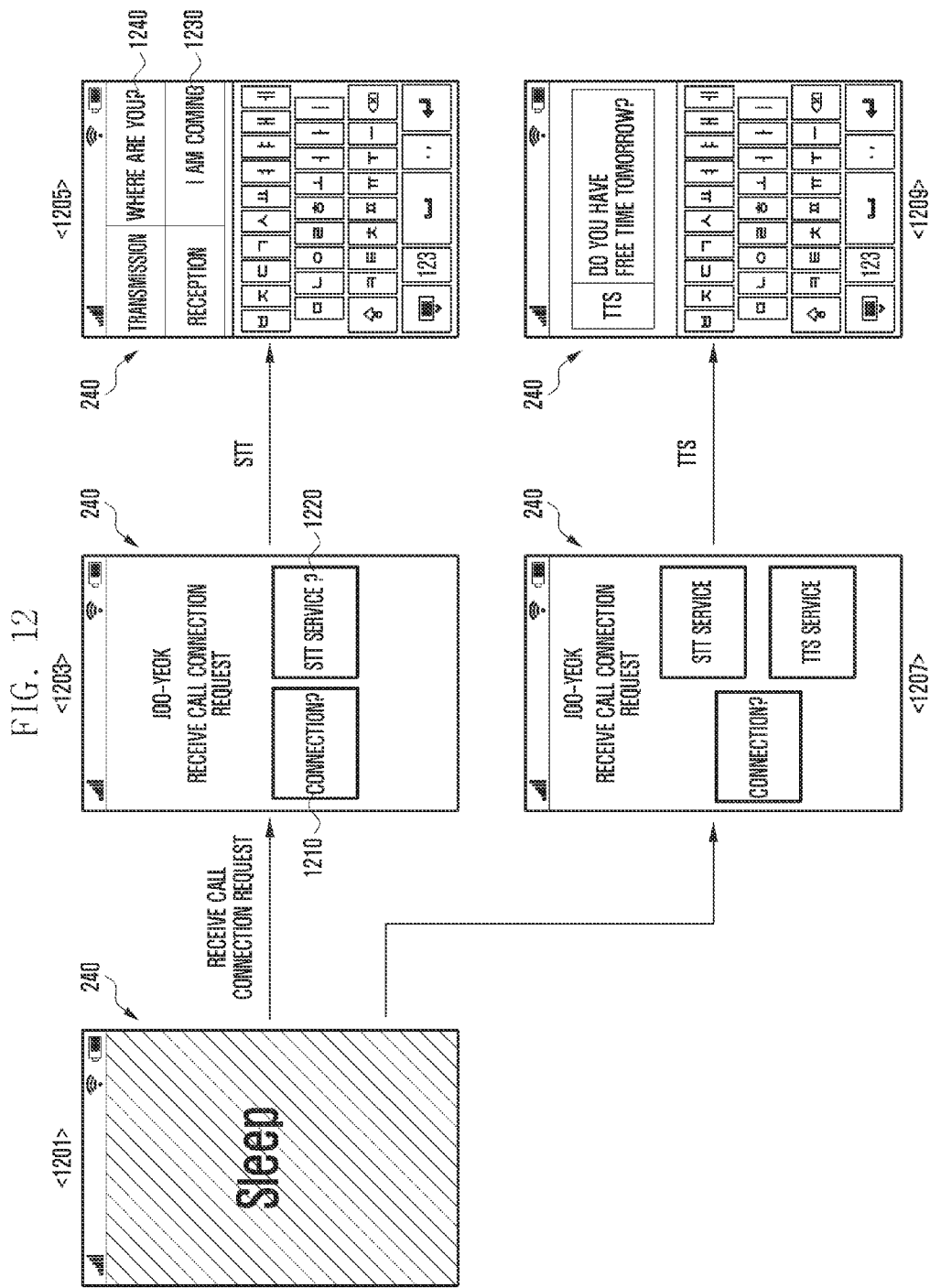
FIG. 12 is a diagram illustrating an example of a screen interface of a reception side terminal according to the first exemplary embodiment of the present invention.

FIG. 12 is a diagram illustrating an example of a screen interface of a reception side terminal according to the first exemplary embodiment of the present invention. For example, FIG. 12 is a diagram illustrating a screen interface for operating an STT service of a reception side terminal.

Referring to FIG. 12, the reception side terminal 200 may perform a specific terminal function or maintain a sleep state as illustrated in a picture 1201 according to an operation of the user. The sleep state may be entered when a separate input signal for using a terminal function is not received for a predetermined time or according to generation of an input signal for sleep state change. The sleep state may be a state of maintaining a unique function of the reception side terminal 200 or a function according to user setting through background processing while controlling blocking of power supplied to the second display unit 240. For example, a sleep state represented on a picture 1201 may be a state capable of receiving a call connection request message of the transmission side terminal 100 by stopping power supply of the second display unit 240 but maintaining power supply of the second communication unit 210.

Meanwhile, the foregoing exemplary embodiment of the present invention has illustrated that a state of the reception side terminal 200 maintains a sleep state. However, exemplary embodiments of the present invention are not limited thereto. For example, the picture 1201 may include various picture states according to user control. For example, the picture 1201 may include a picture for playing a specific file stored in the reception side terminal 200, a screen outputting a page provided from a corresponding server according to connection of a specific server, a picture outputting a collected image using a camera, and a picture where a chatting service with the transmission side terminal 100 is operated. In this manner, a picture 1201 of the reception side terminal 200 may include at least one state capable of receiving a communication service connection request from the transmission side terminal 100. Hereinafter, as one example, the reception side terminal 200 maintains a sleep state.

The reception side terminal 200 may receive a communication service connection request message from the transmission side terminal 100. Then, as illustrated in a picture 1203, the reception side terminal 200 may output information for guiding that a communication service connection request message is received from the transmission side terminal 100 as illustrated in a picture 1203. For example, the reception side terminal 200 may output at least one of text or an image indicating reception of a communication service connection request message through the second display unit 240. In addition, the reception side terminal 200 may operate previously defined audio signal, vibration, and lamp lighting corresponding to reception of the communication service connection request message according to user setting.

Meanwhile, the reception side terminal 200 may output "connection item" 1210 capable of selecting whether to use a communication service in a scheme requested by the transmission side terminal 100, and a specific communication service according to a user environment of the reception side terminal 200, for example, a "STT service item" 1220 capable of selecting speech recognition based text providing service to the second display unit 240. In order to use a communication service such as speech call or image call requested for connection by the transmission side terminal 100, the user may select a "connection item" 1210. When it is difficult to use a communication service using a speech, the user may select a "STT service item" 1220.

When the user selects the "STT service item" 1220 from a picture 1203, the reception side terminal 200 may transmit a message for communication service connection based on the STT service to the transmission side terminal 100. Then, the transmission side terminal 100 may recognize a speech signal collected by the first microphone 131 to generate text using a first speech process supporting device 400 or a speech recognition database 153 stored in a first memory 150, and may transmit the text to the reception side terminal 200. When receiving the speech recognized text from the transmission side terminal 100, the reception side terminal 200 may output the text on a reception text region 1230 as illustrated in a picture 1205. Meanwhile, the reception side terminal 200 may output the text input screen as illustrated in a picture 1205 in order to transmit the text to the transmission side terminal 100. The reception side terminal 200 may input a specific text using a text input screen and transmit the specific text to the transmission side terminal 100. The text input by a user of the reception side terminal 200 may be output to the transmission text region 1240. In this case, the reception side terminal 200 may activate the second microphone 231 in order to collect a peripheral audio signal, and the audio signal collected by the first microphone 231 may be transmitted to the transmission side terminal 100.

Meanwhile, although the foregoing exemplary embodiment has illustrated that a user of the reception side terminal 200 may select a specific communication service through a picture 1203, a reception side terminal 200 according to exemplary embodiments of the present invention may support communication service connection according to default setting. For example, when a communication service connection scheme is set to be performed based an STT service as default setting, the reception side terminal 200 may remove a communication service selection function and a corresponding screen output provided from the picture 1203, and may support signal processing for supporting communication service connection cooperation and corresponding communication service.

The foregoing exemplary embodiment of the present invention has illustrated only an operation of the STT service. However, exemplary embodiments of the present invention are not limited thereto. For example, the STT service may be substituted by the TTS service. Exemplary embodiments of the present invention further provide a picture for operating the TTS service separately from the STT service as illustrated in a picture 1207 so that at least one of the STT service and the TTS service may be selectively operated according to a user request. When the TTS service is selected from the picture 1207, exemplary embodiments of the present invention may include a text creator for supporting a TTS service and a picture transmitting the created text to the transmission side terminal 100 as illustrated in a picture 1209. In this case, the second display unit 240 of the reception side terminal 200 may output information indicating that the TTS service is currently supported at one side of a screen as illustrated in a picture 1209.

The foregoing exemplary embodiment of the present invention has illustrated a system for operating a communication service and roles and functions of constituent elements of each system according to the first exemplary embodiment of the present invention. Hereinafter, a method of operating a communication service according to exemplary embodiments of the present invention will be described with reference to the accompanying drawings in detail.

Figure 13:
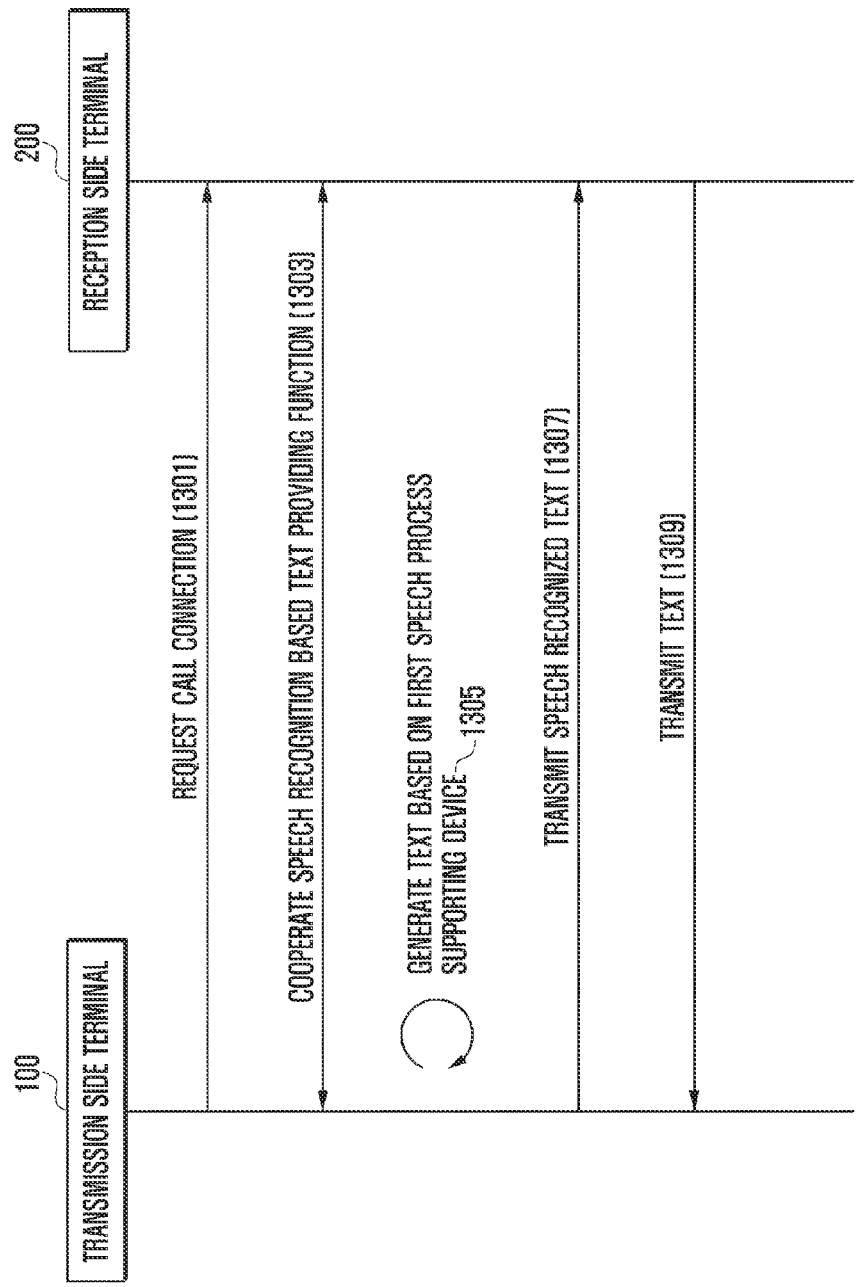
FIG. 13 is a diagram illustrating an example of a screen interface of a transmission side terminal according to the first exemplary embodiment of the present invention.

FIG. 13 is a diagram illustrating an example of a screen interface of a transmission side terminal according to the first exemplary embodiment of the present invention.

Referring to FIG. 13, in the method of operating a communication service according to the first exemplary embodiment of the present invention, a transmission side terminal 100 may request call connection to a reception side terminal 200 at step 1301. To this end, the transmission side terminal 100 performs a procedure for selecting a phone number of the reception side terminal 200, and may transmit a message requesting communication service connection of one of a speech call and an image call to the reception side terminal 200 according to a user request. The transmission side terminal 100 may collect a phone number of the reception side terminal 200 based on number information input by the user, collect the phone number of the reception side terminal 200 through selection of phone book information, or the phone number provided from a chatting service environment. The transmission side terminal 100 may transmit a corresponding message to a communication system 300 for communication service connection with the reception side terminal 200.

Next, the transmission side terminal 100 and the reception side terminal 200 may perform cooperation for supporting an STT service being speech recognition based text providing function at step 1303. The cooperation step may be variously changed according to a system design scheme but manually recognizes an operation of speech recognition based text providing service according to exemplary embodiments of the present invention. To this end, the transmission side terminal 100 may create a message instructing to operate a communication service based on an STT service and transmit the created message to the reception side terminal 200 at step 1301. Meanwhile, the reception side terminal 200 may transmit a message requesting to operate a communication service based on an STT service to the transmission side terminal 100 at step 1303.

When receiving a corresponding message, the transmission side terminal 100 may provide a collected speech signal to the reception side terminal 200 through acceptance as a speech recognized text. For example, the transmission side terminal 100 may generate text based on at least one of the first speech process supporting device 400 and the speech recognition database 153 at step 1305. When speech recognition is performed based on the first speech process supporting device 400 with default and a connection state with the first speech process supporting device 400 is bad so that speech recognition is not normally performed, the transmission side terminal 100 may control such that speech recognition based on the speech recognition database 153. The transmission side terminal 100 performs speech recognition based on the speech recognition database 153. According to a user operation corresponding to input/output mode determined by the user or when a connection environment of the first speech process supporting device 400 is equal to or greater than a preset value, data transception for connection of the first speech process supporting device 400 and speech recognition may be supported. Meanwhile, when a separate billing is achieved in using the first speech process supporting device 400, the transmission side terminal 100 may perform only speech recognition based on the speech recognition database 153 according to user setting.

Next, the transmission side terminal 100 may transmit the speech recognized text to the reception side terminal 200 at step 1307. To this end, the transmission side terminal 100 may use a communication channel for transmitting a packet corresponding to the text. The communication channel may be a communication channel formed between the transmission side terminal 100 and the reception side terminal 200 or a communication channel formed between the transmission side terminal 100 and a previous reception side terminal 200, for example, a chatting service channel. When a speech recognized text is received from the transmission side terminal 100, the reception side terminal 200 may output a corresponding text to the second display unit 240. When the reception side terminal 200 forms an image call channel with the transmission side terminal 100, the reception side terminal 200 may receive image data from the transmission side terminal 100 together with a corresponding text. Accordingly, the reception side terminal 200 may output the corresponding text to be overlaid on the image data or output text by allocating a separate region. When a system is designed so that the reception side terminal 200 outputs image data and text data, the reception side terminal 200 acquires time stamp information from the received data and controls synchronization upon output of corresponding data. When the transmission side terminal 100 combines text with the image data and transmits the combined data, the reception side terminal 200 may support data output without separate collection and synchronizing procedure of time stamp information.

Meanwhile, the reception side terminal 200 may transmit text input by the user to the transmission side terminal 100 at step 1309. To this end, the reception side terminal 200 may output an input window for inputting the text to the second display unit 240. The text input by the user is transmitted to the transmission side terminal 100, and may be output to the second display unit 240. In addition, the reception side terminal 200 may activate a camera during using the STT service and collects a peripheral image and transmits the peripheral image to the transmission side terminal 100.

Meanwhile, steps 1305 to 1309 may be continuously maintained and performed before a communication service channel is released between the transmission side terminal 100 and the reception side terminal 200 or an input signal for releasing the STT service of exemplary embodiments of the present invention is generated.

For example, the transmission side terminal 100 may provide a communication service based on speech or image data and the reception side terminal 200 may provide a communication service based on the text. For example, the transmission side terminal 100 transfers information using the first microphone 131 as speech and the reception side terminal 200 outputs text with respect to a corresponding speech and may transfer information as created text. When the reception side terminal 200 transmits the text, the transmission side terminal 100 may output the text to the first display unit 140.

In a case of an image call, the transmission side terminal 100 transfers information based on speech and image collected by the microphone 131 and the first camera 170, and the reception side terminal 200 may output text corresponding to the image and a corresponding speech without output of a separate speech signal, and transfer information through creation of the text. In this case, the reception side terminal 200 activates a camera and a microphone to transmit image and audio signals to the transmission side terminal 100. Then, the transmission side terminal 100 may output the image and audio signals provided from the reception side terminal 200 through the first display unit 140 and the first speaker 133. When the reception side terminal 200 transmits text created by character input, the transmission side terminal 100 may output a corresponding text to one side of a separate text region or an image output region. The transmission terminal 100 may convert a received text into a speech and output the speech through the first speaker 133 according to user setting.

Figure 14:
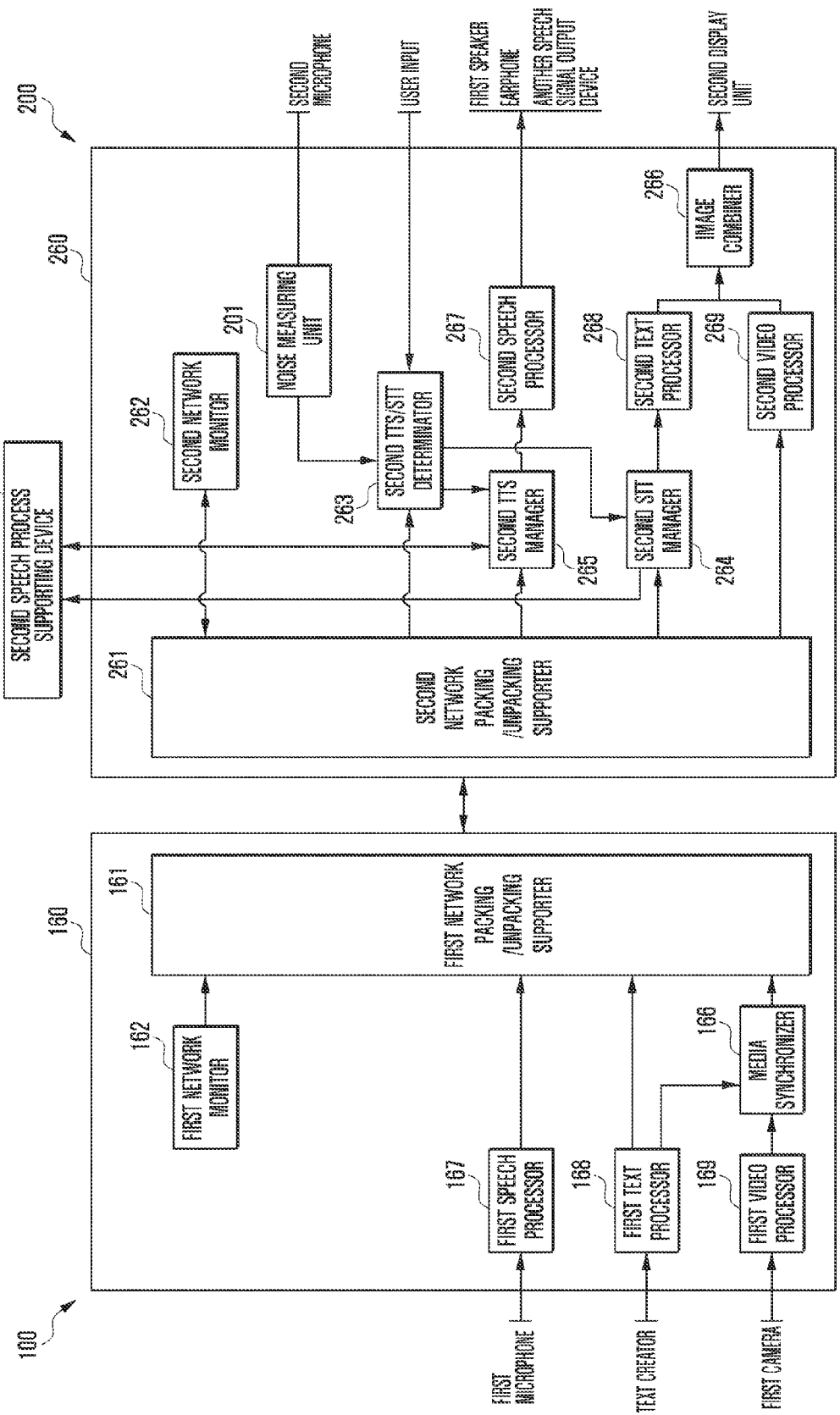
FIG. 14 is a block diagram illustrating a configuration of a first controller of a transmission side terminal and a configuration of a second controller of a reception side terminal according to a second exemplary embodiment of the present invention.

FIG. 14 is a block diagram illustrating a configuration of a first controller of a transmission side terminal and a configuration of a second controller of a reception side terminal according to a second exemplary embodiment of the present invention in detail.

Referring to FIG. 14, in terminals for operating a communication service according to the second exemplary embodiment of the present invention, a reception side terminal 200 recognizes a speech signal using the second speech process supporting device 500, and outputs the generated text to the second display unit 240 according to the speech recognition. Accordingly, the transmission side terminal 100 does not recognize the collected speech signal and transmits the collected speech signal to the reception side terminal 200 based on a packet service switching network. FIG. 14 illustrates constituent elements of a first controller 160 of the transmission side terminal 100 and constituent elements of a second controller 260 of the reception side terminal 200.

The first controller of the transmission side terminal 100 according to the exemplary embodiment of the present invention may include a first network packing/unpacking supporter 161, a first network monitor 162, a media synchronizer 166, a first speech processor 167, a first text processor 168, and a first video processor 169. The transmission side terminal 100 having a construction mentioned above may collect and transmit a speech signal in order to support speech recognition based text providing service.

In detail, a first controller of the transmission side terminal 100 may control the first communication unit 110 to transmit a communication service connection request message to the reception side terminal 200 through a communication system 300 according to a user request. In this case, the first speech processor 167 controls the first microphone 131 to be activated, and converts a speech signal collected by the first microphone 131 into speech data, and transfers the speech data to the first network packing/unpacking supporter 161. The first text processor 168 may generate text corresponding to an input signal input from the first input unit 120 and a first display unit 140 having an input function, and transfer a corresponding text to the first network packing/unpacking supporter 161. Further, the first text processor 168 may transfer the generated text to the media synchronizer 166. When the image call service is operated between the transmission side terminal 100 and the reception side terminal 200, the first video processor 169 activates the first camera 170, and converts an image signal collected by the first camera 170 into image data. In addition, the first video processor 169 may transfer the image data to the media synchronizer 166. The media synchronizer 166 may synchronize text provided from the first text processor 168 with the image data from the first video processor 169, and may transfer the synchronized data to the first network packing/unpacking supporter 161.

The first network monitor 162 may evaluate a network through the first network packing/unpacking supporter 161. To this end, the first network monitor 162 may transmit a preset test signal to the reception side terminal 200 through the first network packing/unpacking supporter 161. Next, the first network monitor 162 may receive a signal corresponding to the test signal to evaluate the network. The first network monitor 162 may receive feedback of quality with respect to at least one of speech data, text, and image data to be transmitted to the reception side terminal 200 to evaluate the network. The network monitor 162 may evaluate a network based on information associated with network quality provided from the communication system and information associated with network quality provided from the reception side terminal 200. The network evaluation detected by the first network monitor 162 and noise information with respect to a peripheral environment of the reception side terminal 200 provided from the reception side terminal 200 may be used to determine an STT service of the transmission side terminal 100.

The first network packing/unpacking supporter 161 packs at least one of speech data provided from the first speech processor 167, text provided from the text processor 168, and image data provided from the media synchronizer 166 in the form of transmitting them to the reception side terminal 200. The first network packing/unpacking supporter 161 may transmit packed data to the reception side terminal 200 through the first communication unit 110. Further, the first network packing/unpacking supporter 161 may unpack data provided from the reception side terminal 200, and may transfer the unpacked data to an output means, for example, a first speaker 133 and a first display unit 140.

Meanwhile, a second controller 260 of a reception side terminal 200 according to the exemplary embodiment of the present invention may include a noise measuring unit 201, a second packing/unpacking supporter 261, a second network monitor 262, a second TTS/STT determinator 263, a second STT manager 264, a second TTS manager 265, an image combiner 266, a second speech processor 267, a second text processor 268, and a second video processor 269.

When the reception side terminal 200 having a construction mentioned above receives a communication service connection request from the transmission side terminal 100, the reception side terminal 200 may connect the second speech process supporting device 50 in order to support an STT service being speech recognition based text providing service according to default setting or user setting. The reception side terminal 200 may use a speech recognition database stored in the second memory 250 for supporting the STT service. For example, the reception side terminal 200 may recognize speech data provided from the transmission side terminal 100 to generate text, and may output the generated text to the second display unit 240. An output function of speech data by the second speaker 233 may be supported or blocked according to user setting or a system design scheme. For example, support of the STT service according to the exemplary embodiment of the present invention, the speech data may be output in the reception side terminal 200 with the speech recognized text and may be removed.

Respective constituent elements of the reception side terminal 2200 will be described in detail. The second network monitor 262 evaluates a network through the second network packing/unpacking supporter 261. The second network monitor 262 may transmit a preset test signal to a network or the transmission side terminal 100 through the second network packing/unpacking supporter 261, and receive a corresponding feedback signal to evaluate a network state. The second network monitor may substitute a signal to be transmitted to the communication system 300 or the transmission side terminal 100, for example, a signal transceived during a channel formation procedure, a speech signal collected by the second microphone 231, image data collected by the camera and to be transmitted to the transmission side terminal 100, and text created by the user and to be transmitted to the transmission side terminal 100 for the text signal. Meanwhile, the second network monitor 262 receives a network state, for example, information with respect to a delay degree and a loss rate of a packet in data transmission from at least one of the transmission side terminal 100 and the communication system 300, and may evaluate the network state based on the receive network state. The network evaluation result performed by the second network monitor 262 may be provided to the second TTS/STT determinator 263.

The second network packing/unpacking supporter 261 packs and unpacks data to be transmitted by the reception side terminal 200 and data which the reception side terminal will receive. In detail, the second network packing/unpacking supporter 261 unpacks data received from the transmission side terminal 100 and classifies the unpacked data by types. For example, the second network packing/unpacking supporter 261 may classify data provided from the transmission side terminal 100 into at least one of speech data, text data, video data, and caption data according to data characteristics. Further, the second network packing/unpacking supporter 261 may transfer the classified data to a configuration associated with corresponding data in order to process the classified data. For example, the second network packing/unpacking supporter 261 may transfer speech data to the second speech processor 267, may transfer text data to the second text processor 268, and transfer video data to the second video processor 269. Caption data may be transferred to the second text processor 268 or the second video processor 269 according to a characteristic of the caption data. For example, when the caption data is manufactured and received in the form of text, the caption data may be transferred to the second text processor 268 so that the second text processor 268 may process the caption data. When the caption data are manufactured and received in an image frame type, the caption data may be transferred to the second video processor 269 so that the second video processor 269 may process the caption data.

Meanwhile, the second network packing/unpacking supporter 261 packs speech data generated by processing a speech signal collected from the second microphone 231 of the reception side terminal 200 by the second speech processor 267, and transfers the packed speech data to the transmission side terminal 100 through the second communication unit 210. The second network packing/unpacking supporter 261 may pack a created text according to a preset standard using at least one of the second input unit 220 and the second display unit 240 having an input function and transmits the packed text to the transmission side terminal 100 through the second communication unit 210. When a mounted camera transmits collected image data, the second network packing/unpacking supporter 261 may pack image data with which an input text is combined. The second network packing/unpacking supporter 261 may pack and transmit preset specific image data according to terminal setting or a user operation corresponding to the transmission side terminal 100 having requested image call connection. In this case, the specific image data may be converted into image data with which an input text is combined according to user control, and the image data may be packed by the second network packing/unpacking supporter 261. In addition, the second network packing/unpacking supporter 261 may pack peripheral noise information of the reception side terminal 200 collected by the noise measuring unit 201 and may transfer the packed peripheral noise information to the reception side terminal 200 to the transmission side terminal 100 through the second communication unit 210.

The noise measuring unit 201 generates a noise occurring from a peripheral environment of the reception side terminal 200 to generate noise information, and transmits the corresponding noise information to at least one of the second TTS/STT determinator 263 and the transmission side terminal 100. To this end, the noise measuring unit 201 may activate a second microphone 231 included in the reception side terminal 200, and may analyze an audio signal for a predetermined time collected by the second microphone 231 to determine presence of inclusion of the noise. In this case, when receiving a call connection request message from the transmission side terminal 100, the noise measuring unit 201 activates the second microphone 231 to collect a peripheral audio signal for a preset time and to measure a nose based on the collected signal. The noise measuring unit 201 may collect an audio signal at a predetermined time interval according to preset schedule information, and average of noise measuring values of the audio signal or adopt the greatest value of the noise measuring values as the noise information.

The second TTS/STT determinator 263 determines whether to execute the TTS service or the STT service of the reception side terminal. To this end, the second TTS/STT determinator 263 may determine whether to execute the TTS service or the STT service based on at least one of noise information provided from the noise measuring unit 201, user control input from the second input unit 220 and a second display unit 240 having an input function, speech and text of the transmission side terminal 100 provided from the second network packing/unpacking supporter 261. For example, when receiving noise information with respect to a noise measuring value greater than a predetermined value from the noise measuring unit 201, the second TTS/STT determinator 263 may control a second STT manager 264 so that the STT service is performed regardless of user control or a request of the transmission side terminal 100. In the same manner, when receiving information including a noise measuring value greater than a predetermined reference value from the noise measuring unit 201, the second TTS/STT determinator 263 may control the second TTS manager 265 to perform the TTS service. When the user of the reception side terminal 200 generates an input signal for operating the STT service or the TTS service, the second TTS/STT determinator 263 may control the second TTS manager 265 or the second STT manager 264 to operate corresponding services, respectively. When activation of the STT service or the TTS service is requested from the transmission side terminal 100, the second TTS/STT determinator 263 may control such that the STT service or the TTS service according to a request of the transmission side terminal 100 is operated.

In addition, the second TTS/STT determinator 263 collects noise information from the transmission side terminal 100. When the noise information provided from the transmission side terminal 100 is greater than a reference value, the second TTS/STT determinator 263 may control such that the STT service is automatically operated.

The second TTS/STT determinator 263 may receive network evaluation information from the second network monitor 262, and may control the second STT manger 264 or the second TTS manger 265 for supporting the TTS service or the STT service according to the network evaluation information. In detail, when at least one of a data transmission delay degree and a packet loss rate of a network included in the network evaluation information are greater than a reference value, the second TTS/STT determinator 263 may control execution of at least one of the STT service and the TTS service. Transmission amounts of the text and caption data of a text type is less than those of speech data and image data, and the text and the caption data are provided in the form of a character. Accordingly, when the network state is poor, the speech data and the image data are transmitted to have loss and delay so that a probability where the text and the caption data are transmitted to have loss and delay and are exactly recognized may be relatively higher than a probability where the speech data and the image data are transmitted to have loss and delay and are exactly recognized. Accordingly, when the network evaluation information is greater than the preset reference value, the second TTS/STT determinator 263 transmits a test with respect to the speech data together with or separately from speech data so that the user of the transmission side terminal 100 may exactly recognize information to be transmitted from the user of the reception side terminal 200.

The second TTS manager 265 controls support of the TTS service of the TTS service of the reception side terminal 200 under control of the second TTS/STT determinator 263. When the second TTS/STT determinator 263 requests support of the TTS service, the second TTS manager 265 may control such that text provided from the second network packing/unpacking supporter 261 is converted into speech data, and may transfer the speech data to the second speech processor 267. In this case, the text provided from the second network packing/unpacking supporter 261 may be created by a text creator of the transmission side terminal 100 or may be created by converting the speech signal according to an operation of the STT service.

The second TTS manager 265 may connect with the second speech process supporting device 500 in order to support a TTS service of the reception side terminal 200. The second TTS manager 265 may be previously provided to support the TTS service of the reception side terminal 200 and may use a speech conversion database stored in the second memory 250. For example, the second TTS manager 265 may support speech conversion based on the speech conversion database by performing connection of the a second speech process supporting device 500 or without performing a separate connection procedure of the second speech process supporting device 500 in order to support the TTS service of the reception side terminal 200. When the transmission side terminal 100 converts text input by the user into speech data using the first speech process supporting device 400, the second TTS manager 265 may control such that separate speech conversion is not performed.

Meanwhile, the second TTS manager 265 may convert text input by a user of the reception side terminal 200 into a speech signal under control of the second TTS/STT determinator 263, and transmits the speech signal to the transmission side terminal 100. To this end, the second TTS manager 265 may convert text input based on at least one of the second speech process supporting device 500 and the speech conversion database into a speech, and transmits the speech to the transmission side terminal 100 through the second network packing/unpacking supporter 261.

The second STT manager 264 control support of the STT service of the reception side terminal 200. When receiving a request for supporting the STT service from the second TTS/STT determinator 263, the second STT manager 264 may support the STT service according to a corresponding request. In particular, the second STT manager 264 may support at least one of the STT reception service and the STT transmission service of the reception side terminal 200.

First, in a case of supporting the STT reception service, the second STT manager 264 receives speech data from the second network packing/unpacking supporter 261, and converts corresponding speech data into text. The second STT manager 264 may transfer speech data converted into the text to the second text processor 268. To this end, the second STT manger 264 may use at least one of connection of the second speech process supporting device for supporting the STT service or a speech recognition database stored in the second memory 250. For example, the second STT manager 264 may form a channel with a second speech process supporting device 500, and may transmit speech data from the second network packing/unpacking supporter 261 to the second speech process supporting device 500. When text from the second speech process supporting device 500 is received from the second communication unit 210 and the second network pack/unpacking supporter 261, the second STT manager 264 may transfer a corresponding text to the second text processor 268.

In a case of supporting the STT transmission service, the second STT manager 264 may convert speech data provided from the speech processor 267 into text. In this case, the second STT manager 264 may convert speech data into text using the second speech process supporting device 500 or a speech recognition database stored in the second memory 250 according to a policy. The second STT manager 264 transfers the converted text to the second network packing/unpacking supporter 261 and requests to the second network packing/ unpacking supporter 261 so that the converted text is transmitted to the transmission side terminal 100.

The speech processor 267 converts speech data provided from the second TTS manager 265 into a form allowing the speech data to be transferred to a speaker, an earphone, and other speech signal output device, and transfers the converted speech signal to a corresponding configuration. The second speech processor 267 may directly receive speech data from the second network packing/unpacking supporter 261, convert the speech data into a speech signal, and transfer the speech signal to the speaker, the earphone, and the other speech signal output device. The other speech signal output device may be a separate device or headset capable of forming a communication channel with the reception side terminal 200 through a Bluetooth communication module.

The second text processor 268 converts information provided from the second STT manager 264 into text of a form which may be output from the reception side terminal 200. For example, the second STT manager 264 configures speech recognized text information by words, phrases, and sentences which may be output to a second display unit 240 of the reception side terminal 200, and transfer the text information to the image combiner 266. The second text processor 268 may directly receive text from the second network packing/unpacking supporter 261, and process the text as a form which may be output to the display unit 240.

The second video processor 269 processes image data provided from the second network packing/unpacking supporter 261 as a form which may be output to the second display unit 240. For example, the second video processor 269 may generate an image frame using image data configured by packets provided from the second network packing/unpacking supporter 261. Further, the second video processor 269 may include an image CODEC which compares a currently received image frame with a previous image frame and processes difference information in order to configure a moving image frame.

The image combiner 266 combines text from the second text processor 268 with an image frame from the second video processor 269. For example, the image combiner 266 may generate a new image frame to be output to the second display unit 240 by inserting the text on an image frame configured by image frame or overlaying the text on the image frame. Accordingly, the second display unit 240 may simultaneously displays the text and the image frame. The image combiner 266 acquires time stamp information from the received information to synchronize the text with image frame to be output, and determines which text is inserted into any image frame based on the time stamp information. The time stamp information may be extracted and provided from the second network packing/unpacking supporter 261 or the second STT manager 264. Meanwhile, when the transmission side terminal 100 previously inserts text into an image frame to be transmitted during a procedure of providing the STT service, the image combiner 266 may be removed. In this case, the second video processor 269 may an image frame into which the text is inserted to the second display unit 240.

Figure 15:
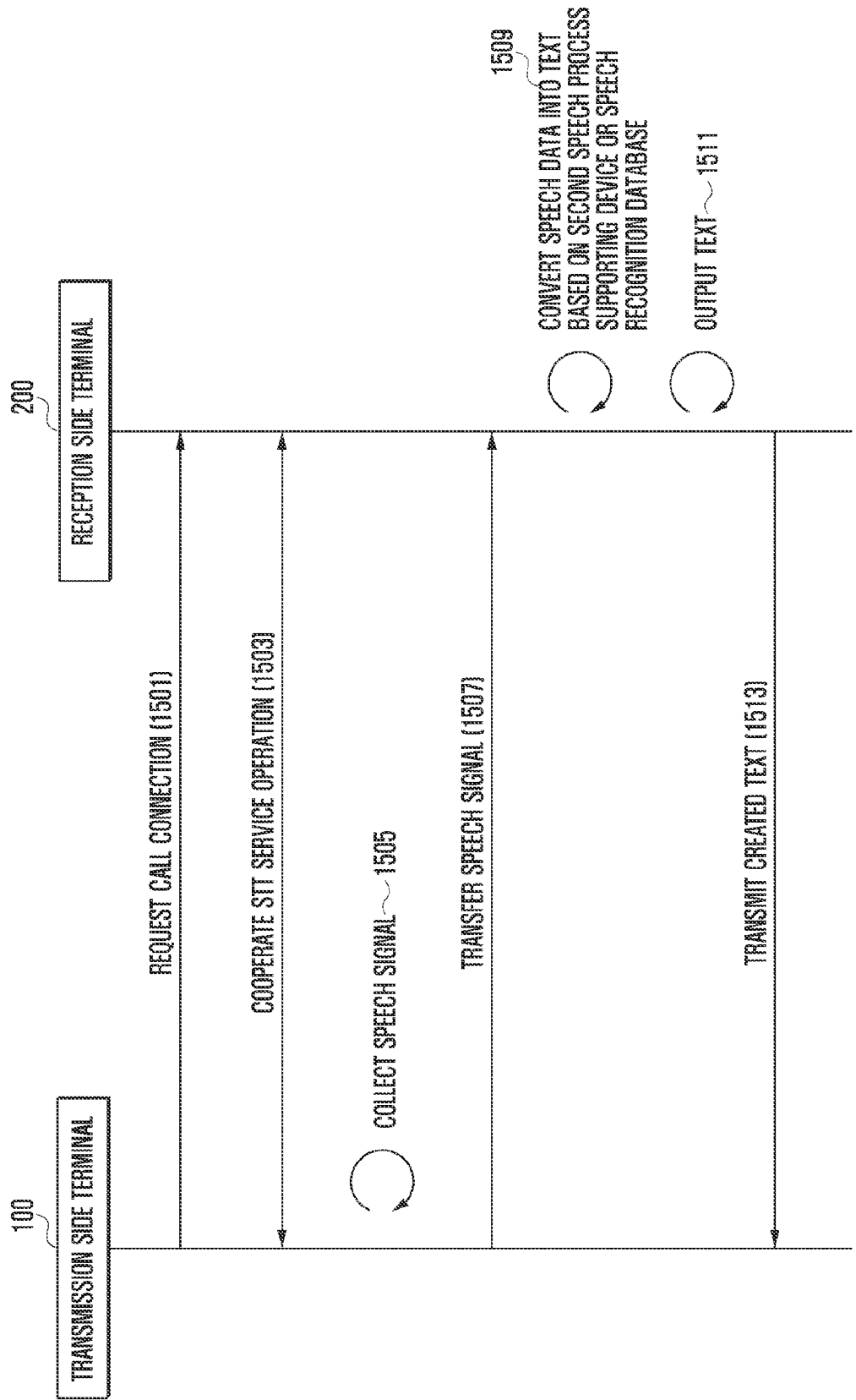
FIG. 15 is a signal flowchart illustrating an operating method for a communication service according to the second exemplary embodiment of the present invention.

FIG. 15 is a signal flowchart illustrating an operating method for a communication service according to the second exemplary embodiment of the present invention. The following description will be made while focusing on an operation of the STT service. However, exemplary embodiments of the present invention are not limited thereto. According to cooperation between the transmission side terminal 100 and the reception side terminal 200, the STT service is substituted by a TTS service or the STT service and the TTS service may be simultaneously operated.

Referring to FIG. 15, in the method of operating a communication service according to the second exemplary embodiment of the present invention, a transmission side terminal 100 may request call connection to the reception side terminal 200 in step 1501. To this end, the transmission side terminal 100 may input a phone number of the reception side terminal 200 and request a specific type of communication service connection. The request may be transferred to the reception side terminal 200 through the communication system 300 in the form of a message.

When the reception side terminal 200 accepts an operation of a communication service at step 1501, the transmission side terminal 100 and the reception side terminal 200 may perform cooperation for supporting speech recognition based text providing service in step 1503. For example, the transmission side terminal 100 may select a menu requesting an operation of an STT service according to exemplary embodiments of the present invention. According to selection of a corresponding menu, the transmission side terminal 100 may request to the reception side terminal 200 so that the reception side terminal 200 operates a communication service based on an STT service. The reception side terminal 200 may transfer a message instructing whether the reception side terminal 200 is operated as an STT service to the transmission side terminal 100 corresponding to a call connection request of the transmission side terminal 100. In this case, the reception side terminal 200 may automatically operate an STT service based on at least one of noise information and network evaluation or operate an STT service according to user control. When cooperation for supporting the STT service is not performed, the transmission side terminal 100 may form a communication channel according to a type of a communication service in which connection is requested. Meanwhile, the transmission side terminal 100 and the reception side terminal 200 may form a communication channel for supporting a communication service.

If cooperation with respect to an operation of an STT service of the reception side terminal 200 is completed, the transmission side terminal 100 collects a speech signal in step 1505, and transfers the collected speech signal to the reception side terminal 200 in step 1507. To this end, the transmission side terminal 100 activates the first microphone 131 to collect speech data, and converts the collected speech data into speech data of a form which may be transmitted to the reception side terminal 200. Further, the transmission side terminal 100 may transmit the speech data to the reception side terminal 200 through a communication channel formed with the reception side terminal 200.

When receiving speech data from the transmission side terminal 100, the reception side terminal 200 may convert the received speech data into text based on at least one of the second speech process supporting device 500 and a speech recognition database in step 1509. In this end, the reception side terminal 200 may perform connection of the second speech process supporting device 500 and provide speech data to be recognized, or call a speech recognition database stored in the second memory 250.

If conversion of the speech data into the text is completed, the reception side terminal 200 may output the generated text to the second display unit 240 in step 1511. In this case, the reception side terminal 200 may independently provide the generated text at one side of the second display unit 240 in the form of a pop-up window or a word balloon or may display the generated text at one side of a preset specific format, for example, a chatting window. The reception side terminal 200 may output the generated text to be overlaid on an image frame configured by image data provided from the transmission side terminal 100 or inserts the generated text into one side of the image frame or combines the generated text with the one side of the image frame.

Meanwhile, the text created from the reception side terminal 200 may be transmitted to the transmission side terminal 100 in step 1513. To this end, the reception side terminal 200 may activate a text creator for supporting an STT service, and may provide text input by the user through the text creator to the transmission side terminal 100. An activation function of the text creator may be automatically performed according to selection of the STT service. The activation function of the text creator may be automatically performed while outputting text corresponding to speech data provided from the transmission side terminal 100, or may be performed according to user call.

Meanwhile, the reception side terminal 200 may collect and transfer a speech signal and an image signal according to a type of a communication service selected by the user of the transmission side terminal 100 separately from support of the STT service. For example, when the user of the transmission side terminal 100 requests call connection for forming a speech call channel, the reception side terminal 200 may activate a second microphone 231 for speech call, and may collect and transfer an audio signal. Such a function may be provided according to user control or a support policy of the STT service. For example, when the STT service is provided with default, and execution of collection and transfer of the audio signal is set upon connection of a speech call, the reception side terminal 200 may collect and process a signal for collecting and transferring an audio signal separately from the STT service.

As described above, in the method of operating a communication service according to the second exemplary embodiment of the present invention, when the transmission side terminal 100 provides speech data to the reception side 200, the reception side terminal 200 recognizes corresponding speech data and outputs the recognized speech data on the second display unit 240. When connection of the first speech process supporting device 400 of the transmission side terminal 100 is difficult or impossible, the function may be used when speech recognition result providing speed of the first speech process supporting device 400 is lower than that of the second speech process supporting device 500. The method of operating a communication service according to the second exemplary embodiment of the present invention may be performed when speech recognition reliability of the first speech process supporting device 400 is lower than that of the second speech process supporting device 500 or is less than a predetermined reference value. In order to confirm the foregoing situations, the transmission side terminal 100 and the reception side terminal 200 may perform a procedure for sharing information about possibility of connection with respect to the first speech process supporting device 400 and the second speech process supporting device 500, speech recognition providing speed, and reliability with respect to a speech recognition result.

The method of operating the communication service according to the second exemplary embodiment of the present invention may be performed without a request for the STT service cooperation of the reception side terminal 200. For example, when the transmission side terminal 100 collects the speech signal and provides the speech signal to the reception side terminal 200, the reception side terminal 200 may independently support the STT service based on the second speech process supporting device 500 and a speech recognition database stored in the memory 250 without separate cooperation with the transmission side terminal 100.

Accordingly, in the foregoing description, the method of operating the communication service according to exemplary embodiments of the present invention may be performed without including step 1503. In the method of operating the communication service according to the second exemplary embodiment of the present invention, the transmission side terminal 100 unilaterally transfers a speech signal to the reception side terminal 200 without performing a network monitoring procedure, and the reception side terminal 200 may recognize a corresponding speech signal to provide text. As a result, in the method of operating the communication service according to the second exemplary embodiment of the present invention, each terminal may be configured without including a configuration of a monitor unit.

Figure 16:
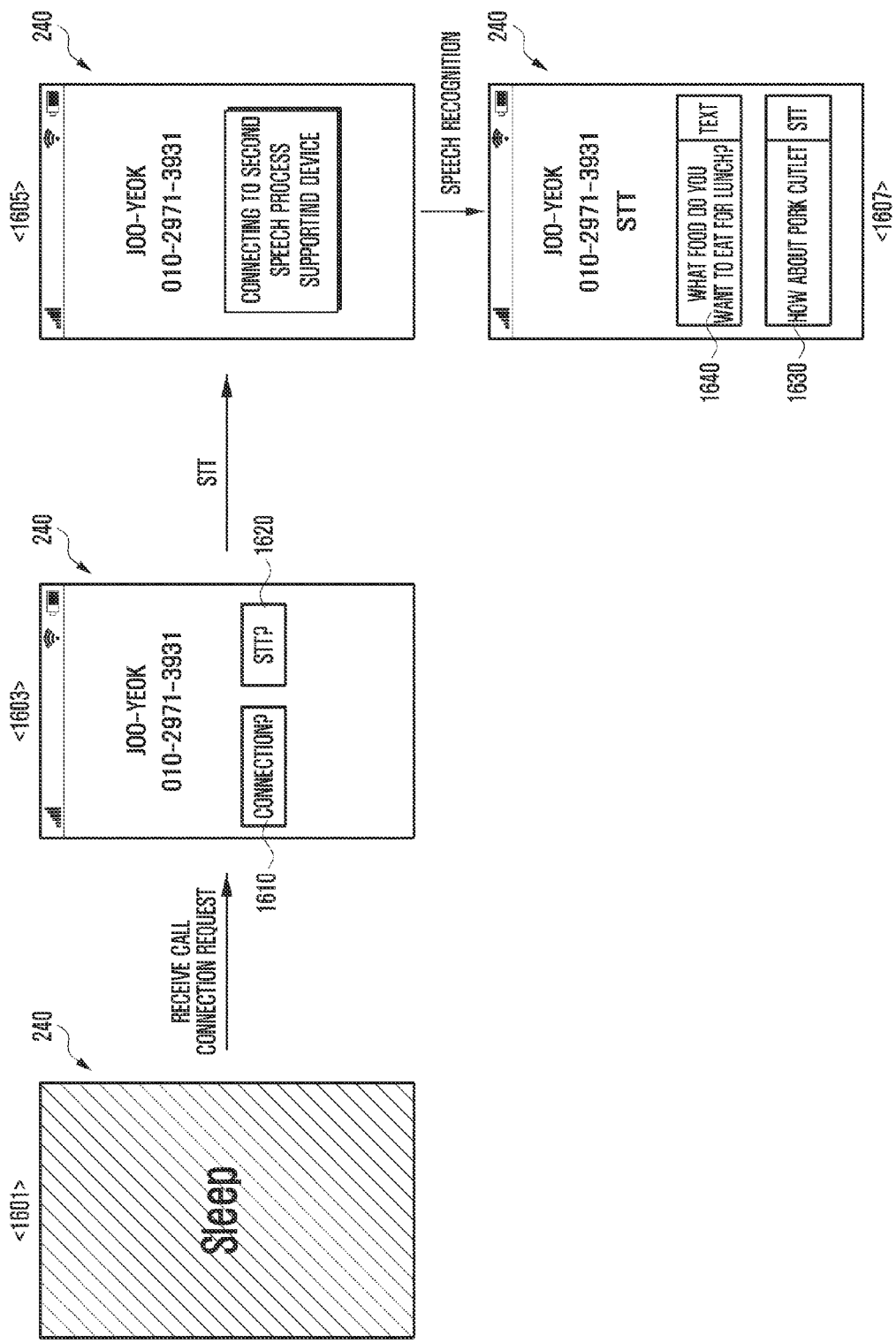
FIG. 16 is a diagram illustrating an example of a screen interface of a reception side terminal according to the second exemplary embodiment of the present invention.

FIG. 16 is a diagram illustrating an example of a screen interface of a reception side terminal according to the second exemplary embodiment of the present invention.

Referring to FIG. 16, the reception side terminal 200 may have a specific picture state as illustrated in a picture 1601 according to an operation of the user. For example, when an input signal is not generated for a predetermined time or an input signal entering a sleep mode is generated, the reception side terminal 200 may output a sleep mode picture on the second display unit 240 together with entering the "sleep mode" as shown. The sleep mode may be a mode for saving power by suppressing power supply of the second display unit 240. The sleep mode may be a state in which a specific user function, for example, a file playback function is performed through background processing as a state in which power supply of the second display unit 240 is suppressed. Meanwhile, the foregoing exemplary embodiment of the present invention has illustrated that the reception side terminal 200 has a sleep mode entering state in a picture 1601. However, exemplary embodiments of the present invention are not limited thereto. For example, the reception side terminal may have various picture states according to an operation of the terminal by the user. For example, the reception side terminal 200 may output a file playback picture, a web server or specific server access picture, and a game picture.

Meanwhile, when receiving a specific type of the call connection request from the transmission side terminal 100, the reception side terminal 200 may output a picture according to reception of a call connection request message as illustrated in a picture 1603. A phone number of the transmission side terminal 100 or phone book information associated with the phone number of the transmission side terminal 100 may be output on the call connection request message reception picture. In particular, the reception side terminal 200 may display a connection button 1610 for call connection according to a type of a communication service requested by the user of the transmission terminal 100, and an STT button 1620 for operating speech recognition based text providing service on the second display unit 240 as shown. The connection button 1610 and the STT button 1620 may be output in the form of a map. Accordingly, the user may use a terminal function according to a corresponding button by selecting a specific button.

When the user selects the STT button 1620 on a picture 1603, the reception side terminal 200 may output information associated with execution of the STT service on the second display unit 240 as illustrated in a picture 1605. For example, the reception side terminal 200 may perform a procedure for connection of the second speech process supporting device 500, and may output information associated with a corresponding connection procedure as shown. The second speech process supporting device 500 may provide a speech recognition result with respect to speech data provided from the reception side terminal 200 as text. The second speech process supporting device 500 may be configured by an external server device which may be connected through a communication network in which the reception side terminal 200 is separately provided. Meanwhile, when the user selects the STT button 1620, the reception side terminal 200 may form a communication channel with the transmission side terminal 100. Accordingly, the reception side terminal 200 may form a communication service channel with the transmission side terminal 100 while the connection of the second speech process supporting device 500 is completed in a picture 1605. In this case, the reception side terminal 200 may connect with the second speech process supporting device 500 using a communication module for connection with the second speech process supporting device 500 or a communication module for connecting with the transmission side terminal 100.

If formation of the communication channel with the transmission side terminal 100 and connection of the second speech process supporting device 500 are completed, the reception side terminal 200 may recognize speech data provided from the transmission side terminal 100 and may convert the speech data into text. To this end, the reception side terminal 200 may perform a procedure of extracting speech data from data provided from the transmission side terminal 100, a procedure of providing the extracted speech data to the second speech process supporting device 500, and a procedure of receiving a speech recognition result from the second speech process supporting device 500. In this case, the reception side terminal 200 may recognize speech data provided from the transmission side terminal 100 based on a speech recognition database stored in the second memory 250 when connection of the second speech process supporting device 500 is impossible or according to user control.

If the text is generated due to speech recognition, the reception side terminal 200 may output text generated as illustrated in a picture 1607 on the second display unit 240. In this case, the reception side terminal 200 may separately output an STT service region 1630 outputting a speech recognized text provided from the transmission side terminal 100 and a text region 1640 output text created by the user and transmitted to the transmission side terminal 100. Further, the reception side terminal 200 may output information reporting that the STT service is currently operated at one side of a screen. The user may confirm which speech signal is transmitted by the user of the transmission side terminal 100 through an STT service region 1630. In addition, the user may create text to be transmitted to the transmission side terminal 100 through the test region 1640. When the user touches the text region 1640, the reception side terminal 200 may activate a text creator for creating the text, and supports picture output corresponding thereto.

Meanwhile, the foregoing exemplary embodiment of the present invention has illustrated that pictures 1603 to 1605 are displayed so that a picture with respect to selection and operation procedure of the STT service. For example, in a case in which the user of the reception terminal 200 sets the STT service to default, and the user of the transmission side terminal 100 transmits a request message or a user of the transmission side terminal 100 transmits request so that the user of the transmission side terminal 100 of a specific phone number transmits a request message for call connection, the pictures 1603 and 1605 may be omitted. Simultaneously, the reception side terminal 200 may provide only the pictures 1601 and 1607 to a second display unit 240 of the reception side terminal 200.

Figure 17:
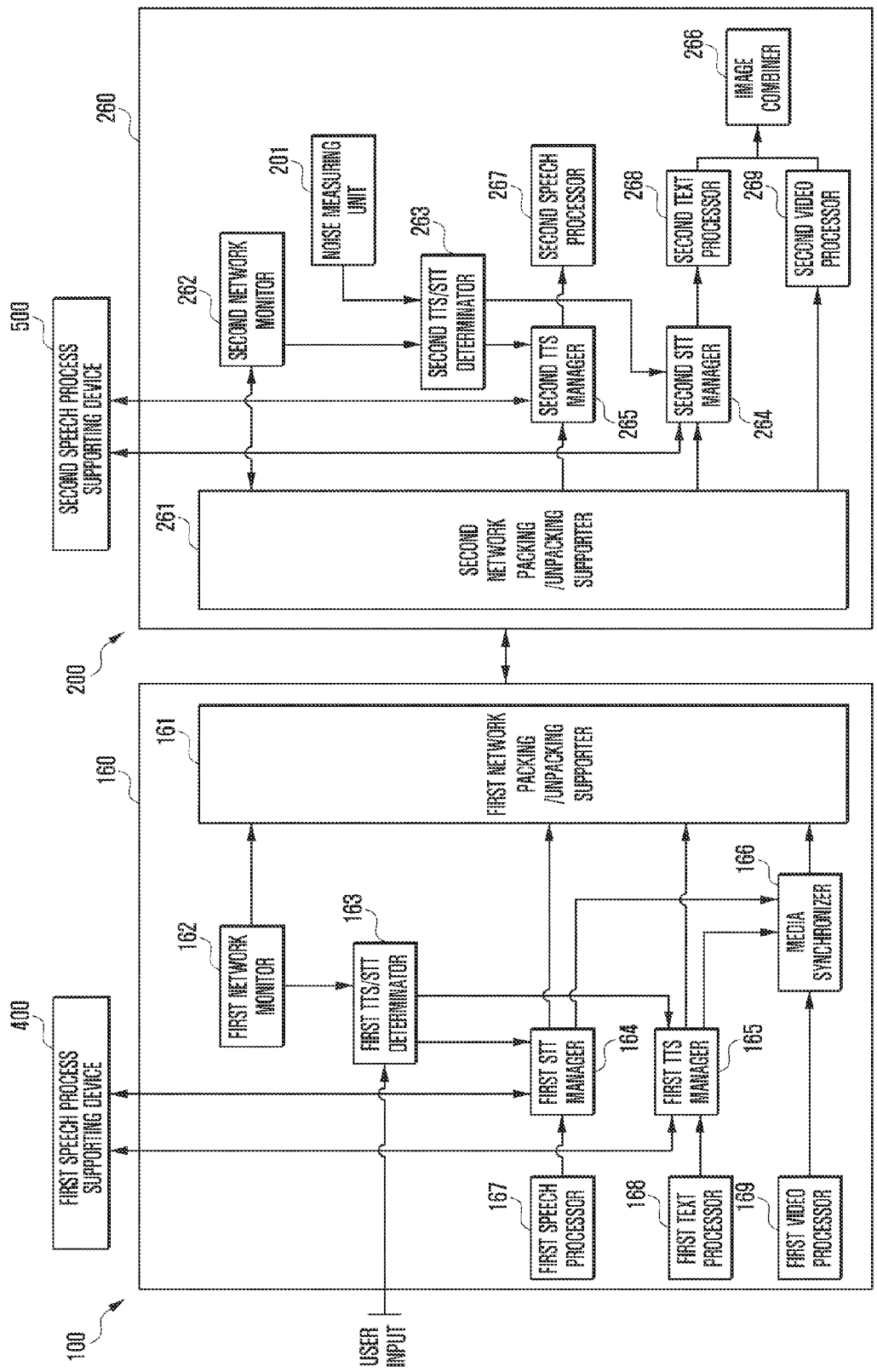
FIG. 17 is a block diagram illustrating a configuration of a first controller of a transmission side terminal and a configuration of a second controller of a reception side terminal according to a third exemplary embodiment of the present invention.

FIG. 17 is a block diagram schematically illustrating a configuration of a first controller of a transmission side terminal and a configuration of a second controller of a reception side terminal according to a third exemplary embodiment of the present invention. For example, FIG. 17 illustrates a configuration of a configuration of a system for operating a communication service according to the third exemplary embodiment of the present invention.

Referring to FIG. 17, the system for operating a communication service according to the third exemplary embodiment of the present invention confirms connection states of speech process supporting devices supporting speech recognition by the transmission side terminal 100 and the reception side terminal 200, and may perform speech recognition based on a specific speech process supporting device representing more excellent connection states.

To this end, as shown, the first controller 160 of the transmission side terminal 100 may include a first network packing/unpacking supporter 161, a first network monitor 162, a first TTS/STT determinator 163, a first STT manager 164, a first TTS manager 165, a media synchronizer 166, a first speech processor 167, a first text processor 168, and a first video processor 169.

The first controller 160 having a construction mentioned above may control signals and data transception for communication service connection with the reception side terminal 200. Particularly, the first controller 160 may support transmission of a call connection request message for supporting a specific type of a communication service with the reception side terminal 200. During this procedure, a processing for supporting an STT service may be supported according to an STT service operation request of at least one of the transmission side terminal 100 and the reception side terminal 200. For example, when receiving an STT service operation request from the reception side terminal 200, the second controller 160 may collect information about a connection state of the first speech process supporting device 400. To this end, the first controller 160 may provide a preset test signal to the first speech process supporting device 400, and may collect reception state information corresponding to a speech recognition result with respect to a corresponding test signal. The reception state information may include speech information where information is transceived according to a connection state between the transmission side terminal 100 and the first speech process supporting device 400. The first controller 160 may compare reception state information between the reception side terminal 200 and the second speech process supporting device 500 with reception state information of the transmission side terminal 100 to control such that a terminal having excellent reception state information performs speech recognition. To this end, the first controller 160 may receive the reception state information of the reception side terminal 200 from the reception side terminal 200. Meanwhile, when a terminal determining execution of speech recognition is designed by the reception side terminal 200, the first controller 160 may control such that reception state information is transmitted to the reception side terminal 200.

The first network monitor 162 confirms a packet to be transceived based on the first network packing/unpacking supporter 161, and evaluates a network for confirming a state of the network based on the confirmed packet. The first network monitor 162 may collect network evaluation information capable of confirming a network state between the transmission side terminal 100 and the communication system 300 and a network state between the transmission side terminal 100 and the first speech process supporting device 400. In this case, the network monitor 162 may transmit a test signal for confirming a network state through the network packing/unpacking supporter 161, and receives feedback of a corresponding signal to confirm the network state or to receive network evaluation information with respect to a network state from the reception side terminal 200. The first network monitor 162 may receive network evaluation information associated with a network state from constituent elements of a network, for example, a base station or routers constituting the communication system 300, and elements switching other data packet. Particularly, the network evaluation information collected by the first network monitor 162 may include reception state information with respect to a data transmission rate, a data transmission delay degree, and a data loss rate between the first speech process supporting device 400 and the transmission side terminal 100. The first network monitor 162 may transfer the reception state information to the first TTS/STT determinator 163.

The first TTS/STT determinator 163 controls the first STT manager 164 and the first TTS manager 165 to perform at least one of the STT service and the TTS service of the transmission side terminal 100. The first TTS/STT determinator 163 may receive network evaluation information, particularly, first reception state information between the transmission side terminal 100 and the first speech process supporting device 400 and second reception state information between the reception side terminal 200 and the second speech process supporting device 500 from the first network monitor 162, and may control the first STT manager 164 and the first TTS manage 165 based on the received network evaluation information. When the first reception state information is better than the second reception state information, the first TTS/STT determinator 163 may control at least one of the first STT manager 164 and the first TTS manger 165 to connect the first speech process supporting device 400. Simultaneously, the first TTS/STT determinator 163 may provide information reporting that the transmission side terminal 100 will process speech recognition to the reception side terminal 200.

The first network packing/unpacking supporter 161 packs data for transmitting data of the transmission side terminal 100 and unpacks data received from the reception side terminal 200. The first network packing/unpacking supporter 161 may collect network evaluation information under control of the first network monitor 162, and transfer the collected network evaluation information to the first network monitor 162. Further, the first network packing/unpacking supporter 161 may transmit reception state information of the transmission side terminal 100 to the reception side terminal 200 under control of the first network monitor 162.

Meanwhile, if a communication service channel with the reception side terminal 200 is formed, the first network packing/unpacking supporter 161 may pack and transmit various data through a corresponding communication service channel. For example, the first network packing/unpacking supporter 161 packs the collected image and speech from the camera according to a preset standard while performing an image call with the reception side terminal 200 and transmit the packed image and speech to the reception side terminal 200. The first network packing/unpacking supporter 161 may confirm data received from the reception side terminal 200 to extract data corresponding to the image and speech from corresponding packets. Particularly, when the transmission side terminal 100 performs speech recognition based on the first speech process supporting device 400 or a speech recognition database stored in the first memory 150 to generate text, the first network packing/unpacking supporter 161 may transmit a corresponding text to the reception side terminal 200. In this case, the first network packing/unpacking supporter 161 may combine the corresponding text with the image data or may transmit the corresponding text to be overlaid with the image data.

When it is determined that the reception side terminal 200 performs a speech recognition function according to the network evaluation, the first network packing/unpacking supporter 161 may not perform a speech recognized text transmission function but may transmit data according to a type of a communication service connected with the reception side terminal 200. For example, the first network packing/unpacking supporter 161 may transmit at least one of image data, speech data, and character input to the reception side terminal 200 according to a type of a communication service. Particularly, speech data corresponding to a speech signal collected by the first microphone 131 may be transmitted to the reception side terminal 200 without separate conversion of the text.

Meanwhile, the first network packing/unpacking supporter 161 may receive data including the speech recognized text from the reception side terminal 200. In this case, the first network packing/unpacking supporter 161 may extract a speech recognized text from corresponding data and output the extracted speech recognized text on the first display unit 140. Data including the speech recognized text may include data obtained by combining or overlaying the speech recognized text with the image data, data obtained by combining or overlaying the speech recognized text with a preset specific image, and data including only the speech recognized text.

The speech processor 167 converts a speech signal collected by the first microphone 131 into speech data. The speech data processed by the first speech processor 167 may be transferred to the first STT manager 164.

The first STT manager 164 may recognize the speech data provided from the first speech processor 167 using at least one of the first speech process supporting device 400 and the speech recognition database 153 according to presence of support of the STT service. When it is determined that the reception side terminal 200 processes a speech recognition function, the first STT manager 164 may transfer corresponding speech data to the first network packing/unpacking supporter 161 without performing a separate speech recognition function. Meanwhile, according to a system design scheme, the speech data processed by the first speech processor 167 may be directly transferred to the first network packing/unpacking supporter 161 without passing through the first STT manager 164.

The first text processor 168 processes text of the transmission side terminal 100. If a signal for inputting text is received from a first input unit 120 including a key pad, a key board, a key map of a touch type, and a key button or a first display unit 140 having an input function, the first text processor 168 writes text corresponding to the input signal. The first text processor 168 may transfer the input text to the first TTS manager 165 according to presence of support of the TTS service. The first text processor 168 may directly transfer the input text to the first network packing/unpacking supporter 161 without being transferred to the first TTS manager 165.

The first TTS manager 165 converts text provided from the first text processor 168 into a speech according to TTS service support setting from the first TTS/STT determinator 163. When it is determined that the transmission side terminal 100 supports the TTS service, the first TTS manager 165 may perform connection of the first speech process supporting device 400 supporting the TTS service. The first TTS manager 165 may call the speech conversion database 155 stored in the first memory 150 to perform conversion of speech data corresponding to an input text. The speech data converted from the text by the TTS manager 165 is transferred to the first network packing/unpacking supporter 161 so the speech data may be transferred to the reception side terminal 200. The speech data converted by the first TTS manager 165 may be transferred to the media synchronizer 166 while an image call service is supported.

When a user of the transmission side terminal 100 generates an input signal for operating an image call service with the reception side terminal 200, the first video processor 169 activates a camera to convert a received image signal into image data. The image data processed by the first video processor 169 may be transferred to the media synchronizer 166.

The media synchronizer 166 synchronizes data of the transmission side terminal 100 with each other. The media synchronizer 166 may synchronize speech data with image data while the transmission side terminal 100 operates an image call service. Particularly, when it is determined that the transmission side terminal 100 supports at least one of the TTS service and the STT service according to network evaluation, the media synchronizer 166 according to exemplary embodiments of the present invention may synchronize at least one of text converted from the speech and speech data converted from the text provided from the first STT manager 164 and the first TTS manager 165 with the image data. To this end, the media synchronizer 166 may confirm time stamps of respective data. The time stamp is used to synchronize at least one of collected speech data and text data during a procedure of generating the image data with a collection time point of the image data. For example, the time stamp may be equally applied to speech data and text data collected when the image data are collected so that time points of respective data may correspond to each other.

The media synchronizer 166 may generate new image data corresponding to one frame by synchronizing a speech recognized text with image data, and may transfer the new image data to the first network packing/unpacking supporter 161. Further, the media synchronizer 166 may synchronize speech data converted from text with image data to arrange data so that corresponding speech data are arranged at an image frame corresponding to a time stamp of speech data, and may transfer the data to the first network packing/unpacking supporter 161.

Meanwhile, a second controller 260 of a reception side terminal 200 in a system for operating a communication service according to a third exemplary embodiment of the present invention may include a noise measuring unit 201, a second network packing/unpacking supporter 261, a second network monitor 262, a second TTS/STT determinator 263, a second STT manager 264, a second TTS manager 265, an image combiner 266, a second speech processor 267, a second text processor 268, and a second video processor 269. When it is determined that the reception side terminal 200 supports at least one of the STT service and the TTS service according to network evaluation during a cooperation with the transmission side terminal 100, the second controller 260 having a construction mentioned above may perform connection with the second speech process supporting device 500. The second controller 260 may support at least one of the STT service and the TTS service using a speech recognition database or a speech conversion database stored in the second memory 250. When it is determined that the transmission side terminal 100 supports at least one of the STT service and the TTS service, the second controller 260 may receive a speech recognized text or speech data converted from the text from the transmission side terminal 100 and may output the received text or speech data individually or together with the image data.

In order to the foregoing function, the second network monitor 262 may collect information for evaluating the network. For example, the second network monitor 262 may collect network evaluation information including reception state information for determining whether to perform at least one of the STT service and the TTS service by the reception side terminal 200. For example, the second network monitor 262 may collect reception state information including a data transmission delay degree, a data transmission rate, and a data loss rate between the second speech process supporting device 500 and the reception side terminal 200. To this end, the second network monitor 262 may transmit a preset test signal to the second speech process supporting device 500 and may receive a corresponding feedback signal. Further, the second network monitor 262 may compare the collected reception state information with reception state information of the transmission side terminal 100 to determine whether the collected reception state information or reception state information of the transmission side terminal 100 is excellent. When it is designed that the transmission side terminal 100 compares the collected reception state information with the reception state information of the transmission side terminal 100, the reception side terminal 200 may receive an excellent state of the reception state information from the transmission side terminal 100. For example, the reception side terminal 200 may receive determination with respect to presence of connection to a second speech process supporting device 500 for supporting the STT service or the TTS service from the transmission side terminal 100. When receiving the determination, the second network monitor 262 may transfer corresponding information to the second TTS/STT determinator 263.

The second network packing/unpacking supporter 261 transfers and receives signals so that the second network monitor 262 may collect network evaluation information. Moreover, the second network packing/unpacking supporter 261 may unpack signals provided from the transmission side terminal 100 according to presence of connection of the second speech process supporting device 500 of the reception side terminal 200, and may transfer the unpacked signals to the second TTS/STT determinator 263, the second TTS manager 265, and the second STT manager 264.

In detail, when it is determined that the transmission side terminal 100 performs connection of the first speech process supporting device 400, the second network packing/unpacking supporter 261 may receive text converted from the speech provided from the transmission side terminal 100 and speech data converted from the text. Then, the second network packing/unpacking supporter 261 may transfer the speech data converted from the text to the second speech processor 267, and may transfer the text converted from the speech to the second text processor 268. In this case, the second network packing/unpacking supporter 261 may transfer the speech data to the second text processor 267 through the second STT manager 265, and may transfer the text to the second text processor 268 through the second STT manger 264. During this procedure, the second TTS manager 265 and the second STT manager 264 may transfer only the text and the speech data without separately processing the signals.

Meanwhile, when the reception side terminal 200 performs connection of the second speech process supporting device 500 for supporting the STT service or the TTS service, the second network packing/unpacking supporter 261 may transfer the received text to the second TTS manager 265. Then, the second TTS manager 265 may convert the text into a speech and transfer the speech to the second speech processor 267. When the reception side terminal 200 performs connection of the second speech process supporting unit 500 for supporting the STT service or the TTS service, the second network packing/packing supporter 261 may transfer the received speech data to the second STT manager 264. Then, the second STT manager 264 may transfer corresponding speech data to the second speech process supporting device 500 so that the speech data may be converted into text. The converted text may be transferred to the second text processor 268. As described above, the second network packing/unpacking supporter 261 may differently process data transferred to the second STT manager 264 and the second TTS manager 265 according to presence of connection of the first speech process supporting device 400 of the transmission side terminal 100 and presence of connection of the second speech process supporting device 500 of the reception side terminal 200.

The second TTS/STT determinator 263 determines presence of support of the STT service and the TTS service in the reception side terminal 200. For example, the second TTS/STT determinator 263 may receive network evaluation information for supporting the STT service or the TTS service from the second network monitor 262, and may determine support of a corresponding service based on the network evaluation information. The second TTS/STT determinator 263 may determine presence of support of the STT service or the TTS service according to user input. Particularly, when it is determined that the reception side terminal 200 performs connection of the second speech process supporting device 500, the second TTS/STT determinator 263 may control the second STT manager 264 and the second TTS manager 265 so that execution of a corresponding service is requested.

The noise measuring unit 201 may activate the second microphone 231 to collect a peripheral audio signal of the reception side terminal 200 and may detect a noise measuring value included in the collected audio signal. The detected noise measuring value may be transferred to the second TTS/STT determinator 263. In order to measure a noise, the noise measuring unit 201 may use a previously designed filter, and may measure a noise degree included in a band other than a speech signal band. The second TTS/STT determinator 263 may compare a noise measuring value provided from the noise measuring unit 201 with a preset reference value to automatically determine whether to perform the STT service or the TTS service.

When receiving a request of performing the TTS service from the second TTS/STT determinator 263, the second TTS manager 265 transfers text provided from the second network packing/unpacking supporter 261 to the second speech process supporting device 500 so that speech data corresponding to the text is converted. Further, the second TTS manager 265 may transfer the speech data to the second speech processor 267. Meanwhile, the second TTS manager 265 may control such that a speech conversion database stored in the second memory 250 for supporting the TTS service is used.

When receiving a request of performing the STT service from the second TTS/STT determinator 263, the second STT manager 264 may control such that the speech data provided from the second network packing/unpacking supporter 261 is transferred to the second speech process supporter 500. Further, the second STT manager 264 may transfer text converted from a speech provided from the second speech process supporter 500 to the second text processor 268. In this case, the second STT manager 264 may control such that a speech recognition database stored in the second memory is used in order to convert speech data provided from the second network packing/unpacking supporter 261 into text.

The second speech processor 267 may convert speech data provided from the second TTS manager 265 in a signal format which may be output to a speaker. The second speech processor 267 may transfer the converted speech signal to the speaker, an earphone, and another speech signal output device. The speech signal output from the second speech processor 267 may be a speech signal collected by a first microphone 131 of the transmission side terminal 100, and a speech signal converted from the text from the transmission side terminal 100 using the second speech process supporter 500 or a speech conversion database stored in the second memory 250.

The second text processor 268 may convert text data provided from the second STT manager 264 into a format of a text image or a character which may be output to the second display unit 240. The second text processor 268 may transfer the converted text to the second display unit 240 or the image combiner 266. The text provided from the second text processor 268 may be text input through a text creator of the transmission side terminal 100 or text converted from the speech signal provided from the transmission side terminal 100 using the second speech process supporting device 500 or a speech recognition database stored in the second memory 250.

The second video processor 269 may process and convert image data provided from the second network packing/unpacking supporter 261 into a format which may be output to the second display unit 240. An image frame processed by the second video processor 269 may be transferred to the image combiner 266.

The image combiner 266 combines text provided from the second text processor 268 with the image frame provided from the second video processor 269 and transfer the combined image frame to the second display unit 240. The image combiner 266 may perform synchronization during a procedure of combining the text with the image frame. To this end, the image combiner 266 may receive time stamp information of corresponding data while transferring the text and the image frame.

Meanwhile, the foregoing exemplary embodiment of the present invention has illustrated the first speech process supporting device 400 and the second speech process supporting device 500 as one element. However, exemplary embodiments of the present invention are not limited thereto. Speech process supporting devices for supporting the STT service and the TTS service of the transmission side terminal 100 may be individually provided, respectively, and the second speech process supporting device 500 of the reception side terminal 200 may be provided as a separate element in order to support each service.

Figure 18:
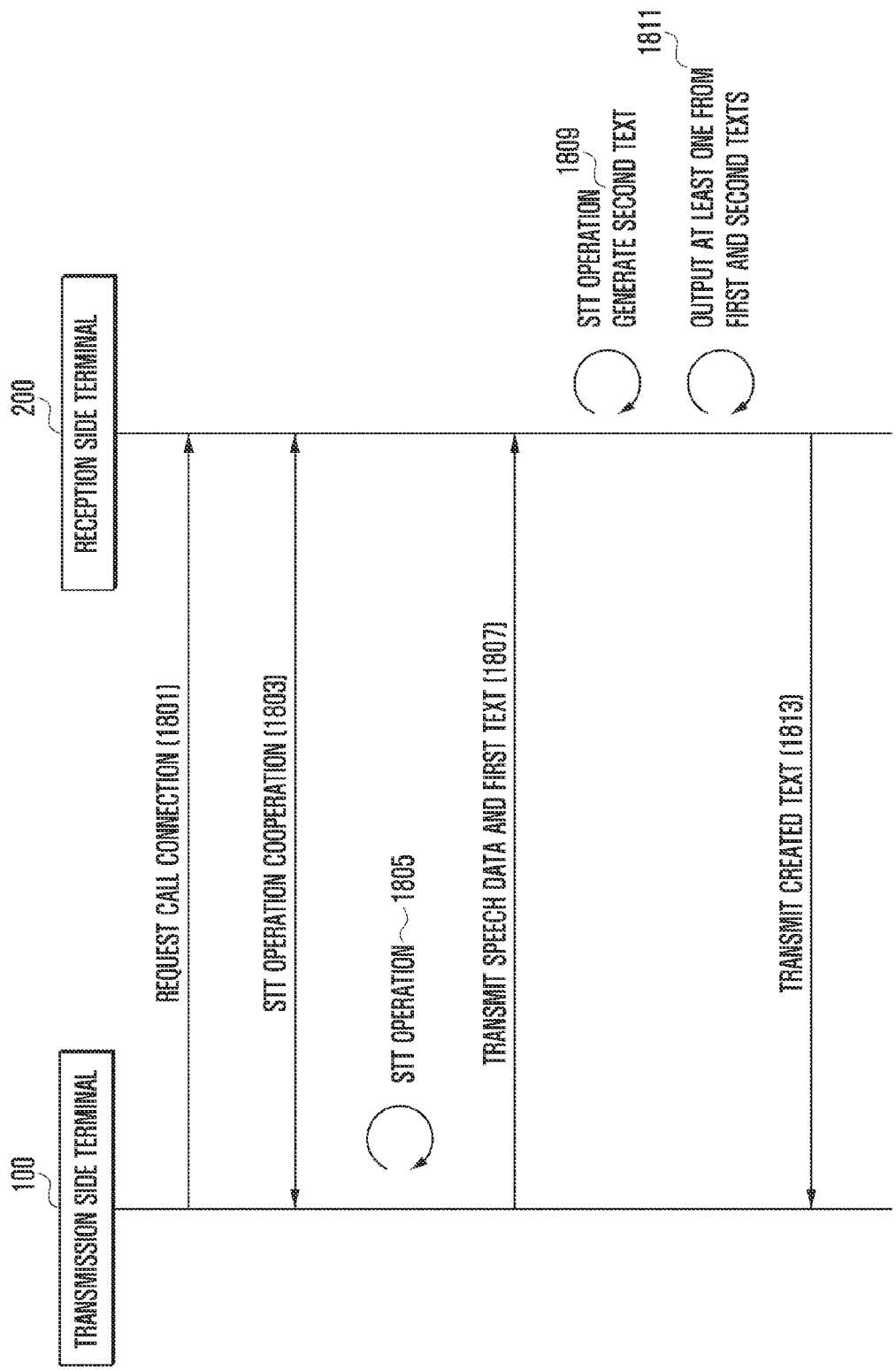
FIG. 18 is a signal flowchart illustrating an operating method for a communication service according to the third exemplary embodiment of the present invention.

FIG. 18 is a signal flowchart illustrating an operating method for a communication service according to the third exemplary embodiment of the present invention. The following description will be made while focusing on support of the STT service between the TTS service and the STT service for convenience of the description.

Referring to FIG. 18, in the method of operating the communication service according to the third exemplary embodiment of the present invention, a transmission side terminal 100 may transmit a message for requesting call connection to a reception side terminal 200 in step 1801. To this end, the transmission side terminal 100 may generate a message through input of a phone number of the reception side terminal 200 and transmit a corresponding message to the reception side terminal 200 through a communication system 300.

When the reception side terminal 200 having receiving a call connection request message accepts call connection, the transmission side terminal 100 and the reception side terminal 200 may perform cooperation for an STT operation in step 1803. During this procedure, the transmission side terminal 100 may collect first reception state information with a first speech process supporting device 400, and the reception side terminal 200 may collect second reception state information with the second speech process supporting device 500.

When the first reception state information is better than the second reception state information, the transmission side terminal 100 may perform the STT service based on the first speech process supporting device 400 in step 1805. For example, the transmission side terminal 100 may recognize a speech signal collected by the first microphone 131 and converts the recognized speech signal into a first text, and may transfer the first text to the reception side terminal 200 in step 1807. The transmission side terminal 100 may further transmit speech data obtained by processing the speech signal collected by the first microphone 131 to the reception side terminal 200 in step 1807.

Meanwhile, when the second reception state information is better than the first reception state information, the transmission terminal 100 omits step 1805 and may transmit speech data obtained by processing the speech signal collected by the first microphone to the reception side terminal 200 in step 1807. Then, the reception side terminal 200 may recognize speech data provided from the transmission terminal 100 based on the second speech process supporting device 500 and convert the recognized speech data into a second text in step 1809.

Meanwhile, when receiving a first text from the transmission side terminal 100 at step 1811, the reception side terminal 200 outputs the first text to the second display unit 240. When the second text is generated based on the second speech process supporter 500, the reception side terminal 200 may output the second text to the second display unit 240. The reception side terminal 200 may transmit text created through a text creator to the transmission side terminal 100 in step 1813.

The method of operating a communication service according to the third exemplary embodiment of the present invention uses a speech process supporting device of a specific terminal side according to a reception state between speech process supporting devices of the transmission side terminal 100 and the reception side terminal 200. However, in the method of operating a communication service according to the exemplary embodiment of the present invention, the transmission side terminal 100 may transmit both of a first text generated based on the speech process supporting device 400 and speech data corresponding to a speech signal collected based on the first microphone 131 the reception side terminal 200. Further, the reception side terminal 200 may recognize the speech data provided from the transmission side terminal 100 to generate a second text, and may output at least one of the first text and the second text on the second display unit 240.

Accordingly, the method of operating a communication service according to exemplary embodiments of the present invention may operate two speech process supporting devices in an environment of a low reliability for speech recognition so that the user of the transmission side terminal 100 may exactly recognize information to be transferred.

Figure 19:
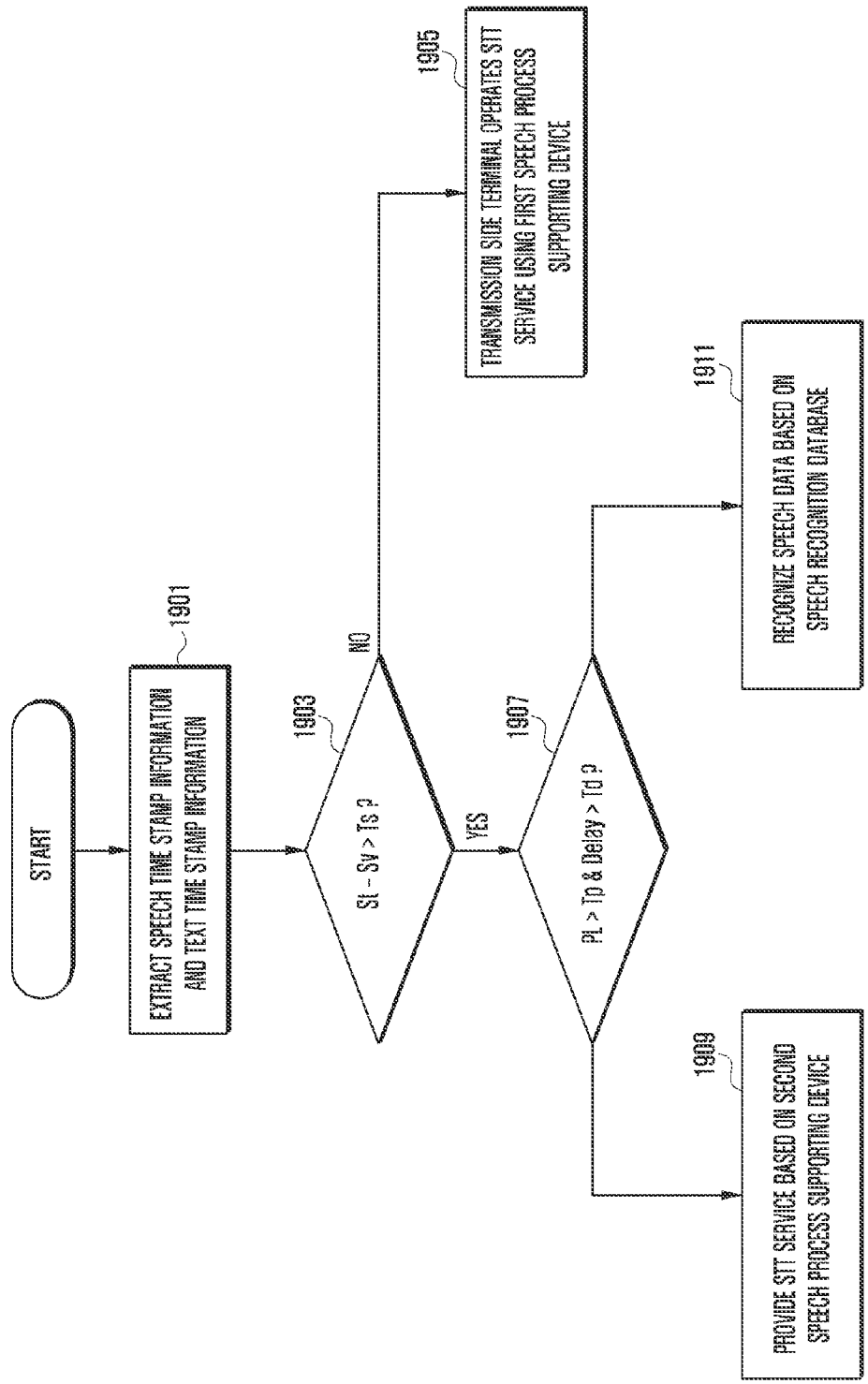
FIG. 19 is a flowchart illustrating a method of operating a communication service by a reception side terminal according to the third exemplary embodiment of the present invention.

FIG. 19 is a flowchart illustrating a method of operating a communication service by a reception side terminal according to the third exemplary embodiment of the present invention. For example, FIG. 19 is a flowchart illustrating a method of operating an STT service of the reception side terminal during a procedure of operating a communication service according to the third exemplary embodiment of the present invention.

Referring to FIG. 19, a reception side terminal 200 may firstly receive a preset test signal or speech data from a transmission side terminal 100. Then, the reception side terminal 200 may recognize the received speech data using a second speech process supporting device 500 in step 1901. In this case, the reception side terminal 200 extracts speech time stamp information Sv of the speech data and text time stamp information St of a speech recognized text based on the second speech process supporting device 500.

Next, the reception side terminal 200 subtracts the speech time stamp information Sv from the text time stamp information St, and determines whether a subtraction result is greater than a preset reference value Ts in step 1903. The reference value Ts may be a value obtained by subtracting the speech time stamp information Sv from the speech recognized text time stamp information St based on the first speech process supporting device 400 by the transmission side terminal 100, and a reliability value with respect to the speech recognition result of the first speech process supporting device 400 may be further reflected thereon. For example, the reception side terminal 200 may determine whether a speech recognition processing of speech data of the transmission side terminal 100 is excellent in step 1903.

When the subtraction result is less than the reference value Ts, for example, when the speech recognition processing of the transmission side terminal 100 using the first speech is faster than speech recognition processing of the reception side terminal 200, the reception side terminal 200 may guide so that the transmission side terminal 100 performs the STT service in step 1905. To this end, the reception side terminal 200 may transmit a message requesting to the transmission side terminal 100 to recognize the speech data and to transmit the text to the transmission side terminal 100.

Meanwhile, when the subtraction result is greater than the reference value Ts, for example, when speech recognition processing of the reception side terminal 200 using the second speech process supporting device 500 is better than speech recognition processing of the transmission side terminal 100 using the first speech process supporting device 400 at step 1903, the reception side terminal 2000 may determine whether a packet loss rate PL is greater than a first preset reference value Tp and a transmission delay degree is greater than a second preset reference value Td in step 1907. For example, the reception side terminal 200 may determine whether a reception state of the second speech process supporting device 500 is excellent, which is greater than a preset reference value. In this step, when the packet loss rate and the transmission delay degree are less than the reference values, the reception side terminal 200 may control such that recognition of the speech data provided from the transmission side terminal 100 is performed based on the second speech process supporting device 500 in step 1909. When the packet loss rate and the transmission delay degree are less than the reference values, the reception side terminal 200 may recognize speech data based on a speech recognition database stored in the second memory 250 in step 1911.

The reception side terminal 200 may inspect a reception state with the second speech process supporting device 500 at a predetermined period or in real time. Accordingly, the reception side terminal 200 may adaptively perform an internal speech recognition procedure based on a speech recognition database stored in the second memory 250 and an external speech recognition procedure based on the second speech process supporting device 500 according to a network state.

Meanwhile, a screen interface for operating a communication service according to the third exemplary embodiment of the present invention may be one of a screen interface illustrated in FIGS. 9 to 12 and the screen interface illustrated in FIG. 16 when one of the first speech process supporting device 400 or the second speech process supporting device 500 is selected according to a communication service connection cooperation result. For example, when the first speech process supporting device 400 is used to support at least one of the STT service and the TTS service, the screen interface illustrated in FIGS. 9 to 12 may be provided from a transmission side terminal and a reception side terminal. Further, when the second speech process supporting device 500 is used to support at least one of the STT service and the TTS service, the screen interface illustrated in FIG. 16 may be provided to the reception side terminal.

Figure 20:
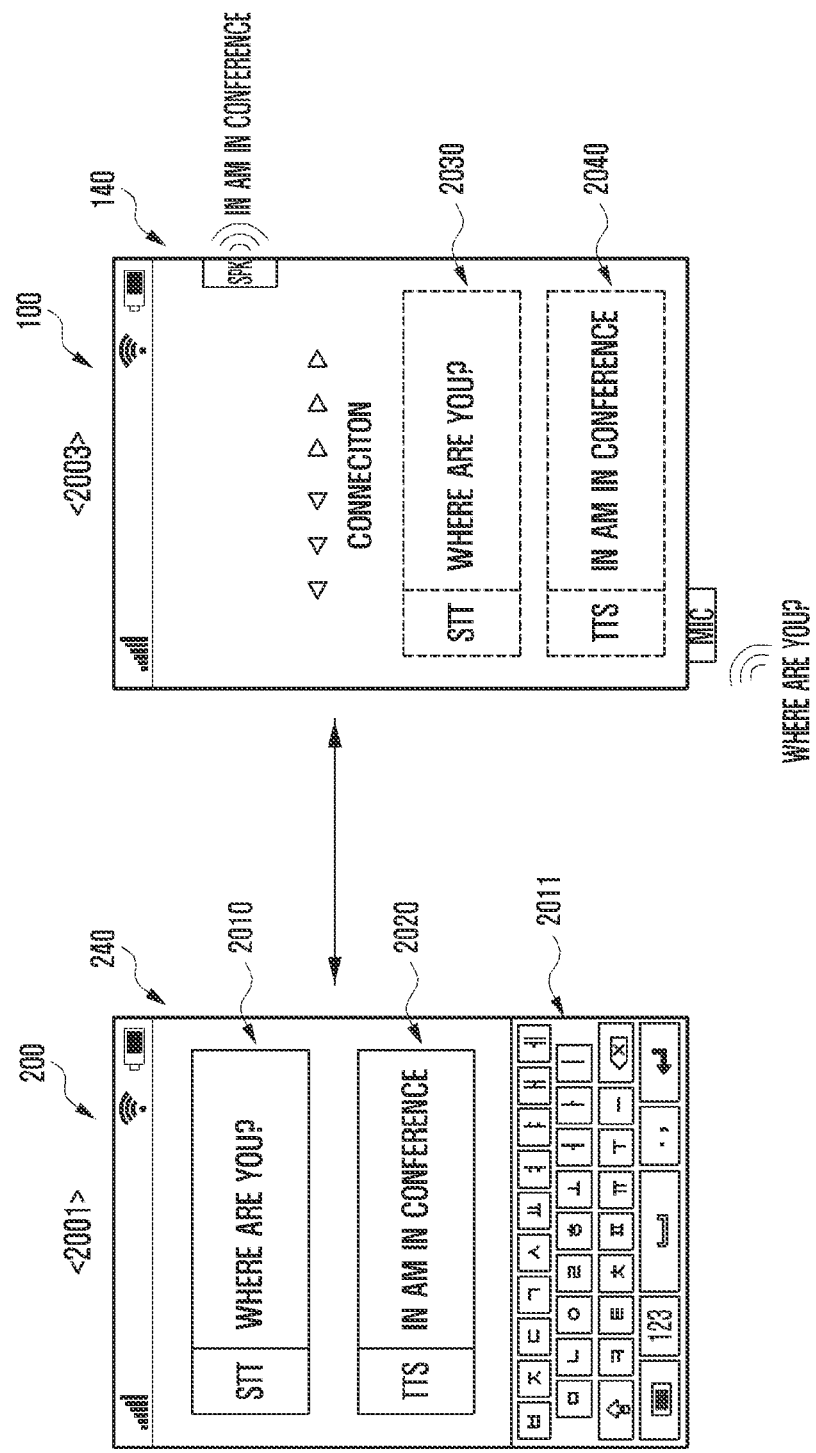
FIG. 20 is a diagram illustrating an example of a screen interface of a transmission side terminal and a reception side terminal according to simultaneous operation of an STT service and a TTS service according to an exemplary embodiment of the present invention.

FIG. 20 is a diagram illustrating an example of a screen interface of a transmission side terminal and a reception side terminal according to simultaneous operation of an STT service and a TTS service according to an exemplary embodiment of the present invention.

Referring to FIG. 20, when receiving a specific type of a communication service connection request from the transmission side terminal 100, the reception side terminal 200 may accept a specific type of communication service connection according to a user operation. Particularly, the reception side terminal 200 may provide a screen interface capable of selecting at least one of an STT service and a TTS service. When the user selects activation of the STT service and the TTS service, the reception side terminal 200 may operate the STT service and the TSS service. During this procedure, when the first speech process supporting device 400 is designed or determined to be used in order to operate the STT service, the reception side terminal 200 may request an operation of the STT service to the transmission side terminal 100. When the first speech process supporting device 400 is designed or determined to be used in order to operate the TTS service, the reception side terminal 200 may transfer a message requesting an operation of the TTS service to the transmission side terminal 100. When the STT service and the TTS service is performed based on the second speech process supporting device 500 and a database stored in the second memory 250, the reception side terminal 200 may not separately request a service operation to the transmission side terminal 100.

Meanwhile, the reception side terminal 200 may output a reception side STT service output region 2010 for supporting the STT service and a reception side TTS service output region 2020 for supporting the TTS service at one side of the second display unit 240. Accordingly, a user of the reception side terminal 200 may output text provided from the transmission side terminal 100 to the reception side STT service output region 2010. The text output to the reception side STT service output region 2010 may be a speech recognized result based on the first speech process supporting device 400 and a database stored in the first memory 150 by the transmission side terminal 100 or a speech recognized result based on the second speech process supporting device 500 and a database stored in the second memory 250 by the reception side terminal 200.

As described above, the reception side terminal 200 may output text input by the user to the reception side TTS service output region 2020 in order to support a TTS service. In this case, the reception side terminal 200 may output a text creator 2411 at one side of the second display unit 240 for inputting text. In this case, when the text input is completed, the reception side terminal 200 may remove the text creator 2011 from the second display unit 240. Only schedule content is displayed on the reception side STT service output region 2010 and the reception side TTS service output region 2020 in a picture 2001, but the transmission side terminal 100 and additional transceived information may be further displayed according to display and removal of the text creator 2411. For example, when the text creator 2411 is output on the second display unit 240, the reception side terminal 200 outputs the latest transceived information to the reception side STT service output region 2010 and the reception side TTS service output region 2020 in consideration of a picture size. When the text creator 2411 is removed from the first display unit 240, the reception side terminal 200 may support screen resizing and display format change so that a predetermined number of transceived information is output to at least one of the reception side STT service output region 2010 and the reception side TTS service output region 2020.

Meanwhile, the transmission side terminal 100 may support a communication service based on a speech input without separately outputting text. However, as illustrated in a picture 2003, the transmission side terminal 100 may provide the transmission side STT service output region 2030 and the transmission side TTS service output region 2040 on the first display unit 140 so that service content provided according to the user request or terminal setting may be confirmed. Accordingly, the user of the transmission side terminal 100 may confirm as to which text speech input transmitted to the reception side terminal 200 is transferred. The text output to the transmission side STT service output region 2030 may be one of text generated based on the first speech process supporting device 400 and a database stored the first memory 150 or text feedback from the reception side terminal 200. The user of the transmission side terminal 100 may additionally confirm which text inputs the user of the reception side terminal 200 through the transmission side TTS service output region 2040. The transmission side STT service output region 2030 and the transmission side TTS service output region 2040 may be removed according to user setting. When the user moves the terminal within a predetermined distance from a cheek or an ear, the transmission side STT service output region 2030 and the transmission side TTS service output region 2040 may be automatically removed. For approach recognition of a terminal, the transmission side terminal 100 may operate an illumination sensor or a proximity sensor.

As described above, the method of operating a communication service according to the exemplary embodiment of the present invention may adaptively operate a service according to various environments of the user during an operation procedure of a communication service. Accordingly, the user may select a communication service of a suitable scheme according to a communication service environment of the user so that the information may be exactly transferred and the possibility of losing information or the misunderstanding possibility may be reduced.

The foregoing transmission side terminal and reception side terminal may further include various additional modules according to provision forms. For example, when the terminal is a communication terminal, it may include constructions that are not mentioned such as a near field communication module for near field communication, an interface exchanging data in a wired communication scheme or a wireless communication scheme of the terminal, an Internet communication module communicating with an Internet to perform an Internet function, and a digital broadcasting module receiving and broadcasting digital broadcastings. Because the structural elements can be variously changed according to convergence trend of a digital device, no elements can be listed. However, the portable terminal may include structural elements equivalent to the foregoing structural elements. Further, the terminal according to exemplary embodiments of the present invention may be substituted by specific constructions in the foregoing arrangements according to the provided form or another structure. This can be easily understood to those skilled in the present art.

For example, the terminals according to the exemplary embodiment of the present invention may include an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld Personal Computer (PC), as well as various mobile communication terminals corresponding to various communication systems.

As described above, according to the method and the system for operating a communication service according to exemplary embodiments of the present invention, the present invention can improve a communication environment weak to situations or environments by providing suitable content transfer function according to a communication service operation environment of the user, thereby providing excellent information transfer performance.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A system for operating a communication service, the system comprising:
    a transmission side terminal for requesting connection of the communication service, and for converting reception data or user input data according to at least one of input/output modes and input/output modes determined by a user after the communication service is connected;
    a reception side terminal for receiving a communication service connection acceptance request according to the request the connection of the communication service, for starting the communication service using the at least one of input/output modes and input/output modes determined by a user when the communication service connection acceptance request is accepted, for transmitting reception data or user input data to a speech process supporting device to convert the user input data or the reception data, for displaying conversion data corresponding to the reception data, and for transmitting conversion data corresponding to the user input data to the transmission side terminal; and
    a speech process supporting device for receiving the reception data or the user input data from the reception side terminal, for converting input speech data corresponding the reception data or the user input data into text data or converting input text data corresponding the reception data or the user input data into speech data to create conversion data corresponding to the reception data or the user input data, and for transmitting the conversion data to the reception side terminal.

2. The system of claim 1, wherein the transmission side terminal transmits a message requesting to operate at least one of a Speech To Text (STT) service providing a speech recognition based text and a Text To Speech (TTS) service converting text into speech data to the reception side terminal according to the input/output modes.

3. The system of claim 1, wherein the reception side terminal requests to the transmission side terminal to operate at least one of a Speech To Text (STT) service providing a speech recognition based text and a Text To Speech (TTS) service converting text into speech data to the reception side terminal when the communication service connection request is received from the transmission side terminal according to the input/output modes.

4. The system of claim 1, wherein at least one of the transmission side terminal and the reception side terminal requests to automatically operate at least one of a Speech To Text (STT) service providing a speech recognition based text and a Text To Speech (TTS) service converting text into speech data based on at least one of network evaluation information including at least one of a loss rate of a data packet and a transmission delay degree transceived between the transmission side terminal and the reception side terminal, peripheral environment information of the transmission side terminal, and peripheral environment information of the reception side terminal.

5. The system of claim 4, wherein the peripheral environment information comprises at least one of peripheral noise information, moving information, location information, illumination information, and current time information of at least one of the transmission side terminal and the reception side terminal.

6. The system of claim 1, wherein the transmission side terminal and the reception side terminal form a separate channel for supporting at least one of a Speech To Text (STT) service providing a speech recognition based text and a Text To Speech (TTS) service converting text into speech data in a state in which a chatting service channel is formed.

7. The system of claim 1, wherein the transmission side terminal and the reception side terminal form a separate channel for supporting at least one of a Speech To Text (STT) service providing a speech recognition based text and a Text To Speech (TTS) service converting text into speech data in a state in which an image call service channel is formed.

8. The system of claim 7, wherein the transmission side terminal combines image data to be transmitted for supporting the image call service with text generated based on an operation of the STT service, and transmits the combined data to the reception side terminal.

9. The system of claim 8, wherein the transmission side terminal synchronizes the text with the image data using time stamp information collected when a speech signal corresponding to the generated text is collected and time stamp information of the image data collected when the speech signal is collected.

10. The system of claim 8, wherein the transmission side terminal controls such that a previous speech recognized text is synchronized with the image data for a predetermined time before text obtained by recognizing a newly input speech signal, and controls such that an input text when the speech recognized text is input is synchronized with the image data.

11. The system of claim 1, wherein the transmission side terminal comprises a first memory including at least one of a speech recognition database recognizing a collected speech signal and a speech conversion database converting an input text into a speech.

12. The system of claim 11, wherein the transmission side terminal controls such that at least one of a Speech To Text (STT) service providing a speech based on the speech recognition database as text and a Text To Speech (TTS) service converting text into speech data is operated according to at least one of a connection state and a user operation of the speech process supporting device.

13. The system of claim 1, wherein the transmission side terminal comprises a first display unit including at least one of:
- a pop-up window for selecting at least one from a Speech To Text (STT) service providing a speech recognition based text and a Text To Speech (TTS) service converting text into speech data;
- a picture for guiding connection of the speech process supporting device according to the operation of the STT service; and
- a picture including at least one of a region for outputting a speech recognized text and a region text created and transmitted by the reception side terminal.

14. The system of claim 1, wherein the reception side terminal comprises a second display unit including at least one of:
- a pop-up window for selecting at least one from a Speech To Text (STT) service providing a speech recognition based text and a Text To Speech (TTS) service converting text into speech data when the call connection request is received; and
- a picture including at least one of a region for outputting text provided from the transmission side terminal, a region for outputting text input through a text creator, and the text creator for creating the text.

15. A method of operating a communication service, the method comprising:
- receiving, by a reception side terminal, a communication service connection request;
- forming, by the reception side terminal, a communication path with a transmission side terminal by accepting the communication service connection request;
- identifying, by the reception side terminal, input/output modes;
- receiving, by the reception side terminal, reception data from the transmission side terminal or user input data from a user;
- transmitting, by the reception side terminal, the reception data or the user input data to a speech process supporting device to convert the reception data or the user input;
- receiving, by the reception side terminal, conversion data corresponding to the reception data or the user input data from the speech process supporting device, the conversion data being created by converting input speech data corresponding the reception data or the user input data into text data or converting input text data corresponding the reception data or the user input data into speech data;
- displaying, by the reception side terminal, conversion data corresponding to the reception data; and
- transmitting, by the reception side terminal, conversion data corresponding to the user input data to the transmission side terminal.

16. The method of claim 15, wherein the receiving of the communication service connection request comprises transmitting a message requesting to operate at least one of a Speech To Text (STT) service providing a speech recognition based text and a Text To Speech (TTS) service converting text into speech data to the reception side terminal by the transmission side terminal according to the input/output modes.

17. The method of claim 15, wherein the receiving of the communication service connection request comprises requesting to the transmission side terminal to operate at least one of a Speech To Text (STT) service providing a speech recognition based text and a Text To Speech (TTS) service converting text into speech data to the reception side terminal by the reception side terminal when the communication service connection request is received from the transmission side terminal according to the input/output modes.

18. The method of claim 15, wherein the receiving of the communication service connection request comprises requesting to automatically operate at least one of a Speech To Text (STT) service providing a speech recognition based text and a Text To Speech (TTS) service converting text into speech data based on at least one of network evaluation information including at least one of a loss rate of a data packet and a transmission delay degree transceived between the transmission side terminal and the reception side terminal, peripheral environment information of the transmission side terminal, and peripheral environment information of the reception side terminal by at least one of the transmission side terminal and the reception side terminal.

19. The method of claim 18, wherein the peripheral environment information comprises at least one of peripheral noise information, moving information, location information, illumination information, and current time information of at least one of the transmission side terminal and the reception side terminal.

20. The method of claim 15, wherein the transmission side terminal and the reception side terminal form a separate channel for supporting at least one of a Speech To Text (STT) service providing a speech recognition based text and a Text To Speech (TTS) service converting text into speech data in a state in which a chatting service channel is formed.

21. The method of claim 15, wherein the forming of the communication path comprises forming a separate channel for supporting at least one of a Speech To Text (STT) service providing a speech recognition based text and a Text To Speech (TTS) service converting text into speech data in a state in which an image call service channel is formed.

22. The method of claim 21, wherein the transmitting of the conversion data comprises combining image data to be transmitted for supporting the image call service with text generated based on an operation of the STT service to transmit the combined data to the reception side terminal by the transmission side terminal.

23. The method of claim 21, further comprising synchronizing the text with the image data using time stamp information collected when a speech signal corresponding to the generated text is collected and time stamp information of the image data collected when the speech signal is collected by the transmission side terminal.

24. The method of claim 21, further comprising controlling such that a previous speech recognized text is synchronized with the image data for a predetermined time before text obtained by recognizing a newly input speech signal, and controlling such that an input text when the speech recognized text is input is synchronized with the image data by the transmission side terminal.

25. The method of claim 15, wherein the transmitting of the conversion data comprises providing at least one of a Speech To Text (STT) service providing a speech based on the speech recognition database as text and a Text To Speech (TTS) service converting text into speech data is operated according to at least one of a connection state and a user operation of the speech process supporting device by the transmission side terminal.

26. The method of claim 25, further comprising outputting at least one of:
- a pop-up window selecting at least one from a Speech To Text (STT) service providing a speech recognition based text and a Text To Speech (TTS) service converting text into speech data when the call connection request is received; and a picture include at least one of a region outputting text provided from the transmission side terminal, a region outputting text input through a text creator, and the text creator for creating the text by the reception side terminal.

27. The method of claim 15, further comprising displaying at least one of:
a pop-up window selecting at least one from a Speech To Text (STT) service providing a speech recognition based text and a Text To Speech (TTS) service converting text into speech data;
a picture guiding connection of the speech process supporting device according to the operation of the STT service; and
a picture including at least one of a region outputting a speech recognized text and a region text created and transmitted from the reception side terminal by the transmission side terminal.

28. A system for operating a communication service, the system comprising:
a transmission side terminal for requesting connection of the communication service, for receiving information about input/output modes of a reception side terminal, for transmitting user input data or reception data to a speech process supporting device to convert the user input data or the reception data after the communication service is connected, for outputting conversion data corresponding to the reception data, and for transmitting conversion data corresponding to the user input data to a reception side terminal;
a reception side terminal for receiving a communication service connection acceptance request according to the request the connection of the communication service, for starting the communication service using at least one of input/output modes or input/output modes determined by a user when the communication service connection acceptance request is accepted, for transmitting information about the input/output modes to a transmission side terminal, for displaying the conversion data received from the transmission side terminal, and for transmitting user input data to the transmission side terminal; and
a speech process supporting device for receiving the reception data or the user input data from the transmission side terminal, for converting input speech data corresponding the reception data or the user input data into text data or converting input text data corresponding the reception data or the user input data into speech data to create conversion data corresponding to the reception data or the user input data, and for transmitting the conversion data to the reception side terminal.

29. The system of claim 28, wherein the reception side terminal requests to automatically operate at least one of a Speech To Text (STT) service providing a speech recognition based text and a Text To Speech (TTS) service converting text into speech data based on at least one of network evaluation information including at least one of a loss rate of a data packet and a transmission delay degree transceived between the transmission side terminal and the reception side terminal, peripheral environment information of the transmission side terminal, and peripheral environment information of the reception side terminal.

30. The system of claim 29, wherein the peripheral environment information comprises at least one of peripheral noise information, moving information, location information, illumination information, and current time information of at least one of the transmission side terminal and the reception side terminal.

31. The system of claim 28, wherein the reception side terminal forms at least one of a separate channel for supporting at least one of an STT service and a TTS service in a state in which a channel service channel is formed with the transmission side terminal, and a separate channel for supporting at least one of the STT service and the TTS service in a state in which an image call service channel is formed.

32. The system of claim 31, wherein the reception side terminal extracts time stamp information collected when a speech signal corresponding to generated text is collected and time stamp information of the image data collected for the image call service when the speech signal is collected from data provided from the transmission side terminal to synchronize the text with the image data.

33. The system of claim 28, wherein the reception side terminal comprises a second memory including at least one of a speech recognition database recognizing a collected speech signal and a speech conversion database converting an input text into a speech.

34. The system of claim 33, wherein the reception side terminal controls such that at least one of an STT service and a TTS is operated according to at least one of a connection state and a user operation of the speech process supporting device.

35. The system of claim 28, wherein the reception side terminal comprises a second display unit including at least one of:
a pop-up window selecting at least one from a Speech To Text (STT) service providing a speech recognition based text and a Text To Speech (TTS) service converting text into speech data when the call connection request is received; and
a picture include at least one of a region outputting text provided from the transmission side terminal, a region outputting text input through a text creator, and the text creator for creating the text.

36. A method of operating a communication service, the method comprising:
transmitting, by a transmission side terminal, a communication service connection request to a reception side terminal;
identifying, by a transmission side terminal, input/output modes;
receiving, by a transmission side terminal, acceptance with respect to the communication service connection request and information about the input/output modes of reception side terminal from the reception side terminal;
receiving, by a transmission side terminal, user input data from a user or reception data from the transmission side terminal;
transmitting, by a transmission side terminal, the reception data or the user input data to a speech process supporting device to convert the received user input data or the reception data;
receiving, by a transmission side terminal, conversion data corresponding to the reception data or the user input data from the speech process supporting device, the conversion data being created by converting input speech data corresponding the reception data or the user input data into text data or converting input text data corresponding the reception data or the user input data into speech data;
displaying, by a transmission side terminal, conversion data corresponding to the reception data; and transmitting, by a transmission side terminal, conversion data corresponding to the user input data to the reception side terminal.

37. The method of claim 36, wherein the identifying of the input/output modes comprises:

collecting at least one of network evaluation information including at least one of a loss rate of a data packet and a transmission delay degree transceived between the transmission side terminal performing the communication service connection request and the reception side terminal receiving the communication service connection request, peripheral environment information of the transmission side terminal, and peripheral environment information of the reception side terminal; and requesting to operate at least one of a Speech To Text (STT) service providing a speech recognition based text and a Text To Speech (TTS) service converting text into speech data based on the information by the reception side terminal.

38. The system of claim 37, wherein the peripheral environment information comprises at least one of peripheral noise information, moving information, location information, illumination information, and current time information of at least one of the transmission side terminal and the reception side terminal.

39. The method of claim 36, further comprising at least one of:

forming a separate channel for supporting at least one of a Speech To Text (STT) service providing a speech recognition based text and a Text To Speech (TTS) service converting text into speech data in a state in which a chatting service channel is formed with the transmission side terminal by the reception side terminal receiving the communication service connection request; and forming a separate channel for supporting at least one of a STT service providing a speech recognition based text and a TTS service converting text into speech data in a state in which an image call service channel is formed by the reception side terminal.

40. The method of claim 39, further comprising:

extracting time stamp information collected when a speech signal corresponding to the generated text is collected and time stamp information of the image data collected for the image call service when the speech signal is collected from data provided from the transmission side terminal by the reception side terminal; and synchronizing the text with the image data by the reception side terminal.

41. The method of claim 39, further comprising at least one of:

displaying a pop-up window selecting at least one of a Speech To Text (STT) service converting speech data into text data and a Text To Speech (TTS) service converting the text data into the speech data when the call connection request is received;

displaying a picture guiding connection of the speech process supporting device; and displaying a picture including at least one of a region outputting the input text and a region outputting text generated according to the operation of the STT service.

42. The method of claim 36, further comprising performing at least one of a Speech To Text (STT) service converting speech data corresponding to a speech signal into text data or a Text To Speech (TTS) service converting the text data into the speech data using a speech recognition database and a speech conversion database stored in a second memory by the reception side terminal receiving the communication service connection request.

43. The method of claim 42, further comprising controlling such that at least one of the STT service based on the speech recognition database and the TTS service based on the speech conversion database is operated according to at least one of a connection state and a user operation of the speech process supporting device.

* * * * *